United States Patent
Kamimura et al.

[19]
[11] Patent Number: 6,137,493
[45] Date of Patent: Oct. 24, 2000

[54] MULTIDIMENSIONAL DATA MANAGEMENT METHOD, MULTIDIMENSIONAL DATA MANAGEMENT APPARATUS AND MEDIUM ONTO WHICH IS STORED A MULTIDIMENSIONAL DATA MANAGEMENT PROGRAM

[75] Inventors: Shuichi Kamimura, Kawasaki; Mutsumi Fujihara, Yokohama; Yoshiaki Hasegawa, Chofu; Kiyoshi Wada, Fuchu, all of Japan

[73] Assignee: Kabushiki Kaisha Toshiba, Kawasaki, Japan

[21] Appl. No.: 08/951,636

[22] Filed: Oct. 16, 1997

[30] Foreign Application Priority Data

Oct. 16, 1996 [JP] Japan .................................. 8-294403

[51] Int. Cl.[7] .................................................. G06F 15/00
[52] U.S. Cl. .......................................... 345/423; 345/435
[58] Field of Search ..................................... 345/419, 427, 345/440, 433, 117, 118, 423, 435, 420

[56] References Cited

U.S. PATENT DOCUMENTS

| | | | |
|---|---|---|---|
| 5,592,599 | 1/1997 | Lindholm | 345/427 |
| 5,877,775 | 3/1999 | Theisen et al. | 345/440 |

OTHER PUBLICATIONS

Hanan Samet, "Hierarchical Representations of Collections of Small Rectangles," ACM Computing Surveys, vol. 20, No. 4, (Dec., 1988), pp. 271–309.

R. A. Finkel, et al. "Quad Trees a Data Structure for Retrieval on Composite Keys," Acta Informatica, vol. 4, No. 1, (1974), pp. 1–9.

Yasuaki Nakamura, et al. "MD-Tree: A Balanced Hierarchical Structure for Multidimensional Data," The Transactions of the Institute of Electronics Information and Communciation Engineers D, vol. J71–D, No. 9, (Sep., 1988) pp. 1745–1752.

*Primary Examiner*—Phu K. Nguyen
*Attorney, Agent, or Firm*—Oblon, Spivak, McClelland, Maier & Neustadt, P.C.

[57] ABSTRACT

In order to manage a plurality of sets of multidimensional data positioned in a specific area of a computer, when hierarchically dividing a first area within the specific area into second areas that are to constitute child areas thereof, a decision is made as to whether or not a division condition, which is based upon the state achieved when the sets of multidimensional data are allocated to the first area and the state achieved when the sets of multidimensional data are allocated to the second areas, is satisfied. When it is decided that the division condition will be satisfied, the first area is hierarchically divided into the second areas to allocate the sets of multidimensional data to the second areas.

44 Claims, 46 Drawing Sheets

FIG. 8
(1) EMPTY A STACK 
(2) ADD C IN EMPTY STACK 
(3) ADD B TO THE STACK 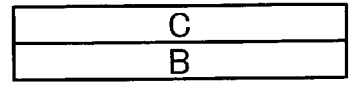
(4) ADD A TO THE STACK 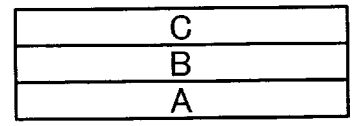
(5) EXTRACT ONE FROM THE TAIL-END OF THE STACK 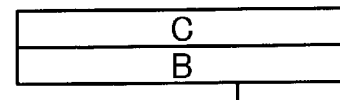
(6) ADD E AND F IN THE STACK 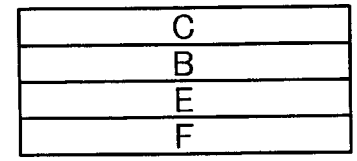
(7) EXTRACT ONE FROM THE STACK (F IS EXTRACTED) 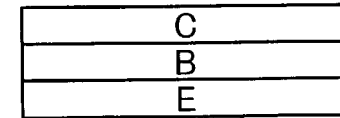
(8) EXTRACT ONE FROM THE STACK (E IS EXTRACTED) 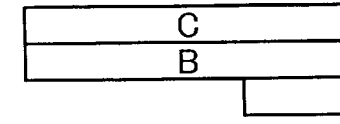
(9) EXTRACT ONE FROM THE STACK (B IS EXTRACTED) 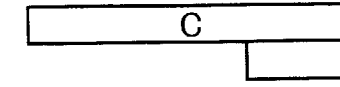
(10) EXTRACT ONE FROM THE STACK (C IS EXTRACTED AND THE STACK BECOMES EMPTY) 

| MESH LIST | GRAPHIC LIST |
|:---:|:---:|
| 1 | X |
| 4 | X |
| 6 | X |
| 25 | X |
| X | X |

Fig. 42
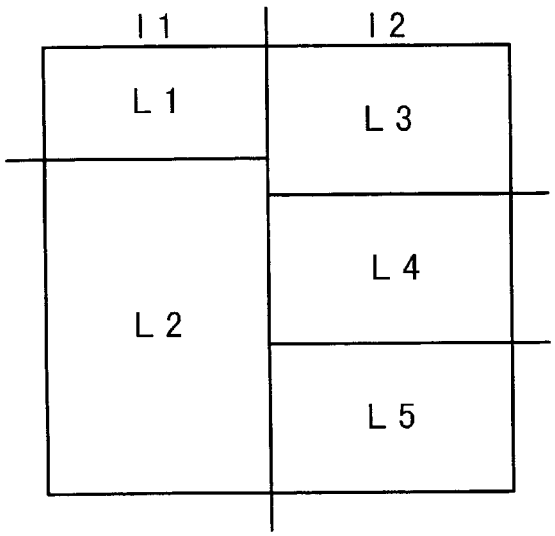
(A) AREA DIVISION
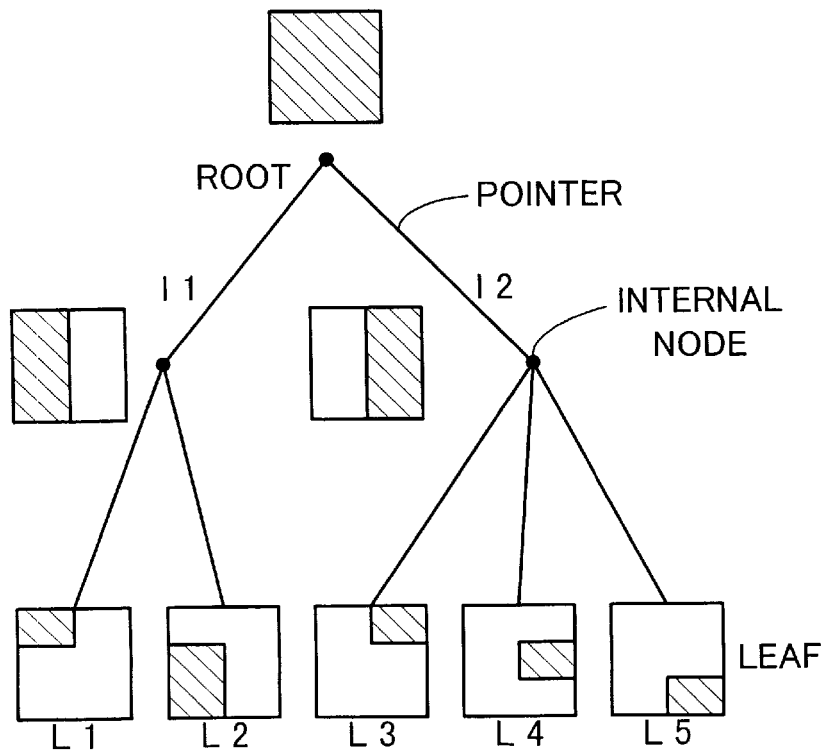
(B) MD TREE
(SHADED AREA INDICATES INDIVIDUAL NODE AREAS)

*Fig. 43*
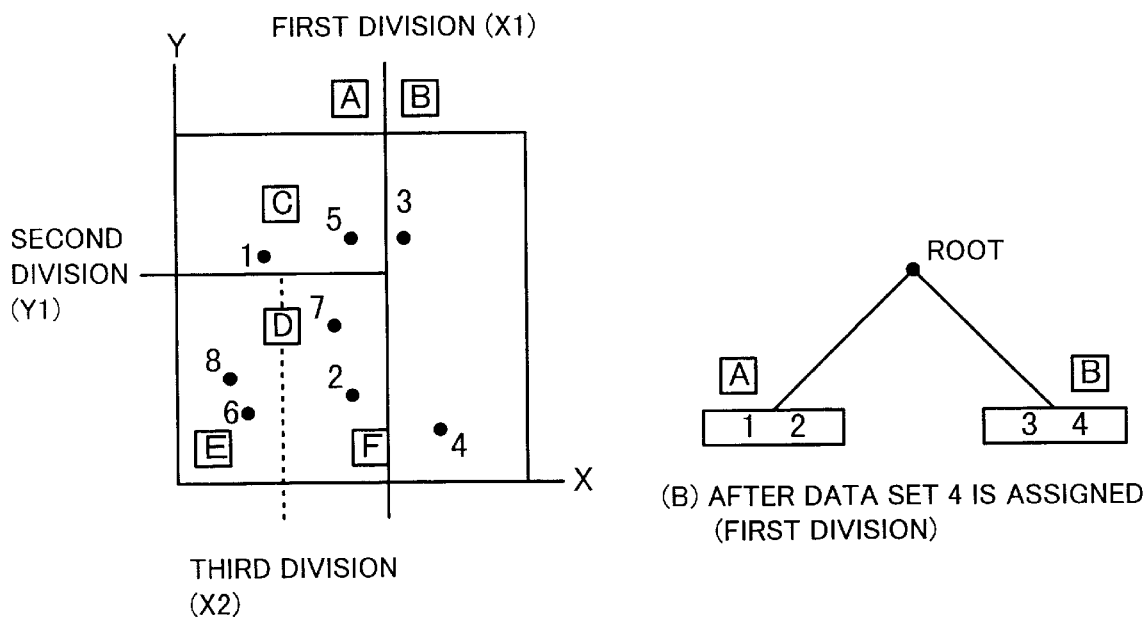
(A) AREA DIVISION
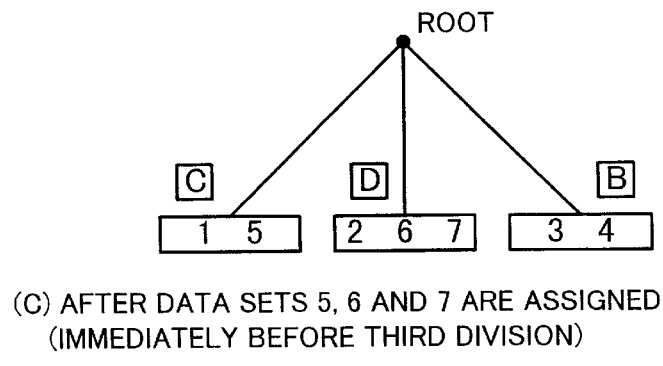
(B) AFTER DATA SET 4 IS ASSIGNED
(FIRST DIVISION)
(C) AFTER DATA SETS 5, 6 AND 7 ARE ASSIGNED
(IMMEDIATELY BEFORE THIRD DIVISION)
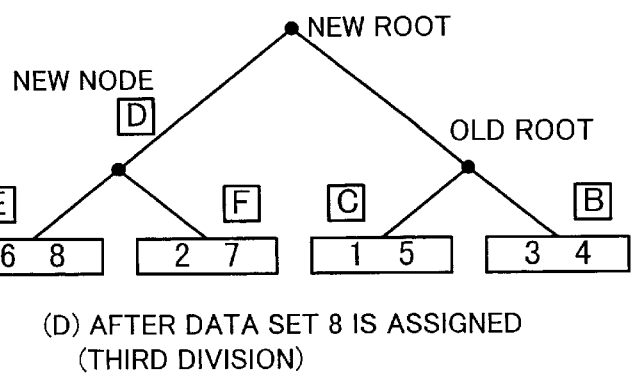
(D) AFTER DATA SET 8 IS ASSIGNED
(THIRD DIVISION)

Fig. 46
(A)
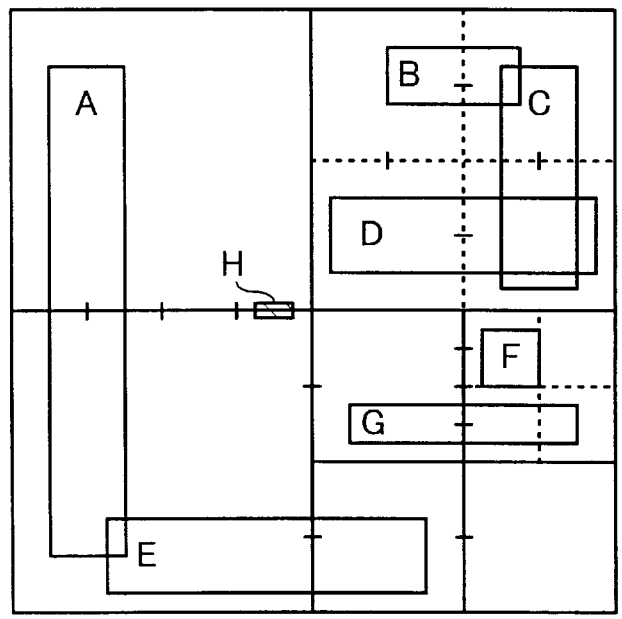
(B)
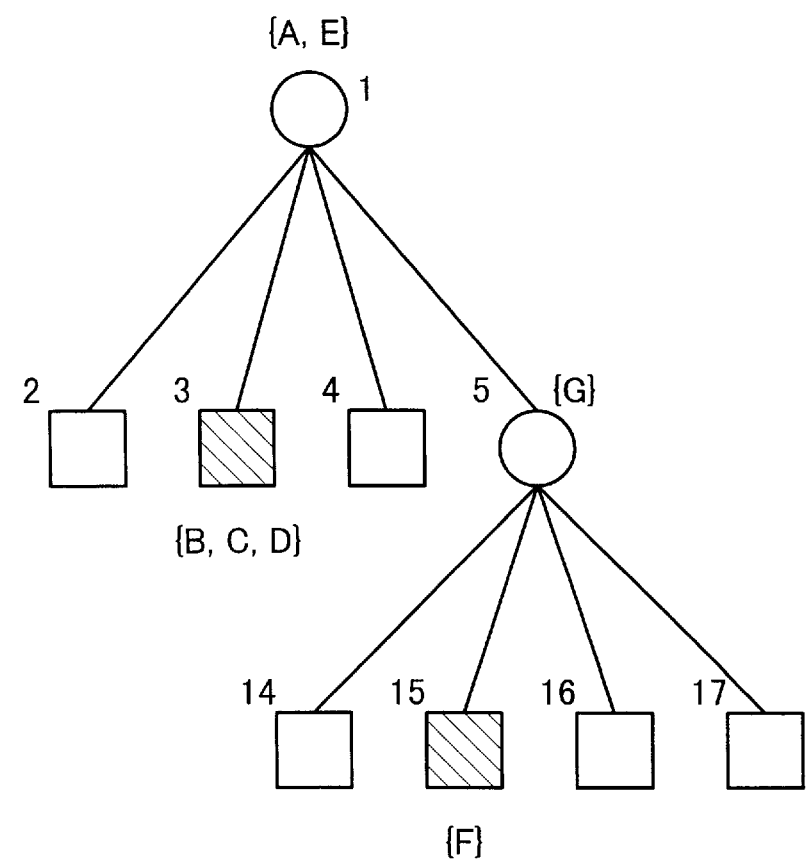

Fig. 47
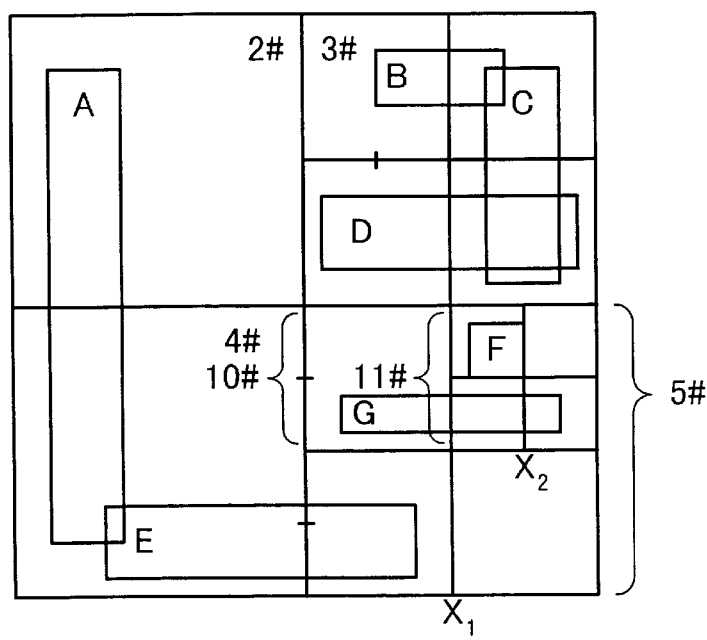
(A)
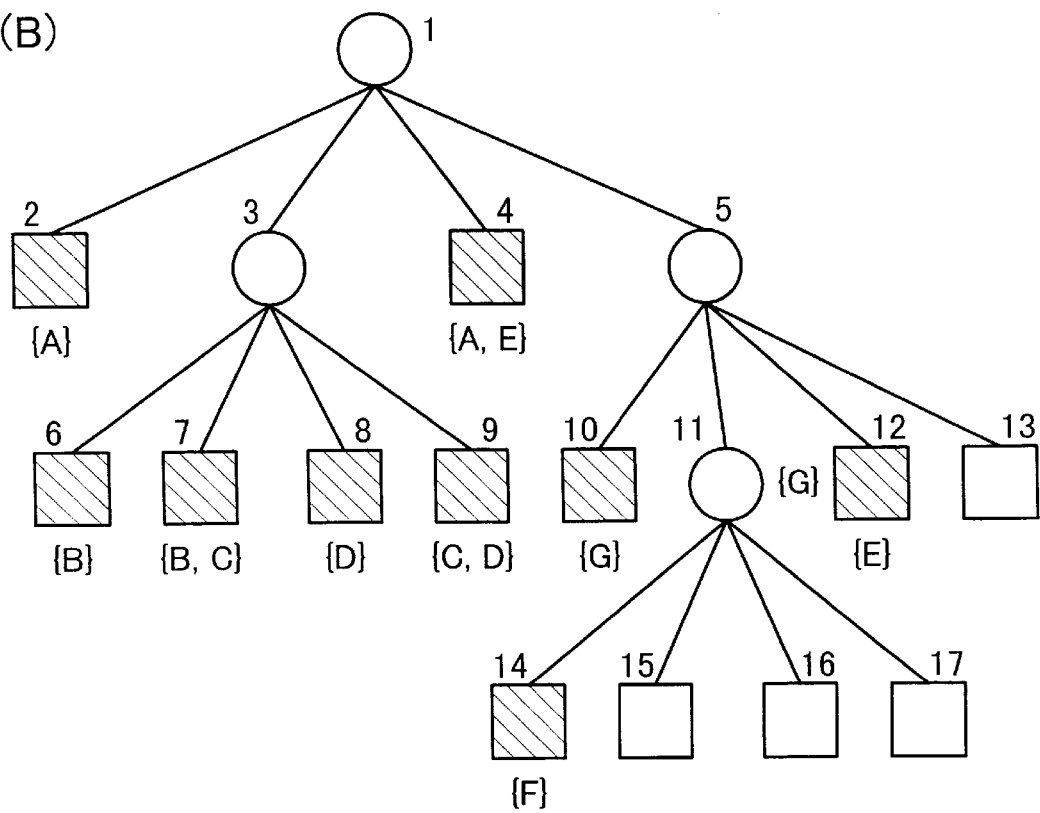
(B)

MULTIDIMENSIONAL DATA MANAGEMENT METHOD, MULTIDIMENSIONAL DATA MANAGEMENT APPARATUS AND MEDIUM ONTO WHICH IS STORED A MULTIDIMENSIONAL DATA MANAGEMENT PROGRAM

BACKGROUND OF THE INVENTION

1. Field of the Invention

The present invention relates to a multidimensional data management method, a multidimensional data management apparatus and a medium onto which is stored a multidimensional data management program, that are suited for the management of sets of multidimensional data whose positions are determined in a multidimensional space with two dimensions or more. To be more specific, it relates to a multidimensional data management apparatus and a multidimensional data management method, and a medium onto which is stored a multidimensional data management program with which various types of processing, such as registration, deletion, modification, search (for instance, range search, nearest neighbor value search) can be executed individually or in appropriate combinations by making the individual attributes of graphic data on a planar surface or in a three-dimensional space or statistical data with a plurality of attributes correspond to individual dimensions.

2. Description of the Related Art

A great number of methods have been proposed for managing sets of data with a plurality of attributes by employing a computer. For instance, in the areas of image processing, computer vision, drawing management and the like, tasks such as registration and deletion of data, search for a desired drawing for modification and the like must be performed by managing an enormous number of drawings represented by a great number of graphic elements such as vectors, points and symbols with a computer. Methods for such data management in the known art include the fixed grid method. In the fixed grid method, space is divided into fixed areas and sets of data are managed by individual areas. As long as the data handled is unchanging, the fixed grid method has advantages in that space search can be performed at high speed, and in that a high degree of memory efficiency can be achieved. However, with data such as data of facilities, for instance, in which additions and deletions are made frequently, the number of sets of data in each of the divided areas varies, since the division of the areas is fixed. Because of this, it is necessary to perform a search as other areas even in areas where there are no sets of data and to prepare buffer areas, even when no sets of data are present, which results in a reduced search speed and poor memory efficiency.

In order to solve the problems of the fixed grid method discussed above and to achieve efficient management and high speed search of multidimensional data, a hierarchical data structure based upon space division has been attracting much interest and a number of proposals have been put forward. For instance, the graphic data management apparatus disclosed in Japanese Unexamined Patent Publication No. 3_48974 achieves an improvement in data search speed when the display area is changed, by dividing and structuring great quantities of graphic positional information and graphic attributes in a multidimensional space through adoption of the theory of the MD tree with tri-tree structure. In addition, as a method comparable to this, the quad-tree method employing a $2^n$-divided tree for two dimensional data is also known.

(1) MD Tree Method

In the MD tree method, the tree comprises two types of nodes, i.e., leaves L at the extremities and internal nodes I, as well as pointers. The space where the sets of data are placed is divided recursively and each node is made to correspond to an individual divided space. In other words, a parent node corresponds to the smallest (n-dimensional) rectangle that contains all the spaces corresponding to its child nodes. In addition, all the sets of data are stored in the leaves L at the extremities. The internal nodes are respectively set to have two or three child nodes except for during the initial state, and if the number of child nodes exceeds three, the internal node is divided so that this requirements are satisfied at all times.

The number of sets of data that can be stored in each leaf is referred to as the data capacity P, and when the P+1 set of data is assigned to a given leaf, the space corresponding to this node is divided. For instance, as shown in FIG. 43, assume that P=3 and initially sets of data No.1 to No.3 are arranged within the space as shown in FIG. 43(A). If a new set of data 4 is put in this state, the space is divided into two spaces, i.e., a node A and a node B by the first dividing axis X1. The space divided in this manner corresponds to the tree structure shown in FIG. 43(B) and the individual leaves corresponding to the spaces resulting from the division store two sets of data respectively, i.e., data sets 1 and 2, and data sets 3 and 4.

If new sets of data 5, 6 and 7 are put in this state, since the node A comes to include 5 child nodes, i.e., the child nodes 1,2, 5, 6 and 7, it becomes further divided into a node C and a node D by the second dividing axis Y1. The spaces thus divided correspond to the tree structure shown in FIG. 43(C), and the leaves corresponding to the individual spaces store data sets (1, 5), (2, 6, 7) and (3, 4) respectively. When an area is divided in this manner, in the tree structure new leaves are created by dividing the leaf which corresponds to the divided area, and child nodes corresponding to these leaves are added.

This makes it possible to put new sets of data because of the increase in the number of leaves. Furthermore, it becomes possible to assign data set 8 as well. However, since three sets of data are already contained by the leaf (node D) which corresponds to the area where the set of data 8 may put, there is no more room for putting other data. Thus, the area to put the set of data 8 is divided into a node E and a node F by the third dividing axis X2 and the new leaves corresponding to them are created. However, since one parent node is set to have only three child nodes in the division using the MD tree, it is necessary to divide the internal node itself, as shown in FIG. 43(D) if new leaves are to be created by dividing the leaf corresponding to the node D in FIG. 43(C).

The MD tree with such tree structure has an advantage in that, since the distances between the root of the tree (ROOT) and all the leaves are set equal regardless of the distribution status of the data or the order in which the sets of data are put through division of the internal nodes, a well balanced tree structure is achieved, resulting in a high degree of search efficiency. In addition, since (P+1)/2 sets of data are always stored in each leaf, an improvement in memory utilization efficiency is achieved in comparison to the fixed grid method.

(2) Quad-tree Method

In the quad-tree method, an area is divided into four equal portions by two axes that are parallel to the individual axes of a two dimensional plane. Division is performed recursively until the number of sets of data included in every divided area is equal to or smaller than P, and this process is stored in memory as a quad-tree. The quad-tree method is described in, for instance, ACM Computing Surveys, Vol. 20, No. 4, December 1988.

In this division method, since only new child nodes corresponding to new leaves into which a leaf is divided are created, it is not necessary to create a new ROOT when dividing an internal node, as in the MD tree method, facilitating management of the tree structure. In addition, since an area is divided into equal portions, it is easy to specify the division positions. There is no the necessity for storing in memory the individual dividing axes, as is required in the MD tree method.

In the quad-tree method, since every area is divided into equal areas, disregarding data distribution, if the data distribution is not uniform, the balance of the tree and the memory utilization efficiency become extremely poor.

(3) Range Search, Nearest Neighbor Data Search

Range search and nearest neighbor data search must be performed in data management methods such as the MD tree method and the quad-tree method, whereby sets of data are managed by dividing space hierarchically, as in the conventional data management systems. That is, in range search, sets of data belonging to a specific value range are searched. In nearest neighbor value search, on the other hand, a set of data with a value that is nearest to a specific value such as the central point of a graphic, the cursor, an average value or a central value of different sets of data, are searched.

FIG. 44 shows an example of nearest neighbor search. In this example, on an apparatus that manages sets of two dimensional graphic data, the graphic element that is nearest to the cursor is displayed in a different color at all times to facilitate the specification of graphic elements which are registered in the apparatus. In this example, the leaf corresponding to the area containing the point Q which, in turn, corresponds to the cursor position, is determined, as shown in FIG. 44, and the set of data 1 that is nearest to the point Q in the leaf is determined. Next, the data contained within the circle whose center is the point Q and whose radius is the distance D1 between the point Q and the set of data 1 are searched in another leaf by performing a range search to obtain a data set 3, whose distance D2 from the point Q is smaller. Subsequently, the radius of the specified circle is changed to D2 to continue with the search.

3. Problems the Present Invention Addresses (1) Problems of the Division Methods In the MD tree method described above, the space may be divided through leaf division by cyclically selecting dividing axes as selecting them in an X-Y-X-Y . . . cycle, for instance, or by selecting a dividing axis in correspondence to the length of a side of the rectangle. In any case, they are all based upon variable area (volume) division, in which division is performed in conformance to the quantities of data. However, since the positions of the dividing axes are not fixed in such variable area division, it requires a great deal of time to calculate the division position during division, and it is also necessary to store in memory the coordinates of the individual dividing axes, causing an increase in required storage area. Moreover, in order to achieve a completely balanced tree, it is necessary to create anew the node that is to constitute the ROOT by working backward from the new node in addition to the nodes corresponding to the leaves being divided when an internal node is divided. Thus, compared to other methods in which only the nodes corresponding to the leaves being divided must be created, the management of the tree structure becomes more complex.

(2) Problems Caused by Data Registration Only at Leaves at the Extremities

Furthermore, in the past technologies such as the MD tree method and the quad-tree method, since sets of data are stored only in the individual leaves present at the extremities of the tree structure, if a set of data that is put into the area lies astride other areas as well, the number of sets of data that are registered more than once in a plurality of areas increases, resulting in an increase in the number of sets of data that are judged to be present within the individual areas, ultimately causing an increase in the number of divisions that must be performed in the individual areas. For instance, when a line segment L is present over areas B, C and D, as shown in FIG. 45, this line segment L is registered in all the leaves that correspond to the individual areas B, C and D. However, the number of sets of data that can be registered in a given leaf is set at P in advance. The number of divisions of those areas will increase by the number of excess sets of data put into the areas because of these overlaps, resulting in an increase in the number of internal nodes and leaves corresponding to the divided areas. As a result, problems arise in that the tree structure becomes more complex, in that the memory requirements increase and in that the search efficiency is reduced. In particular, when a great number of sets of graphic data with various lengths, areas, volumes and the like are to be managed, as in construction design, facility management and drawing management, if all the sets of data which belong to respective areas are registered in the leaves at the extremities as in the past and the areas are divided based upon the number of sets of data, almost all the graphic data are registered reduplicatively more than once, reducing the memory utilization efficiency to an extreme degree.

Furthermore, in the past technology described above, the criterion for dividing a leaf at the extremities is based upon whether or not the number of sets of data to be registered in a given leaf exceeds the preset value P. Because of this, if there are many multiple registrations, even with a leaf at the extremities divided, the number of sets of data registered in a new divided leaf is reduced very little in comparison to the number of sets of data registered in the leaf before the division. As a result, it becomes necessary to repeat division, posing a problem in that division is performed infinitely up to the limit of the storage area.

In addition, while, in the MD tree method, since division of areas is performed to ensure that the number of sets of data in each area is equal, division of the graphic data by the dividing axis may sometimes be avoided. In the quad-tree method, since division is performed into equal areas disregarding the data distribution, the dividing axes cannot be positioned to avoid unnecessary division of the graphic data. Because of this, graphic data of a certain size will be divided more frequently, further increasing the likelihood of multiple registrations.

(3) Registration into Intermediate Nodes

In order to improve the problem discussed above, the following solutions are adopted in the quad-tree method. First, in the solution detailed in FIG. 19 on page 299 of the publication mentioned earlier, i.e., ACM Computing Surveys, Vol. 20, No. 4, December 1988, multiple registrations are avoided by registering graphics that lie astride two or more areas at an internal node when managing the graphic data sets A–G shown in FIG. 46 with a quad-tree. In other words, since the graphic data sets A and E lie astride a plurality of areas among the areas achieved by dividing the entire area (the entire world) into quadrants, they are registered at a parent node 1, which corresponds to the entire area containing all these areas. Likewise, the graphic data sets B, C and D lying over a plurality of areas correspond to a node 3 which contains all those areas and the graphic data set G corresponds to a node 5. A graphic data set F, which does not lie astride a plurality of areas is registered at a node 15, which corresponds to one of the areas that are achieved by division into the smallest areas.

It is true that there is an advantage in this past technology in that multiple registration of data lying astride a plurality of areas is completely eliminated. However, in this method, even data such as the graphic data set H with a very small portion lying astride a plurality of areas are registered at a node corresponding to a higher-order area containing the plurality of areas. As a result, the number of sets of data that are registered in higher-order areas increases, resulting in a larger range for data search and reduced search efficiency. Search can be performed at a higher speed when searching over a plurality of areas over a smaller range even though the number of areas to be searched is large because of the multiple registrations than when searching the entire higher-order area over a vast range.

In order to solve this problem posed by the solution for completely avoiding multiple registrations, a solution whereby registrations are made at internal nodes while multiple registrations are also possible is proposed in FIG. 21 on page 301 of the publication mentioned earlier. This solution is explained in reference to FIG. 47.

For instance, since the smallest area containing the graphic data set G belongs to an area 5# in the lower right corner achieved by dividing the entire area into four areas, by dividing this area into four portions the graphic data set G is divided into two sets of graphic data sets G1 and G2 at their boundary X1. Then, the smallest areas 10# and 11# containing the individual divided sets of graphic data sets G1 and G2 respectively are determined. In this case, if the area division is carried out down to a size equaling the size of the area 14# containing the graphic data F, the divided portions G1 and G2 of the graphic data set G will be further divided, and this does not satisfy the requirement that "after determining the smallest area containing graphic data, division of the graphic data is performed only once." Because of this, the graphic data set G are registered at nodes 10 and 11 corresponding to the areas 10# and 11#.

The node 11 is an internal node and by registering the set of data at this internal node 11, the search speed can be improved compared to a case in which the set of data is registered so as to overlap at the nodes 15 and 16 at the extremities, which are child nodes of the internal node 11. At the same time, by registering the graphic data set G at both of the two nodes where the graphic data set G are present, i.e., at the nodes 10 and 11, it becomes possible to limit the search range to the nodes 10 and 11 corresponding to the areas 10# and 11#, which are smaller than the smallest area 5#, which includes the graphic data set G.

However, since the requirement that the division of a graphic be performed only once is imposed in this past technology, while there is an advantage in that there can be only one multiple registration for each set of data, it is not suited for processing sets of data that should be described and registered, even with a large number of overlaps, such as graphics that span a great length, including pipelines, power transmission lines, traffic paths and so forth.

(4) Problems During Nearest Neighbor Data Search

In the past technologies described above, when performing nearest neighbor data search, the leaf containing a specified point Q is determined, the set of data that is nearest to the point Q within this leaf are determined and a range search is performed based upon the distance between the set of data and the specified point Q. It is possible to employ this method when there are always some sets of data present inside each leaf, as in the MD tree method. However, no sets of data may be present within some of equally divided areas, as in the quad-tree method, and in such a case, it is not possible to perform nearest neighbor data search using the system described above.

(5) Objects of the Invention

An object of the present invention, which has been completed in order to solve the problems of the past described above, is to achieve efficient utilization of memory and higher speed search processing by performing decision making as to whether or not a leaf at the extremity is to be divided so that division is not performed if further division does not achieve any advantage in data management.

Another object of the present invention is to improve the speed at which sets of data lying astride a plurality of divided areas are searched by registering them at internal nodes as well and also by making multiple registrations under specific conditions.

Yet another object of the present invention is to enable fast search of sets of data belonging to a specified range that contains one or more divided areas.

Yet another object of the present invention is to perform fast search of nearest neighbor data inside other areas when searching a set of data positioned nearest to a specified point even if no sets of data are present within the divided area that contains the specified point.

Yet another object of the present invention is to facilitate area division and area merging by managing area divisions with a tree that is based upon division by $2^n$ and by dividing so that each area will be of equal size (equal volume), and to reduce the required memory area by dispensing with storage in memory of the division positions.

Yet another object of the present invention is to facilitate area divisions by managing area divisions with a tree based upon division by $2^n$ and by dividing the individual areas in conformance to specific division rules (including random division within a limited range) regardless of the number of sets of data in the individual areas.

SUMMARY OF THE INVENTION

To achieve the above-described objects, one aspect of the present invention is a multidimensional data management method for managing a plurality of sets of multidimensional data positioned in a specific area of a computer, said method comprising: when hierarchically dividing a first area within said specific area into second areas which are to constitute child areas thereof, making a decision as to whether or not a division condition based upon a state achieved when said sets of multidimensional data are allocated to said first area and a state achieved when said sets of multidimensional data are allocated to said second areas is satisfied; dividing hierarchically said first area into said second areas, if said division condition is determined to be satisfied; and allocating said sets of multidimensional data to said second areas.

According to the present invention structured as described above, a decision is made as to whether or not a greater advantage is achieved in data management by further dividing a first area containing sets of multidimensional data to be managed and allocating the sets of multidimensional data to second areas that constitute child areas of the first area. If it is decided that a greater advantage is not achieved through such division, the first area is not divided. Thus, improvements in memory use efficiency and in data search processing speed are achieved.

Another aspect of the present invention is a multidimensional data management method for managing a plurality of sets of multidimensional data positioned in a specific area of a computer, said method comprising: when a first area within said specific area has been hierarchically divided into second areas which are to constitute child areas thereof, making a decision as to whether or not a merging condition based upon a state achieved when said sets of multidimensional data are allocated to said second areas and a state achieved when said sets of multidimensional data are allocated to said first area is satisfied; merging said second areas with said first area, if said merging condition is determined to be satisfied; and allocating said sets of multidimensional data to said first area.

According to the present invention structured as described above, a decision is made as to whether or not a greater advantage is achieved in data management by merging second areas containing sets of multidimensional data to be managed and allocating the sets of multidimensional data to the first area which is the parent area of the second areas. If it is decided that a greater advantage is achieved through such merging, the second areas that have been divided are merged. Thus, improvements in memory use efficiency and in data search processing speed are achieved.

Another aspect of the present invention is a multidimensional data management method for managing a plurality of sets of multidimensional data positioned in a specific area of a computer, said method comprising: when hierarchically dividing a first area within said specific area into second areas which are to constitute child areas thereof, making a decision as to whether or not a division condition based upon a state achieved when said sets of multidimensional data are allocated to said first area and a state achieved when said sets of multidimensional data are allocated to said second areas is satisfied; dividing hierarchically said first area into said second areas and allocating said sets of multidimensional data to said second areas, if said division condition is determined to be satisfied; making a decision as to whether or not a merging condition based upon a state achieved when said sets of multidimensional data are allocated to said second areas and a state achieved when said sets of multidimensional data are allocated to said first area is satisfied; and merging said second areas with said first area and allocating said sets of multidimensional data to said first area, if said merging condition is determined to be satisfied.

According to the present invention structured as described above, a decision is made as to whether or not a greater advantage is achieved in data management by further dividing a first area containing sets of multidimensional data to be managed and allocating the sets of multidimensional data to second areas that constitute child areas of the first area, and a decision is made as to whether or not a greater advantage is achieved in data management by merging second areas containing sets of multidimensional data to be managed and allocating the sets of multidimensional data to the first area which is the parent area of the second areas, to allocate the sets of multidimensional data to optimal areas from the viewpoint of data management. Thus, improvements in memory use efficiency and in data processing speed are achieved.

Another aspect of the present invention is a multidimensional data management method for managing a plurality of sets of multidimensional data positioned in a specific area of a computer, said method comprising a step of making a decision, when a first area within said specific area has been hierarchically divided into second areas where are to constitute child areas thereof, as to whether said set of multidimensional data is to be registered in said first area or in said second areas.

According to the present invention structured as described above, when registering a set of multidimensional data, a decision is made as to whether or not the set of multidimensional data is to be registered in the first area or in the second areas, and if there is a greater advantage to be achieved in data management, the set of multidimensional data is registered overlapping in a plurality of second areas, thereby achieving an improvement in search speed when searching sets of multidimensional data lying astride a plurality of areas.

DESCRIPTION OF THE DRAWINGS

FIG. 8 is a drawing which shows how a stack works.

FIG. 42(A) is an illustration of an MD tree method in the past, with illustrating the area division FIG. 42(B) is an illustration of an MD tree method in the past, with illustrating the MD tree.

FIG. 43(A) is an illustration of problems of the MD tree method, with illustrating the area division.

FIG. 43(B) is an illustration of problems of the MD tree method, showing the state after the data set 4 is assigned.

FIG. 43(C) is an illustration of problems of the MD tree method, showing the state after data sets 5, 6 and 7 are assigned FIG. 43(D) is an illustration of problems of the MD tree method, showing the state after the data set 8 is assigned.

FIG. 46(A) is a drawing which shows a first variation of the quad-tree method, with showing the positions of graphic data in meshes FIG. 46(B) is a drawing which shows a first variation of the quad-tree method, illustrating the meshes and graphics registered in the meshes.

FIG. 47(A) is a drawing which shows a second variation of the quad-tree method, with showing the positions of graphic data in meshes FIG. 47(B) is a drawing which shows a second variation of the quad-tree method, illustrating the meshes and graphics registered in the meshes.

DETAILED DESCRIPTION OF THE PREFERRED EMBODIMENTS

Figure 1:
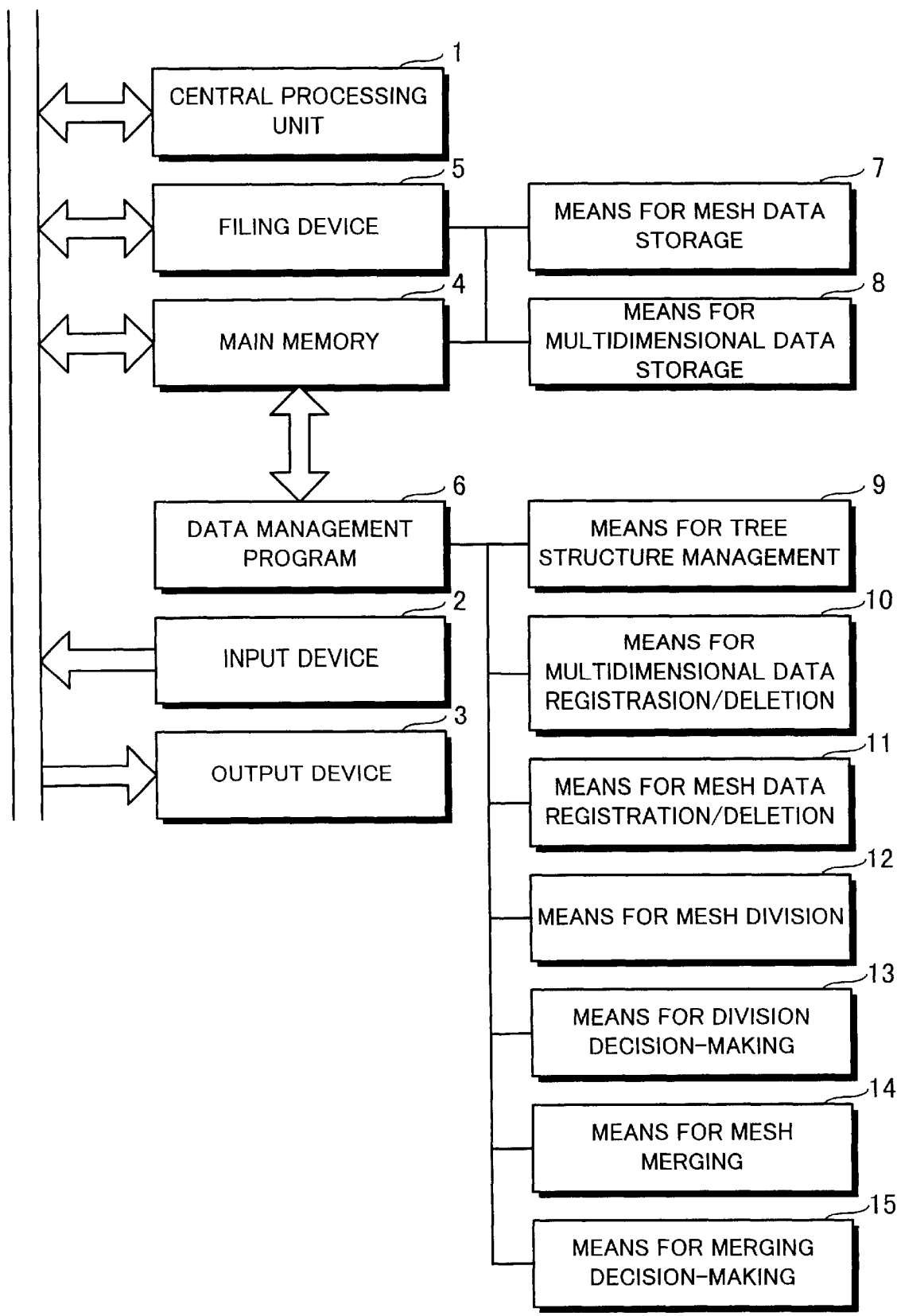
FIG. 1 is a functional block diagram illustrating the structure of the first embodiment of the present invention.

The following is a specific explanation of preferred embodiments of the present invention in reference to the drawings. It is to be noted that the following embodiments relate to management and search of two dimensional data such as power distribution diagrams.

(1) Explanation of Terminology

Before explaining the individual embodiments, various terms used in this specification are explained.

(a) Data Management

Includes one or a plurality of procedures for data processing such as data registration (allocation)/deletion, area division/merging, data search (for instance, range search, nearest neighbor search).

(b) World Coordinate Range or World Range

Refers to the whole area of space over which sets of data are managed. Normally, it is the range initially specified for the data storage area.

(c) Graphics

A type of multidimensional data expressed by coordinates within a multidimensional space, and in the embodiments, a graphic refers to a set of data constituted of single graphic elements such as points, lines, planes and the like, or a combination of such graphic elements positioned within a two dimensional space. A graphic has numerical value data that indicate the position/area that the graphic occupies in the world range. The numerical data of the graphic are copied as-is into the data area. It is to be noted that a graphic refers to a three-dimensional object in three-dimensional space.

There are two kinds of graphics. In the explanation of the embodiments, one is called a sub-graphic and another one super-graphic. Sub-graphics are constituted by combinations of relatively small graphics. Super-graphics are constituted by combinations of sub-graphics. In the embodiments, graphics to be managed for registration, deletion, search and the like comprise all of the following: graphic elements, sub-graphics and super-graphics. It is possible to make a selection as to how graphics are to be managed depending upon the purpose of the management, the size of the storage area in the computer, the search speed, the number of recursive divisions and the like.

(d) Mesh

Refers to spaces achieved by hierarchically dividing the world range by $2^N$. In the explanation of the above-described related art, it corresponds to areas to which given sets of data are allocated. Since two dimensional data are managed in the first through third embodiments of the present invention, it refers to each of the quadrangles achieved by dividing the world range into four portions (includes quadrangles resulting from repeated divisions into four).

The world range itself is referred to as a mesh. When a certain number of sets of graphic data are put in the data storage area, the world range has been divided into several meshes. Normally, when areas crowded with a great deal of graphics are divided into small meshes, whereas areas with relatively little graphics are divided into large meshes.

Since an N-dimensional space is hierarchically divided into two relating to respective dimensions. Every mesh is divided into $2^N$ meshes. Starting with the world range, meshes achieved by dividing into smaller areas are managed by using a tree based upon the division by $2^N$ (a $2^N$-divided tree). A data structure constituting the tree based upon the division by $2^N$, too, is realized in the data area. The information related to the corresponding meshes can be easily obtained from the individual nodes of the tree based upon the division by $2^N$.

(e) Tree Structure

In a two dimensional space, the world range divided into meshes is managed with a quad-tree and each mesh within the world range corresponds to one of the nodes in the quad-tree. That is, each of the nodes in the quad-tree corresponds to one of the meshes which may be obtained by dividing the world range hierarchically. For instance, initially, no graphic is present in the world range in the allocated data storage area. Then it is represented as a quad-tree comprising only one node (root node) corresponding to the entire world range.

Nodes and meshes have one-to-one correspondence and this correspondence is maintained by adding or deleting nodes as the meshes are divided or merged. If there is a mesh corresponding to a node, the node indicates a data area storing data relating to the mesh, whereas the node indicates nothing if there is no mesh corresponding to the node. A node changes in such a manner that it indicates a given mesh data area at the time of mesh division and indicates nothing when the mesh disappears as a result of a merge. It is to be noted that only range of nodes that are corresponded with meshes on a quad-tree that is realized in advance are managed without dynamically adding or deleting nodes.

More specifically, the quadrangle mesh representing the entire world range corresponds to the "root node" and the four child nodes of the root node correspond to the four meshes achieved by dividing the quadrangle representing the world range into four areas. For instance, when a mesh M is divided into four meshes m0, m1, m2 and m3, the node N corresponding to the mesh M has nodes n0–n3 corresponding to the meshes m0–m3 as its first generation child nodes. In the explanation of the following embodiments, in order to facilitate understanding of the parent/child relationships among meshes, the child meshes are assigned with reference numbers that are quadruples of the parent mesh number plus 0, 1, 2, 3 and those numbers are assigned in the order of lower left, upper left, lower right and upper right among the four divided meshes. In other words, m0=4M, m1=4M+1, m2=4M+2 and m3=4M+3.

As a method for determining the node that corresponds to a mesh, there is a procedure that starts from the root node of the quad-tree, sequentially descends to a child node corresponding to a mesh including the given mesh and repeat this procedure until reaching the node corresponding to the given mesh. In either case, since nodes and meshes correspond to each other on a one-to-one basis, there are a number of methods that may be taken to achieve their correspondence, and meshes and nodes are determined uniquely by adopting any of those methods.

It is to be noted that depending upon the type of data to be managed, more than one quad-tree may be prepared, corresponding to individual display scales or individual types of graphics.

(f) Extremity Nodes and Internal Nodes

The meshes corresponding to leaf nodes are not divided and they are referred to as "extremity meshes." In contrast, the meshes corresponding to internal nodes have already been divided. In addition, graphics are allocated to extremity meshes and the leaf nodes corresponding to the extremity meshes have the list of all the graphics being allocating to the meshes. Furthermore, if there is an overlap of the area occupied by a graphic and the area of a mesh, "the graphic belongs to the mesh." It is to be noted that the internal nodes are also referred to as "intermediate nodes" and the meshes corresponding to them are referred to as "intermediate meshes" or "divided meshes."

(g) Mesh Status Data

When there is a means for searching that, when one node is specified, performs a search to determine which mesh corresponds to that node (means for mesh search, to be detailed later) and this means is achieved by obtaining the coordinates of the mesh through calculation or by holding the information of the mesh directly in the node.

Figure 3:
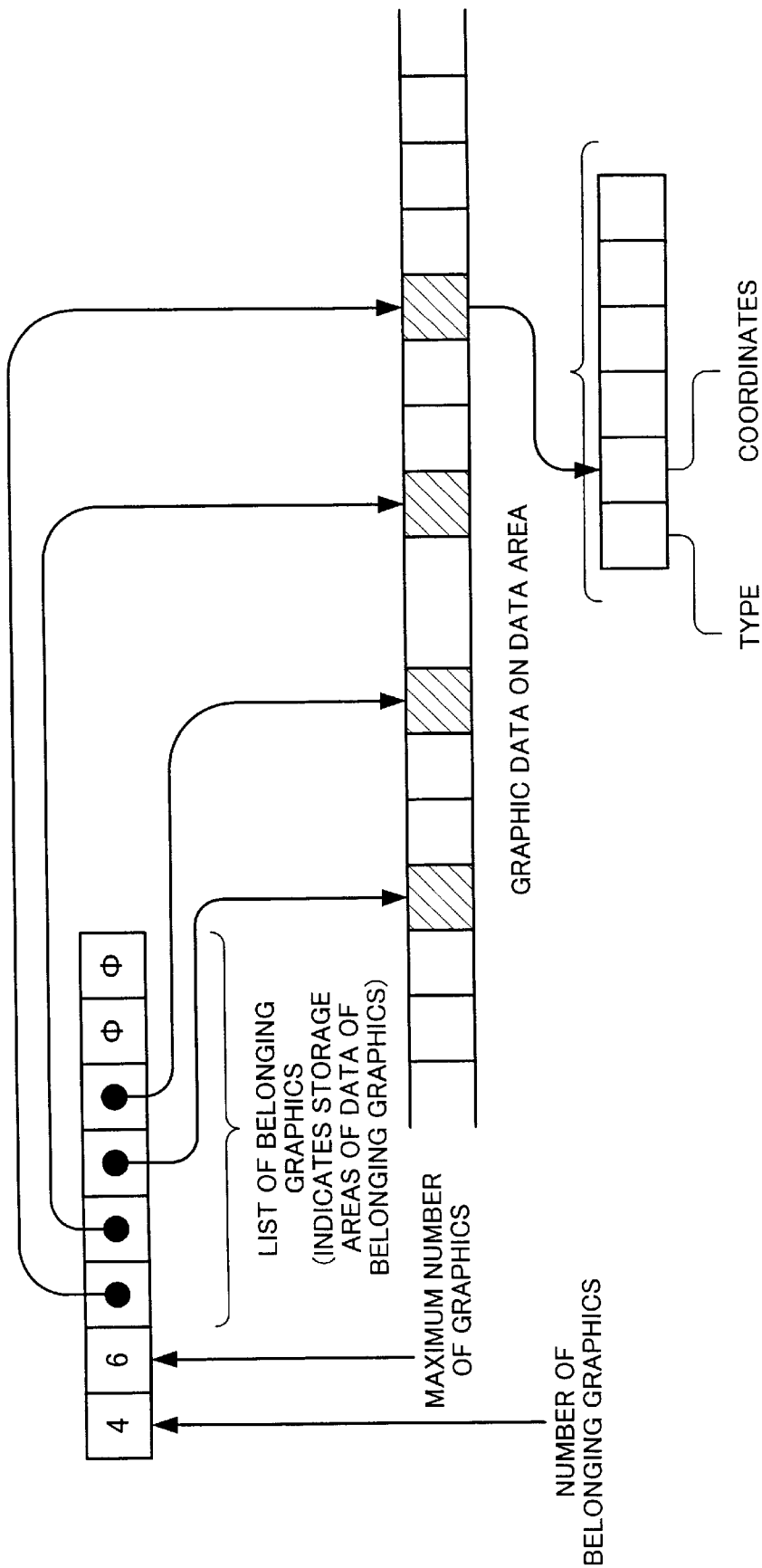
FIG. 3 is a drawing which shows the structure of mesh status data according to the embodiments of present invention.

For instance, each node may directly hold the information related to the mesh that it corresponds to. This information is referred to as mesh status data. These data are positioned in a data area and a pointer indicating an area storing mesh status data can be stored in a node that has a corresponding mesh. A node that does not have only corresponding mesh, on the other hand, does not indicate anything (a pointer indicating null is stored). The mesh status data have a structure as shown in FIG. 3, which is provided with the list of graphics as status data. This graphic list facilitates access to specific graphic data (coordinates, color, width, type, etc.). Apart from the above, the status data may include the number of graphics that overlap a mesh. It is to be noted that in the following embodiments, the number of belonging graphics is contained as status data.

In this context, "a graphic registered at a mesh" refers to a graphic whose data are included in the list of graphics of the mesh, and "a graphic belonging to a mesh" refers to a graphic that overlaps the mesh. The graphic is also registered in one of the mesh or the lower order child meshes of the mesh. In addition, the number of belonging graphics of a mesh refers to the number of graphics that belong to the mesh. That is, it is the number of graphics registered in the mesh itself and graphics registered in its child meshes which are in the lower order from the mesh without duplication. The list of belonging graphics means the list of graphics (graphic elements and sub-graphics) registered in the mesh.

In addition, the information held at the leaf node as mesh status data may differ from the information held at the internal nodes as mesh status data. For instance, it is not necessary to make an internal node hold the list of belonging graphics. However, if there is enough space in the data area, internal nodes, may be made to hold lists of belonging graphics. It is to be noted that the mesh status data held by each node are stored in the allocated data area and the node indicates the area where the mesh status data are stored.

(h) Mesh Division

The extremity mesh M corresponding to the leaf node N is divided into four areas when a specific condition (for instance, when the number of graphics belonging to that mesh exceeds a specific value) is satisfied. Then, four nodes (n0–n3) corresponding to the four meshes (m0–m3) resulting from the division into four are created and they become child nodes of the node N. In other words, the node N becomes an internal node and the four nodes (n0–n3) become leaf nodes. Of the graphics belonging to the mesh M, the graphics that should belong to the divided meshes (m0–m3) are made to belong to the divided meshes. The graphics that can remain belonging to the mesh M do remain so. The status data of the meshes M, m0, m1, m2 and m3 are individually updated at the corresponding nodes.

A mesh M corresponding to an internal node N, on the other hand, is always already divided. When the mesh M satisfies a specific condition (for instance, when the number of graphics belonging to the mesh becomes lower than the specific value), the first generation child nodes and the second generation child nodes of the node corresponding to the mesh M are hierarchically deleted. As a result, the mesh M becomes an extremity mesh with its corresponding node becoming a leaf node. Then, the graphics belonging to the extremity meshes that have been deleted are made to belong to the mesh M. With this, the status data of the mesh M held by the node N will include the list of belonging graphics.

(2) Individual Embodiments and Computer

Each embodiment of the present invention is implemented on a computer, and the individual functions of the embodiments are achieved through specific procedures (program) which controls the computer.

The individual "means" in this specification are concepts corresponding to different functions in the embodiments and they do not always correspond to specific hardware devices or software routines on a one-to-one basis. One and the same hardware element may sometimes constitute different means. For instance, the computer constitutes a specific means when it executes a given instruction and it may constitute another means when it executes another instruction. In addition, one means may be achieved through only one instruction or it may be achieved through executing a number of instructions. Thus, in this specification, the embodiments are explained by hypothesizing virtual circuit blocks (means) provided with the various functions of the individual embodiments. Also, the individual steps in each procedure in the embodiments may be executed by changing the order of execution, by executing a plurality of steps simultaneously or by executing them in different orders for the individual executions, as long as the inherent characteristics are not contradicted. Such a change in the order may be achieved through the interface method employing a menu system in which, for instance, the user selects the processing that can be executed.

(3) First Embodiment

The first embodiment achieves an improvement in memory use efficiency by registering graphics only in extremity meshes and by dividing the extremity meshes only under specific conditions to prevent mesh division that is inefficient from the viewpoint of data management.

Namely, the specific conditions that allow division of an extremity mesh may include, for instance, the following:

(a) the number of registered graphics is equal to or more than a specified value;

(b) assuming that, when a mesh is divided into four child meshes, the graphics of the parent mesh are registered to the child meshes, the sum of the numbers of graphics belonging to the child meshes is smaller than the "m" multiple of the number of graphics belonging to the parent mesh before the division;

(c) assuming that, when a mesh is divided into four child meshes, the graphics of the parent mesh are registered to the child meshes, the number of graphics belonging to three or more child meshes is smaller than "n %" of the entire number of belonging graphics of the parent mesh.

It is to be noted that the typical value for "m" is 2 (since divisions are made into 4, a value of 4 or larger is meaningless), and 30%, for instance, may be set as a typical value for "n."

It is a known practice in the past to use only the condition (a) listed above in a data management method utilizing a tree structure. In the first embodiment, by using the condition (b) or (c) in combination with the condition (a), multiple registration of a graphic at a plurality of meshes is prevented to ultimately prevent an increase in storage area necessitated by division. The conditions which may be used in these circumstances are not limited to (b) and (c), and any conditions that have the effect of reducing the number of meshes to which each of the graphics belongs (the number of meshes in which each graphic is registered) or the effect of reducing the number of meshes that one graphic belongs to on average over the entire graphics, may be adopted. Various such conditions may be conceived including, for instance, determining the value of "m" in (b) based upon the percentage of the number of the belonging graphics by type, checking the condition (b) or (c) by excluding the type of graphics for which multiple registrations at a certain number of meshes cannot be avoided such as an extremely long line segment.

An advantage achieved by performing division in conformance to the condition (a) is that by registering fewer graphics at smaller meshes, when a graphic is extracted of a mesh that has been determined to overlap a rectangle in a rectangle search to be checked to determine whether or not it belongs to the rectangle in the second embodiment, the number of graphics that are determined not to belong to the rectangle can be reduced to realize faster processing. In addition, in nearest neighbor value search, too, if the number of graphics belonging to one mesh is small, higher speed is achieved because of the reduced number of graphics that must be searched and checked before the nearest neighbor graphic is determined.

However, if division is carried out continuously without limit as long as the resources allow with only the condition (a), i.e., not using it in combination with the conditions (b) or (c), and if a number of graphics of a certain size that are present overlapping one another are registered, a state results in which the number of meshes one graphic is registered to becomes extremely large, and many common graphics may be registered in adjacent meshes. In such a state, a reduction of the number of graphics belonging to individual meshes through division cannot be achieved to a satisfactory degree. In addition, the rate of unnecessary work that must be done, such as rechecking graphics that have already been checked in a search or abstracting graphics based upon a decision that they have already been checked, increases, resulting in a reduction in processing speed as well as an increase in required storage area.

In contrast, by using the conditions (b), (c) in combination with the condition (a), divisions that drastically increase the average number of meshes to which every graphic belongs can be prevented, thereby achieving advantages that an increase in the required storage area is prevented and that the speed of the search processing is improved (not reduced). Furthermore, since the frequency at which division/merging are executed implemented decreases, the processing for registration/deletion also becomes faster.

The following may be adopted as specific conditions for a merging of extremity meshes to correspond to their division:

(d) the number of graphics that is registered to the parent mesh is smaller than a specified value;

(e) assuming that the four child meshes are merged with the parent mesh, the sum of the numbers of graphics belonging to the child meshes is equal to or more than the "m'" multiple of the number of graphics belonging to the parent mesh;

(f) assuming that the four child meshes are merged with the parent mesh, the number of graphics registered to three or more child meshes is equal to or more than "n'" % of the entire number of belonging graphics.

The condition (d) corresponds to the condition (a) for division and it is a known practice to use only the condition (d) in the past. When the condition (e) is also employed, and if the condition (b) is used for registration, a merging can be prevented by setting m' in a specific relation to "m." The larger m' is relative to m, the less likely a merging will occur, whereas the smaller "m'" is relative to m, the more likely a merging will occur. Likewise, when the conditions (f) and (c) are employed, a merging is less likely to occur if "n'" is larger relative to n, whereas a merging is more likely to occur if "n'" is smaller relative to "n."

It is to be noted that the conditions listed above for making merging decisions may be employed singularly instead of in combination. In other words, only the condition (e) may be used to make a decision in regard to whether or not a merging is to occur. If the condition (d) is not to be employed, since data registration sometimes results in meshes that must be merged, it is effective to execute mesh merging processing in combination with mesh division processing after adding a graphic to the list of graphics belonging to an extremity mesh during the registration processing.

In addition, when decision making is performed in conformance to the condition (e), since the number of graphics belonging to each mesh is obtained in the first embodiment, the mesh status data can stay as-is. In regard to the condition (b), a counter for holding the sum of the numbers of graphics belonging to child meshes as a portion of status data of extremity meshes can be provided for effectively achieving quick decision making by checking as to whether or not a graphic belongs to a child mesh created through the division of an extremity mesh during the registration processing and by increasing the count on the counter if there is a graphic that belongs to a child mesh.

(3_1) Structure of the First Embodiment

FIG. 1 is a functional block diagram showing the structure of the first embodiment.

Namely, the multidimensional data management apparatus in this embodiment comprises an input device 2 such as a keyboard, mouse or the like connected to a central processing unit 1, an output device 3 such as a display, a printer or an external file, a filing device 5 that stores the data management program 6 according to the present invention and the data to be managed and a main memory 4 which constitutes the execution/storage area for the data management program 6.

A means for mesh data storage 7 hierarchically divides a multidimensional space into a plurality of meshes, makes the divided meshes in the individual hierarchical levels correspond to individual nodes in a tree structure and stores in memory the relationship between each mesh and its corresponding node. A means for multidimensional data storage 8 arranges a plurality of sets of multidimensional data to be managed within a multidimensional space and registers the values of each set of multidimensional data as coordinates within the multidimensional space in storage devices.

Figure 2:
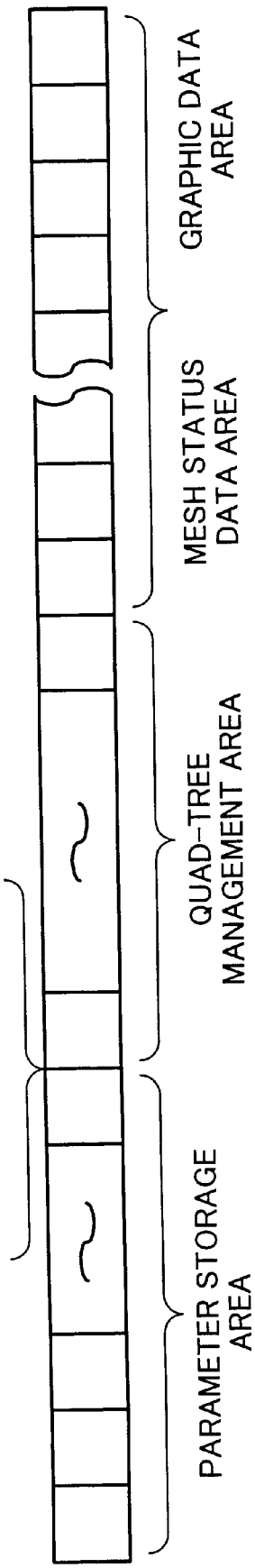
FIG. 2 is a drawing which shows the entire structure of the data area according to the embodiments of the present invention.
Figure 4:
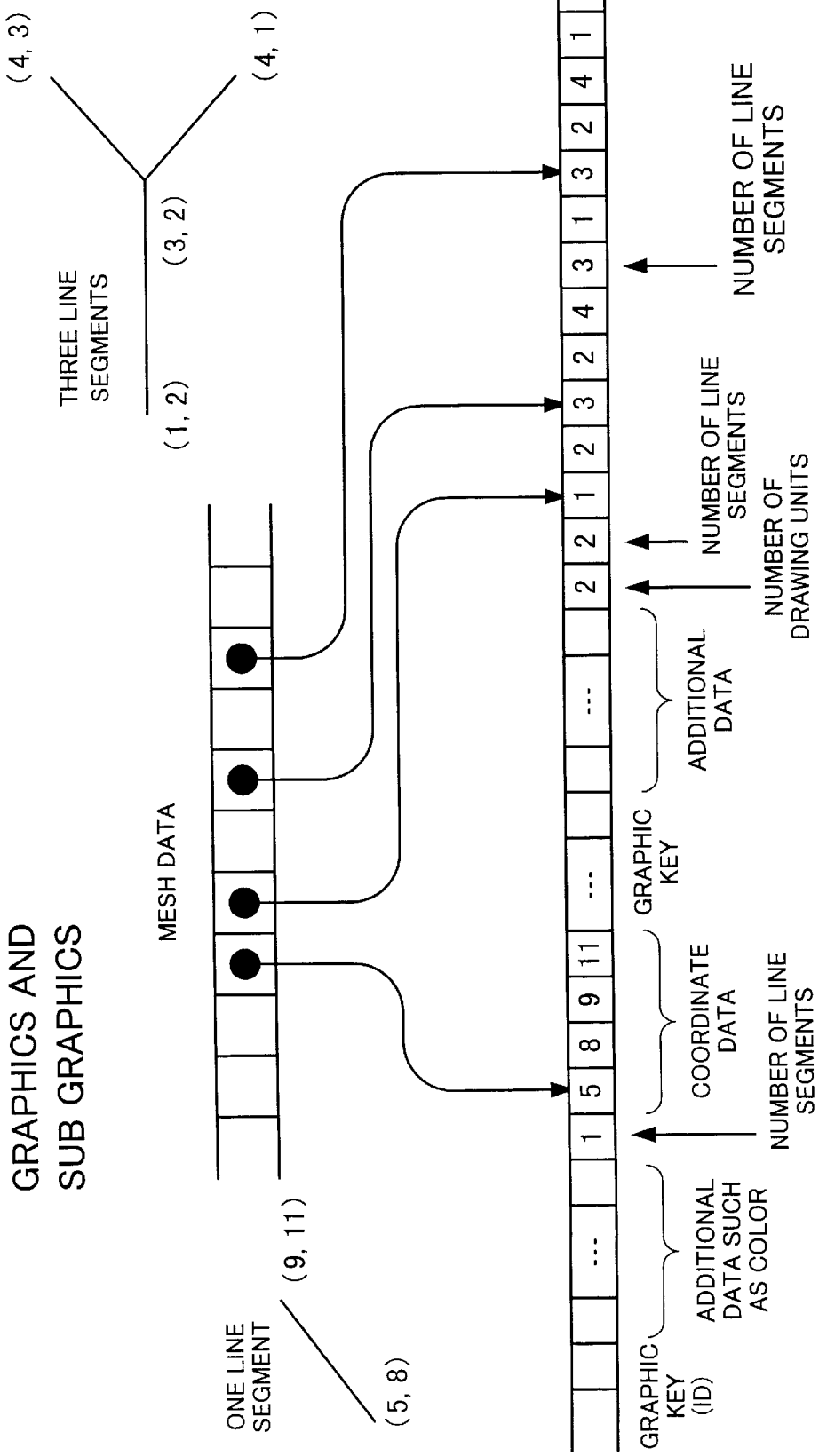
FIG. 4 is a drawing which shows correspondences between mesh status data and graphic data.

FIGS. 2 through 4 show examples of various types of data recorded at the filing device or in the data storage area of the main memory by these means for storage. It is to be noted that it is desirable to use a data storage area that can be accessed quickly and it is particularly desirable to secure the data storage area in the main memory of a computer. In addition, in the "quad-tree management area" mesh numbers corresponding to the nodes in the quad-tree are assigned as indices, and a pointer indicating the area where the mesh status data are stored is stored in each element of the quad-tree management area.

As shown in FIG. 2 by way of presenting an example, this data storage area comprises a parameter storage area, a graphic key management area, a quad-tree management area and mesh status data, graphic data and the like. In the parameter storage area, the world range, the maximum number of graphics to be registered in each mesh, the maximum number of recursive division levels when dividing a quad-tree, various values for determining conditions for mesh division/merging (the number of graphics for which mesh division should be performed, the number of graphics for which mesh merging should be performed, etc.), the contents of different types of graphics (if there are different types of graphics), identification of a plurality of quad-trees (if there are a plurality of quad-trees), the size of total data, the leading end of free area and the like are stored.

A set of mesh status data includes the number of belonging graphics, the maximum number of graphics (when the number of graphics belonging to a given mesh exceeds this value, the mesh is divided into four) and the list of belonging graphics, as shown in FIG. 3 as an example, and pointers that indicate specific storage areas on the data storage area where the data of belonging graphics are stored respectively, are registered in this list of belonging graphics. It is assumed that, in this embodiment, meshes other than the extremity meshes do not hold a list of belonging graphics.

Furthermore, in the case of graphics constituted by combining sub-graphics, making them belong to meshes in units of sub-graphics, as shown in FIG. 4, reduces the required data area compared to the data area required for storing them as separate sets of graphic data by being divided into the sub-graphics. In addition, keeping a combination together and intact is more intuitive for the user and there is also the added advantage in that screen display can be drawn faster when the data for display are put together in a large mass.

The data management program 6 shown in FIG. 1 is provided with a means for tree structure management 9, a means for multidimensional data registration and deletion 10, a means for mesh data registration/deletion 11, a means for mesh division 12, a means for division decision-making 13, a means for mesh merging 14 and a means for merging decision-making 15.

The means for tree structure management 9 hierarchically divides the multidimensional space into a plurality of meshes, makes the hierarchically divided meshes in the individual levels correspond to the individual nodes in the tree structure and manages correspondence relationships between each mesh and its corresponding node. The means for tree structure management 9 makes the meshes in the world range correspond to the nodes in the quad-tree, and each of the nodes indicates the data area where the data related to its corresponding mesh are stored. In the first embodiment, correspondences between the quad-tree nodes and the meshes are realized by giving the same numbers to the meshes and the corresponding quad-tree nodes for identification. For instance, the four meshes after a given mesh is divided into four will be numbered the quadruple of the number of the given mesh plus 0, 1, 2 and 3, and those numbers are assigned in the order of lower left, upper left, lower right and upper right. With this, the parent/child relationships among meshes can be discerned easily. In addition, this numbering makes easy to determine the coordinates of a given mesh and the hierarchical level of the mesh by calculation under the number of the mesh.

In addition, the means for tree structure management 9 makes a decision as to whether or not the mesh to be searched is an extremity mesh (a leaf node of the quad-tree) in the quad-tree, gives an area of the mesh to be searched (lower left and upper right coordinates) and indicates the division level of the mesh.

In this embodiment, all the graphics are assigned with unique graphic ID numbers referred to as "graphic keys" and all the graphics are managed using those graphic keys so that when a graphic key is given, the storage location of the corresponding graphic data can be searched. In addition, the data area for storing the graphic data is secured in correspondence to the size of the graphic data. Furthermore, using the coordinates of the graphic data and the coordinates of the mesh, a decision is made as to whether or not the graphic to be searched is within the mesh to be searched.

The means for multidimensional data registration/deletion 10 registers sets of multidimensional data into, and deletes sets of multidimensional data from the means for multidimensional data storage 8. The means for mesh data registration/deletion 11 acts on the means for mesh data storage 7 to register or delete data related to the multidimensional data corresponding to a given extremity mesh into and from the extremity mesh that corresponds to at least an extremity node in the tree structure among the individual meshes described above.

With these means, the sets of multidimensional data stored in the means for multidimensional data storage are managed based upon the information registered in the means for individual mesh data storage in the present invention.

The present invention is characterized in that the multidimensional data management apparatus structured as described above is further provided with the following structural features. First, the means for mesh division 12 sets the number of sets of multidimensional data that can be registered in the extremity meshes at or lower than a specific value and divides the extremity mesh where the number of sets of multidimensional data registered in the extremity mesh exceeds the preset value. The means for division decision-making 13 makes a decision as to whether or not the division is to be performed in conformance to the division allowance conditions that have been set in advance prior to division processing of the extremity mesh to be performed by the means for mesh division. The means for mesh merging 14 sets the number of sets of multidimensional data that can be registered in the parent mesh of the extremity mesh equal to or smaller than a specific value and attempts to execute a merging of the extremity mesh if the number of sets of multidimensional data belonging to the parent mesh is smaller than the preset value. The means for merging decision-making 15 makes a decision as to whether or not a merging is to be performed in conformance to the merging allowance conditions which are preset prior to executing the step in which the extremity mesh is merged into the parent mesh along with its sibling meshes.

To be more specific, the means for division decision-making 13 may be constituted of:
(a) a means that makes a decision as to whether or not a division is to be performed by comparing the sum of the numbers of sets of multidimensional data belonging to the child meshes after the division and the number of sets of multidimensional data belonging to the parent mesh; or
(b) a means that makes a decision as to whether or not a division is to be performed by comparing the number of sets of multidimensional data belonging to the parent mesh and the number of sets of multidimensional data belonging to a plurality of child meshes among child meshes achieved through division of the parent mesh.

The means for merging decision-making 15 may be constituted of:
(a) a means that makes a decision as to whether or not a merging is to be performed by comparing the sum of the numbers of sets of multidimensional data belonging to the individual child meshes before merging and the number of sets of multidimensional data belonging to the parent mesh after the merge;
(b) a means that makes a decision as to whether or not a merging is to be performed by comparing the number of sets of multidimensional data belonging to the parent mesh after merging and the number of sets of multidimensional data belonging to a plurality of child meshes among child meshes; or
(c) a means that sets the number of sets of multidimensional data that can be registered at the extremity mesh at or lower than a specific value, and executes a merging of the extremity mesh when the numbers of sets of multidimensional data registered in the individual extremity meshes sharing the same parent mesh are all lower than the preset value.

(3_2) Functions of the First Embodiment

Figure 5:
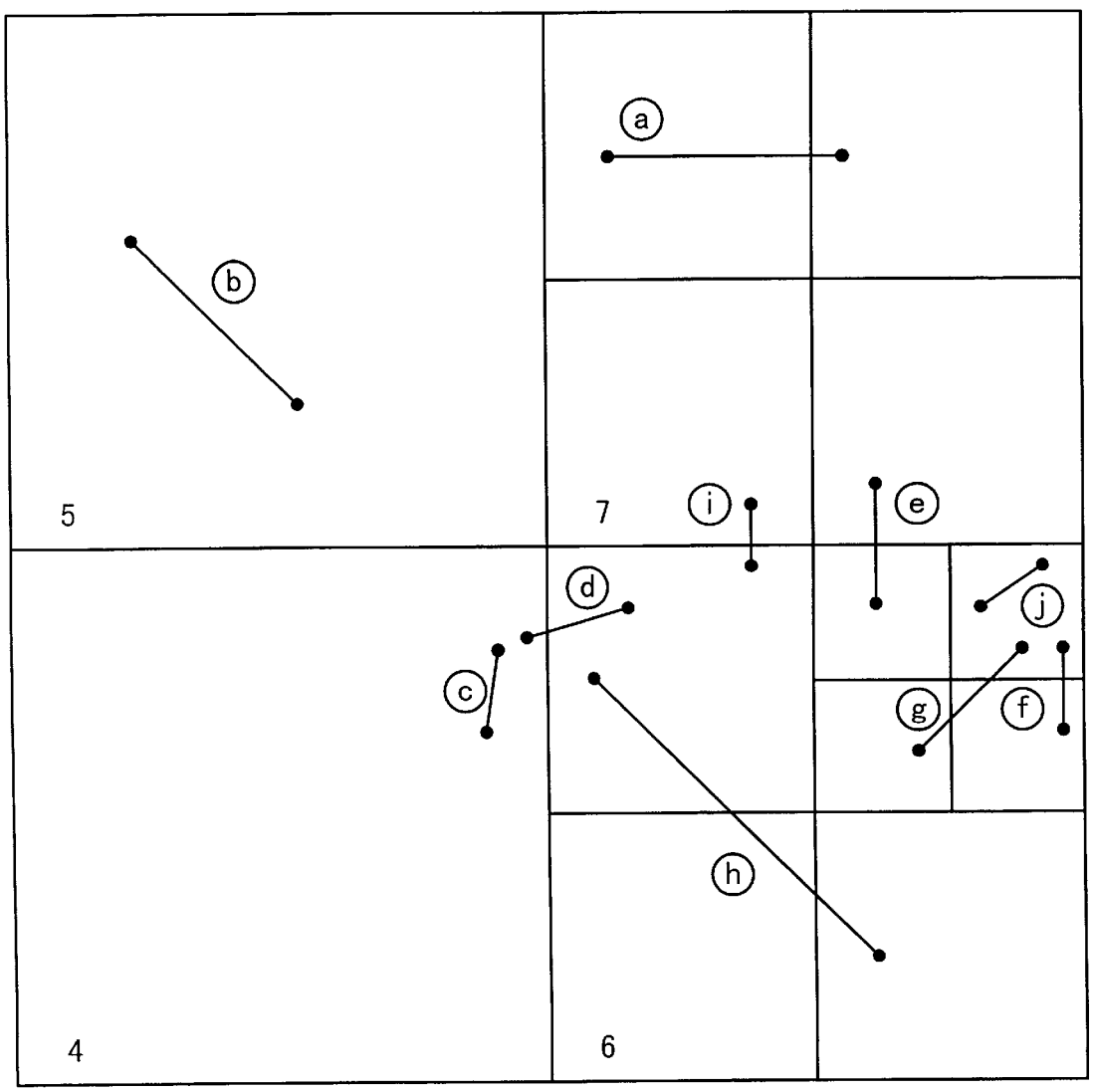
FIG. 5 is a drawing which shows the entire world where the graphic "a" is registered in the embodiments of the present invention as an example.
Figure 6:
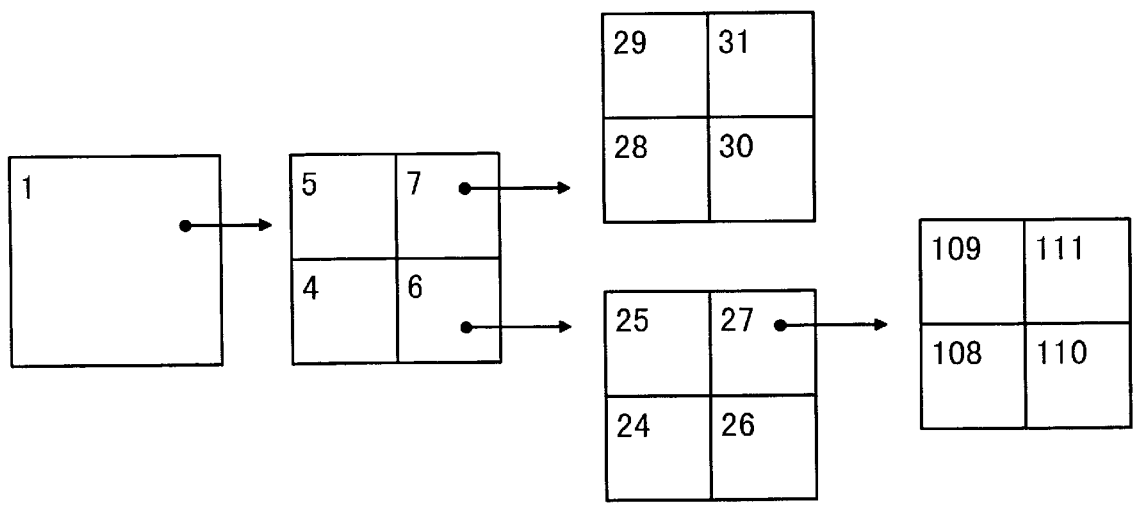
FIG. 6 is drawing which shows assignment of mesh numbers when mesh division is performed.
Figure 7:
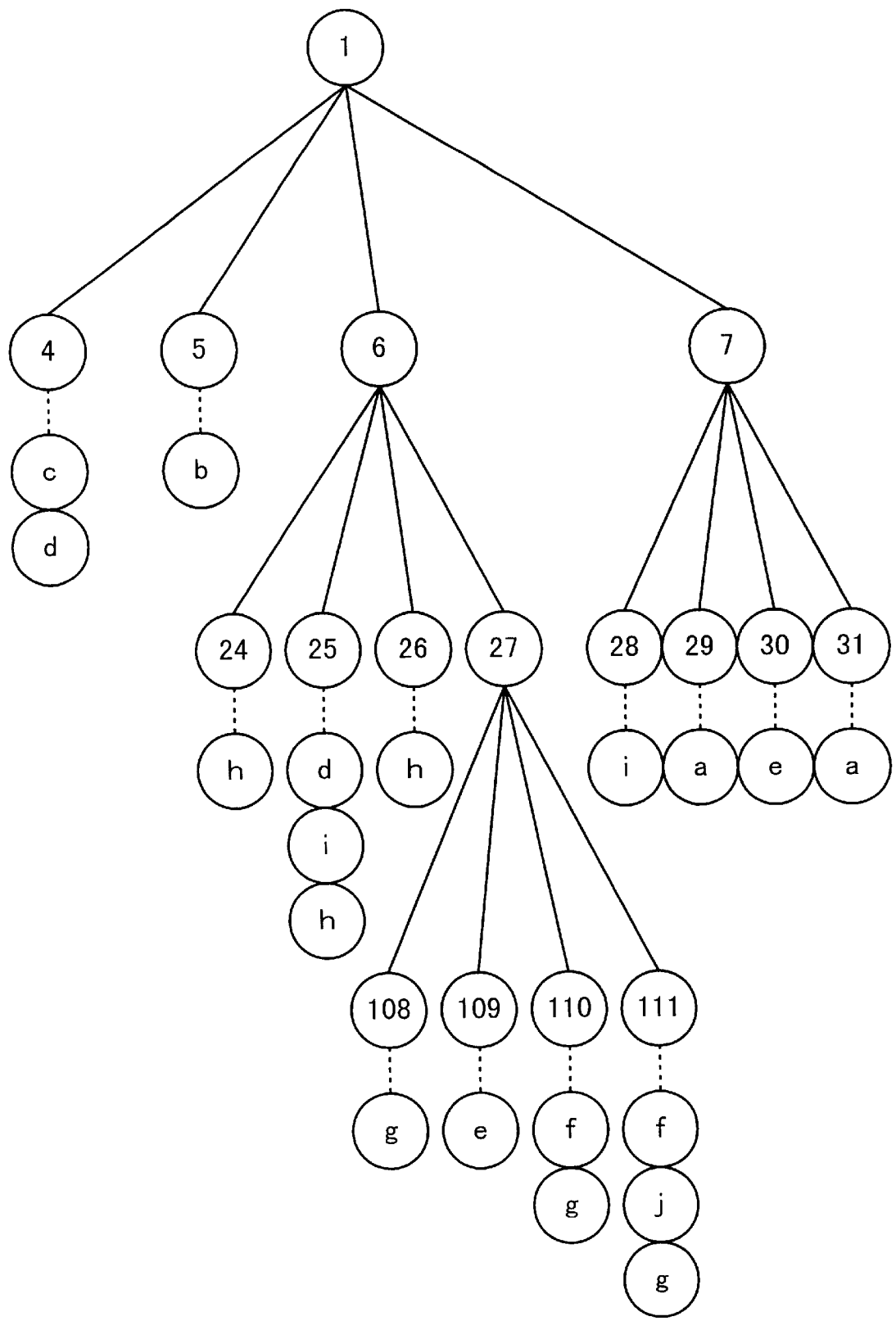
FIG. 7 is a diagram of a tree illustrating meshes and graphics that are registered in the meshes.

The functions of the multidimensional data management apparatus in the first embodiment structured as described above and the corresponding multidimensional data management method are explained in reference to the relationships between the tree structure and the meshes illustrated in FIGS. 5 through 7, in reference to FIG. 8 which illustrates the stack functions and in reference to the flowcharts presented in FIGS. 9 through 15.

(3_2_1) Processing for Registering a Graphic into a Data Area

Figure 9:
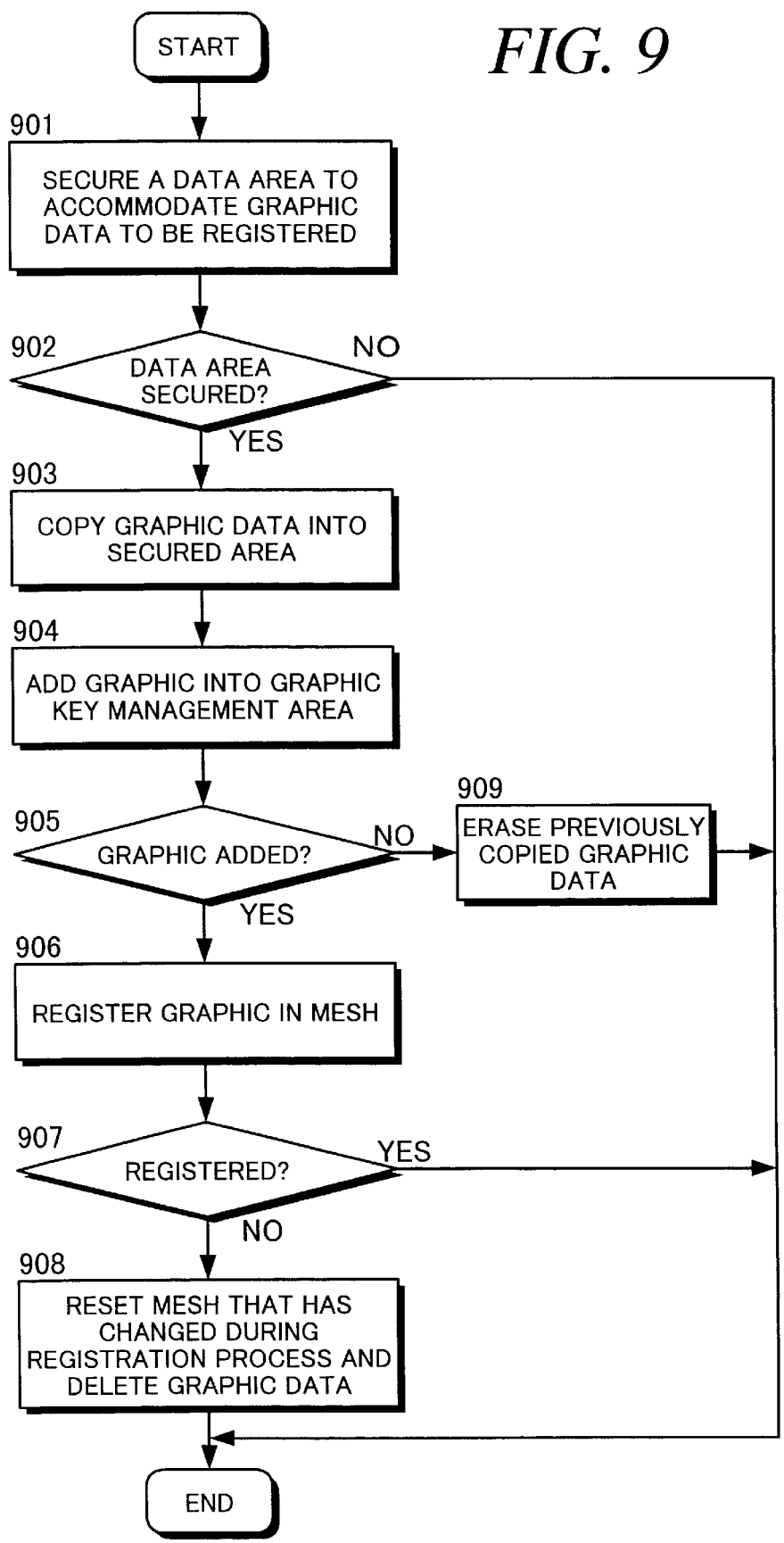
FIG. 9 is a flowchart illustrating the flow of the processing for registering a graphic in the data area.

The processing for registering new graphics in a data area is executed by following the steps illustrated in the flowchart in FIG. 9. The following is a step-by-step explanation of this processing.

(Step 901)

Enough data area to accommodate graphic data to be registered is secured.

(Step 902)

A decision is made as to whether or not the data area has been secured, and if the data area has been secured, the operation proceeds to the next step, whereas if the data area has not been secured, registration of the graphic in the data area cannot be performed and this processing ends.

(Step 903)

If the data area has been secured in step 902, the graphic data are copied into the secured data area.

(Set 904)

The graphic is added to the graphic key management area.

(Step 905)

A decision is made as to whether or not the graphic has been added to the graphic key management area and if it has been added, the operation proceeds to the next step 906, whereas if it has not been added, the operation proceeds to step 909.

(Step 906)

If the graphic has been added to the graphic key management area, the graphic is registered in the mesh.

(Step 907)

A decision is made as to whether or not the graphic has been registered in meshes, and if it has been registered, the registration of the graphic into the data area is completed. If, on the other hand, the registration has not been performed, the operation proceeds to the next step.

(Step 908)

The mesh that has been changed during the process of the registration processing is reset to its original state, the graphic data are deleted and the processing ends.

(Step 909)

If the graphic has not been added to the graphic key management area in step 905, the graphic data that have been copied into the data area in step 903 are erased to end the registration processing of the graphic into the data area.

In this context, the "mesh that has changed in the process of registration processing" refers to, for instance, a mesh that has been divided into four after the number of graphics belonging to the mesh increases. Consequently, if, after this processing, it turns out that graphic registration has not been performed, all the data are reset to the state before the registration processing.

It is to be noted that the "processing for registering a graphic in meshes" performed in step 906 and the "processing for deleting the graphic from the data area" performed in step 908 in the flowchart presented in FIG. 9 are to be detailed later.

(3_2_2) Processing for Registering a Graphic into a Mesh Data

Figure 10:
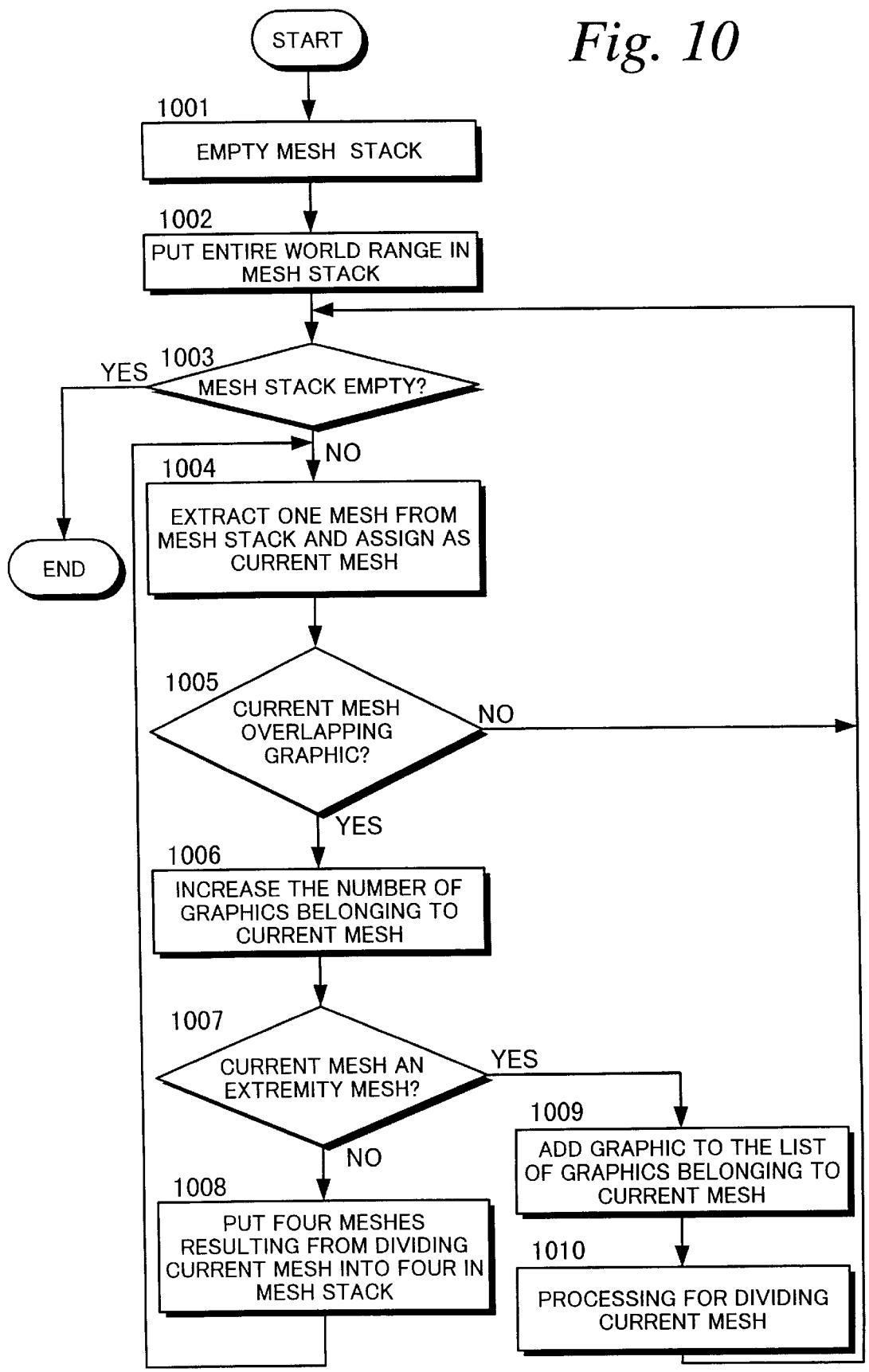
FIG. 10 is a flowchart illustrating the flow of the processing for registering a graphic in meshes.

The processing for registering new graphics into meshes by recursively dividing the entire world range is executed by following the procedure illustrated in the flowchart in FIG. 10. It is to be noted that, in reference to this embodiment, a case in which a graphic "a" is registered only in an extremity mesh is explained. The following is a step-by-step explanation of the processing (also see FIG. 5.).

In the case of this example, it is assumed that the world range is divided once, and only five meshes, the world range 1 and its four child meshes 4–7, exist.

(Step 1001)

The mesh stack is emptied.

(Step 1002)

The entire world range (the mesh number of the world range 1) is put into the mesh stack.

(Step 1003)

A decision is made as to whether or not the mesh stack is empty and if it is empty, this processing ends. If, on the other hand, it is not empty, the operation proceeds to the next step. Since, in this case, the world range 1 was put into the stack in the previous step, the operation proceeds to the next step.

(Step 1004)

One mesh is extracted from the mesh stack and is assigned as the current mesh. In other words, the world range 1 is extracted in this case.

(Step 1005)

A decision is made as to whether or not the current mesh and the graphic overlap and if there is no overlap, the operation returns to step 1003. If, on the other hand, there is an overlap, the operation proceeds to the next step. Since the entire world range 1 overlaps the graphic "a" to be registered in this case, the operation proceeds to the next step.

(Step 1006)

The number of graphics belonging to the current mesh is increased. In this case, the number of graphics belonging to the mesh data in the entire world range 1, mesh number is increased by 1 to correspond to one graphic, i.e., the graphic "a".

(Step 1007)

A decision is made as to whether or not the current mesh is an extremity mesh, and if it is an extremity mesh, the operation proceeds to step 1009. If it is not an extremity mesh, the operation proceeds to step 1008. In this case, since, if the world range 1 has already been divided into meshes 4–7, and they are extremity meshes, the current mesh, i.e., the entire world range 1 is not an extremity mesh, the operation proceeds to step 1008.

(Step 1008)

The four meshes achieved by dividing the current mesh into four are put into the mesh stack and the operation returns to step 1004. In this case, the meshes 4–7 achieved by dividing the world range 1 into four are put into the mesh stack and the operation returns to step 1004. Then, in step 1004, the meshes are extracted from the mesh stack one by one sequentially to be assigned as the current mesh, and the processing performed in steps 1005–1007 is executed for each mesh.

In this example, the mesh 7 is extracted from the mesh stack, and is assigned as the current mesh before the operation proceeds to step 1005. Since, as shown in FIG. 5, this mesh 7 overlaps the graphic "a" to be registered, the operation proceeds to step 1006 and step 1007, and in step 1007, the mesh 7 is determined to be an extremity mesh before the operation proceeds to step 1009.

(Step 1009)

The graphic to be registered is added to the list of graphics belonging to the current mesh. In this embodiment, the pointer that indicates data area storing the graphic is added to the list.

(Step 1010)

The "mesh division processing," which is to be explained later, is performed for the current mesh, and then the operation returns to step 1003. In this example, since none of the other meshes 6, 5 and 4 overlap the graphic "a," the processing in steps 1003–1005 is repeated sequentially, and when the check on all the extremity meshes is completed, the mesh stack will have become empty in step 1003, upon which this processing ends. Ultimately, the graphic "a" is registered in the extremity mesh 7.

It is to be noted that since, if the current mesh is divided into four during the "processing for mesh division," which is to be detailed later, the current mesh becomes a parent mesh, the graphic "a," which has been added to the list of graphics belonging to the mesh 7 in step 1009, is moved from the list of graphics belonging to the mesh 7 to some lists of graphics belonging to some meshes located under the mesh 7.

(3_2_3) Processing for Deleting a Graphic from a Data Area

Figure 11:
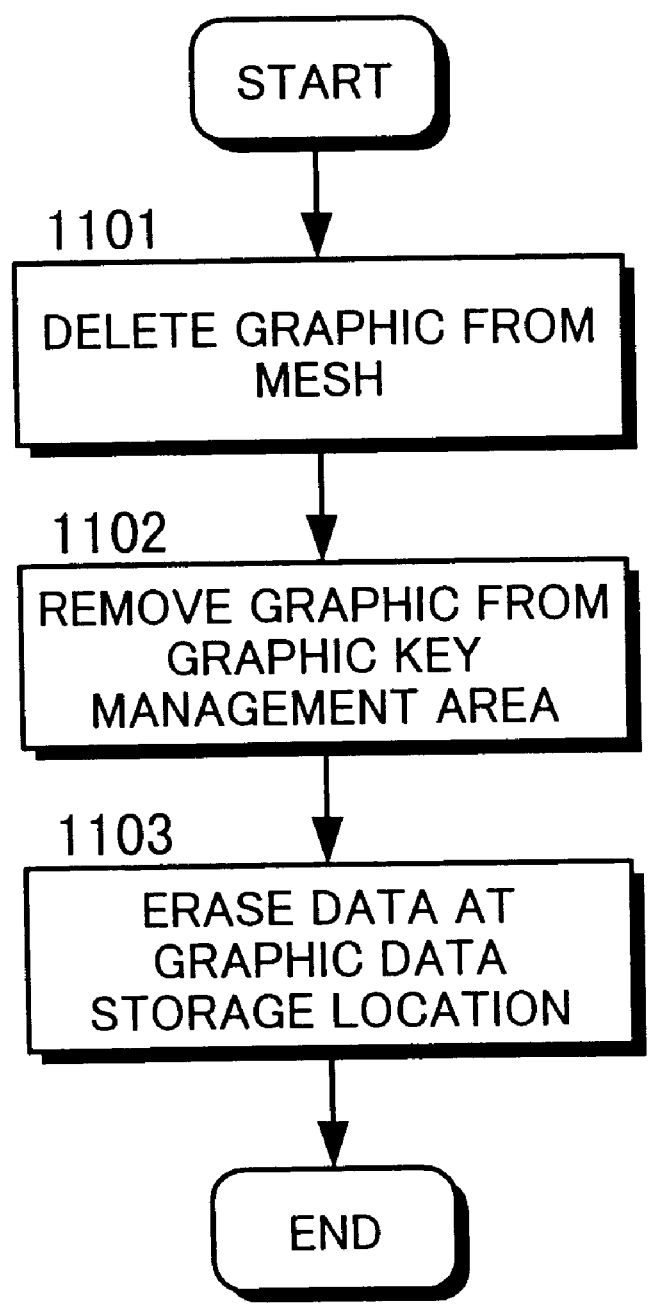
FIG. 11 is a flowchart illustrating the flow of the processing for deleting a graphic from the data area.

The processing for deleting a specified graphic from a data area is executed by following the procedure illustrated in the flowchart in FIG. 11. The following is a step-by-step explanation of this processing.

(Step 1101)

The "processing for deleting a graphic from a mesh" to be detailed later is performed.

(Step 1102)

The graphic is removed from the graphic key management area.

(Step 1103)

The data stored at the graphic data storage location are erased to end the processing.

(3_2_4) Processing for Deleting a Graphic from a Mesh

Figure 12:
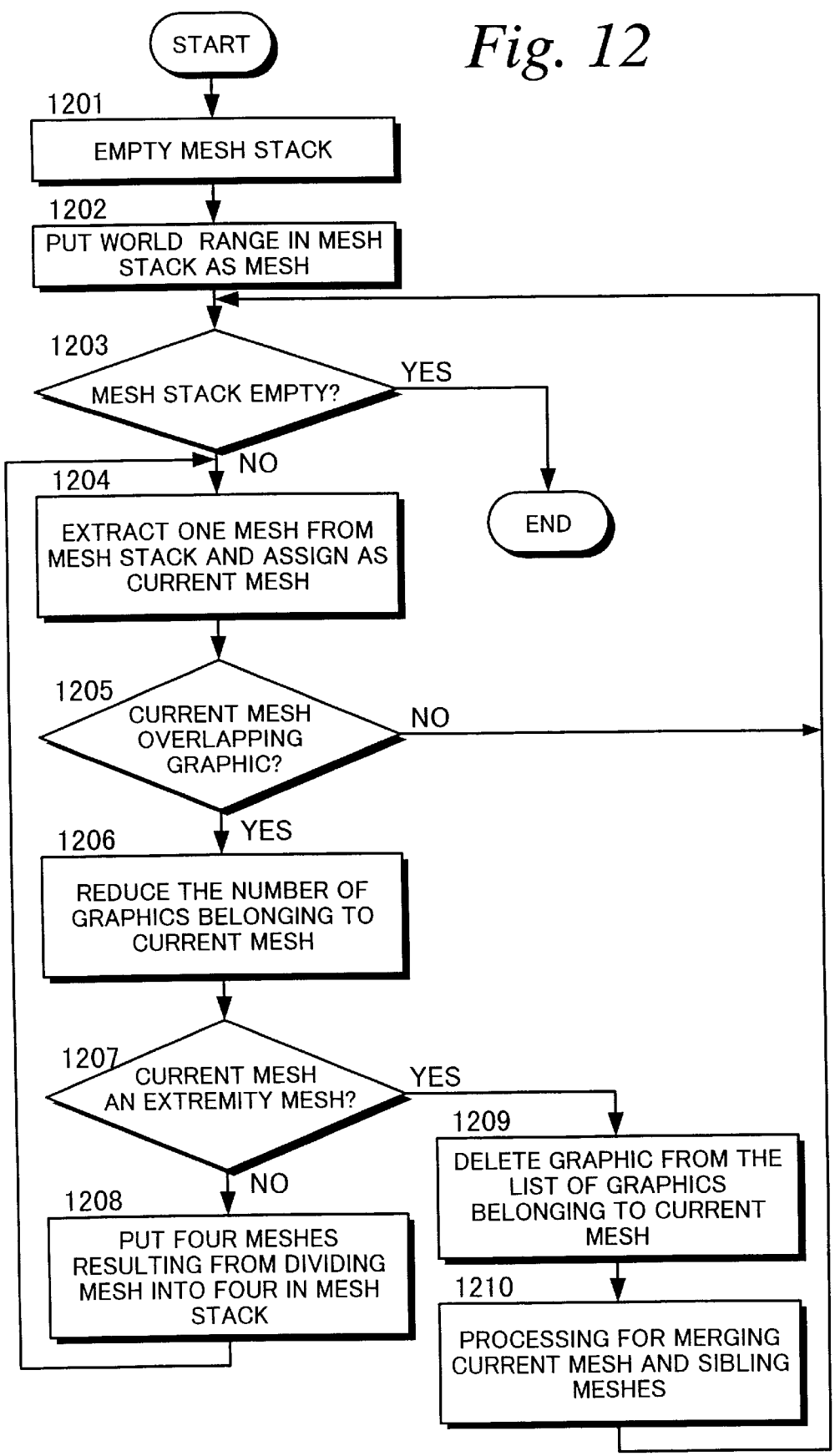
FIG. 12 is a flowchart illustrating the flow of the processing for deleting a graphic from meshes.

The processing for deleting a specified graphic from a mesh is executed by following the procedure illustrated in the flowchart in FIG. 12. The following is a step-by-step explanation of this processing (also see FIG. 5).

In the case of this example, it is assumed that the world range is divided once and only five meshes, the world range 1 and its four child meshes 4–7, exist.

(Step 1201)

The mesh stack is emptied.

(Step 1202)

The world range (the mesh number of the world range 1) is put into the mesh stack.

(Step 1203)

A decision is made as to whether or not the mesh stack is empty and if it is empty, this processing ends. If, on the other hand, it is not empty, the operation proceeds to the next step. Since, in this case, the world range 1 has been put into the stack in the previous step, the operation proceeds to the next step.

(Step 1204)

One mesh is extracted from the mesh stack and is assigned as the current mesh. In other words, the world range 1 is extracted in this case.

(Step 1205)

A decision is made as to whether or not the current mesh and the graphic overlap and if there is no overlap, the operation returns to step 1203. If, on the other hand, there is an overlap, the operation proceeds to the next step. Since the world range 1 overlaps the graphic "a" in this case, the operation proceeds to the next step.

(Step 1206)

The number of graphics belonging to the current mesh is reduced. In this case, the number of graphics belonging contained by mesh status data in the world range 1 is reduced by 1 to correspond to one graphic, i.e., the graphic "a".

(Step 1207)

A decision is made as to whether or not the current mesh is an extremity mesh, and if it is an extremity mesh, the operation proceeds to step 1209. If it is not an extremity mesh, the operation proceeds to step 1208. In this case, since, if the world range 1 has already been divided into the meshes 4–7, which are extremity meshes, the current mesh, i.e., the world range 1, is not an extremity mesh, the operation proceeds to step 1208.

(Step 1208)

The four meshes achieved by dividing the current mesh into four are put into the mesh stack and the operation returns to step 1204. In this case, the meshes 4–7 achieved by dividing the world range 1 into four are put into the mesh stack and the operation returns to step 1204. Then, in step 1204, the meshes are extracted from the mesh stack one by one sequentially to be assigned as the current mesh, and the processing performed in steps 1205–1207 is executed for each mesh.

In this example, the mesh 7 is extracted from the mesh stack, and is assigned as the current mesh before the operation proceeds to step 1205. Since, as shown in FIG. 5, this mesh 7 overlaps the graphic "a" to be deleted, the operation proceeds to step 1206 and step 1207, and in step 1207, the mesh 7 is determined to be an extremity mesh before the operation proceeds to step 1209.

(Step 1209)

The graphic is deleted from the list of graphics belonging to the current mesh. In this embodiment, the pointer that indicates data area storing the graphic is deleted from the list.

(Step 1210)

The "processing for mesh merging," which is to be explained later, is performed for the current mesh, and then the operation returns to step 1203. In this example, since none of the other meshes 6, 5 and 4 overlap the graphic "a," the processing in steps 1203–1205 is repeated sequentially, and when the check on all the extremity meshes is completed, the mesh stack will have become empty in step 1203, upon which this processing ends. Ultimately, the graphic "a" is deleted from the extremity mesh 7.

It is to be noted that since, if the current mesh is merged during the "processing for mesh merging" to be explained later, the parent mesh (the world range 1) becomes the current mesh. The graphic "a" which has been deleted from the list of graphics belonging to the mesh 7 in step 1209 is also deleted from the parent mesh 1, thereby reducing the number of graphics belonging to the parent mesh by one.

(3_2_5) Processing for Modifying Graphic Data in the Data Area

Figure 13:
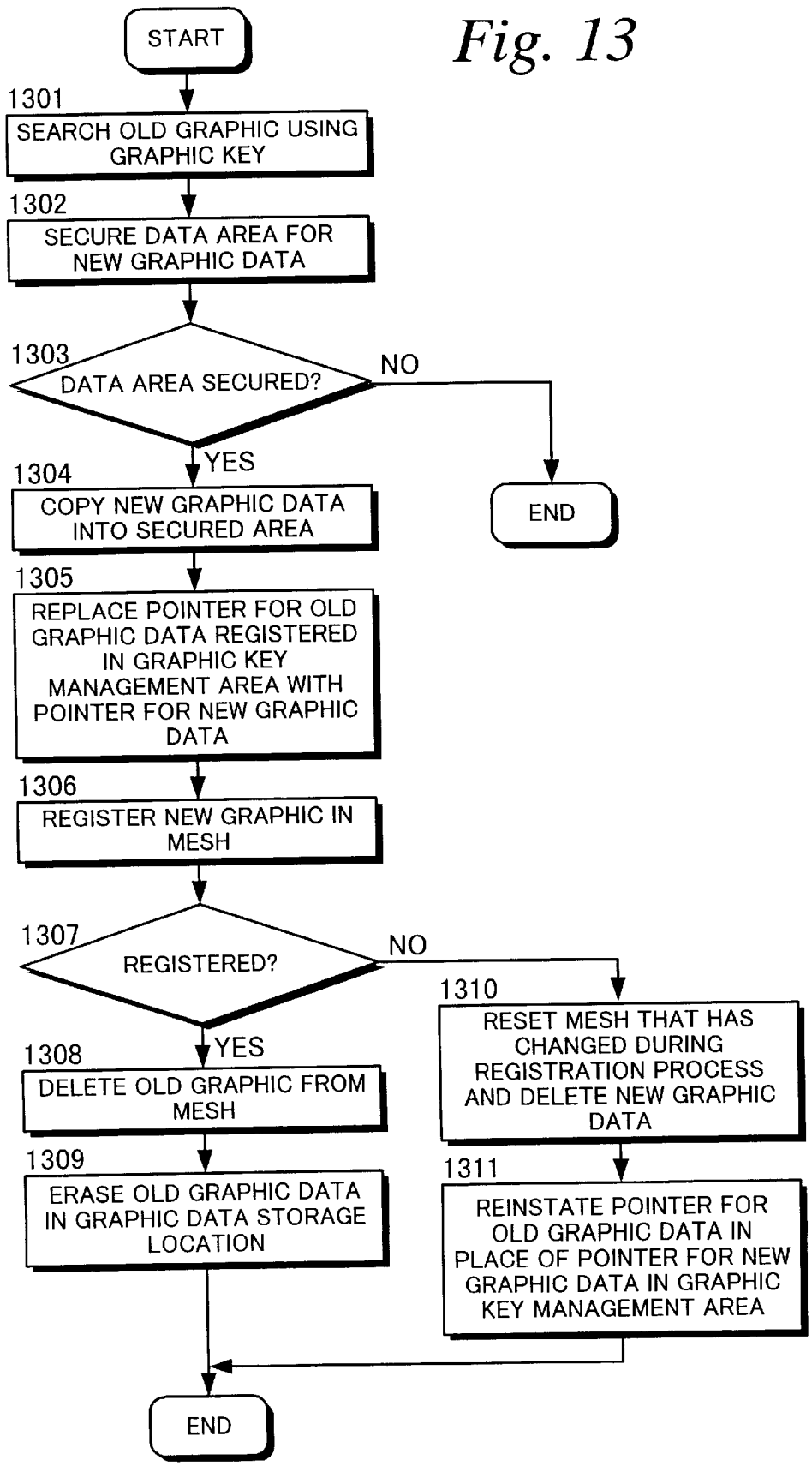
FIG. 13 is a flowchart illustrating the flow of the processing for modifying a graphic.

The processing for modifying the graphic data stored in the data area is executed by following the procedure illustrated in the flowchart in FIG. 13. It is to be noted that the graphic key employed for identifying a graphic does not change before and after a modification. The following is a step-by-step explanation of this processing.

(Step 1301)

The old graphic, which is to be modified, are searched using the graphic key.

(Step 1302)

A data area for storing a new graphic after a modification is secured.

(Step 1303)

A decision is made as to whether or not the data area has been secured and if it has been secured, the operation proceeds to the next step. If, on the other hand, the data area has not been secured, the new graphic cannot be registered into the data area and this processing ends.

(Step 1304)

The new graphic data are copied into the secured data area.

(Step 1305)

The pointer that is stored in the graphic key management area and indicates the old graphic data is replaced with the pointer that indicates the new graphic data.

(Step 1306)

The new graphic is registered in meshes. This procedure is in reference to FIG. 10.

(Step 1307)

A decision is made as to whether or not the new graphic has been registered in meshes and if it has been registered, the operation proceeds to step 1308, whereas if it has not been registered, the operation proceeds to step 1310.

(Step 1308)

The old graphic is deleted from meshes.

(Step 1309)

The old graphic data at the graphic data area are cleared, and the processing ends.

(Step 1310)

If the new graphic has not been registered in the meshes where it is registered in step 1307, meshes that has changed during the registration processing is reset to its original state before this modification procedure executes, and the new graphic data are deleted.

(Step 1311)

The pointer for the old graphic data is reinstated in place of the pointer for the new graphic data which has replaced the old pointer in the graphic key management area, and the processing ends. In other words, if the modified new graphic has not been registered at the end of this process, all the data are reset to their original state before this modification.

(3_2_6) Processing for Mesh Division

Figure 14:
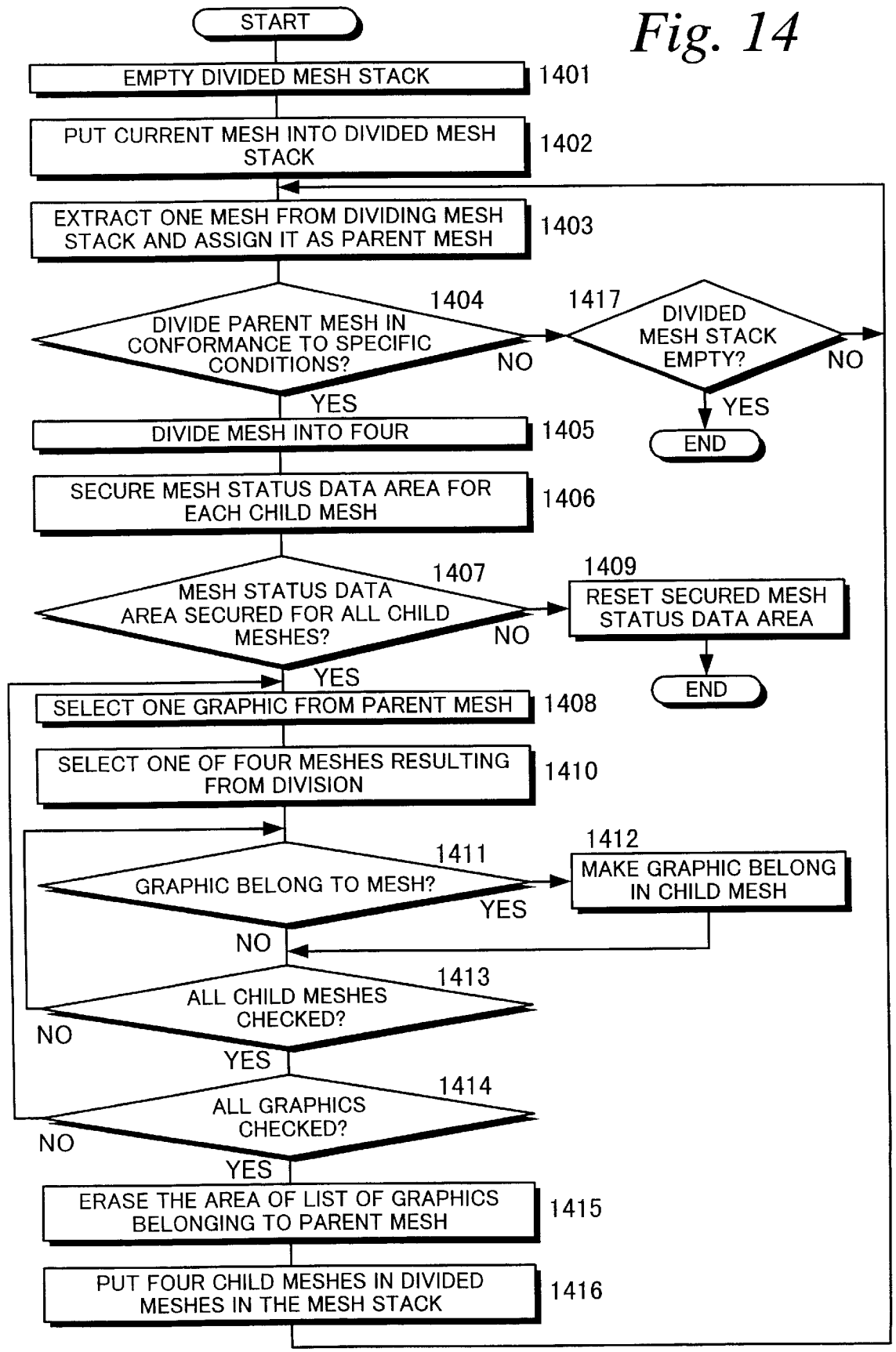
FIG. 14 is a flowchart illustrating the flow of the processing for dividing a mesh.

The processing for mesh division, which is executed when the number of graphics registered in an extremity mesh exceeds a specific value, is executed by following the procedure illustrated in the flowchart in FIG. 14. The following is a step-by-step explanation of this processing.

(Step 1401)

The divided mesh stack is emptied.

(Step 1402)

The current mesh is put into the divided mesh stack.

(Step 1403)

One mesh is extracted from the divided mesh stack and is assigned as a parent mesh.

(Step 1404)

In conformance to the specific conditions for division explained elsewhere, a decision is made as to whether or not the parent mesh should be divided, and if it is decided that it should be divided, the operation proceeds to the next step 1405. If, on the other hand, it is decided that it should not be divided, the operation proceeds to step 1417, in which a decision is made as to whether or not the divided mesh stack is empty. If it is empty, the processing ends, whereas if it is not empty, the operation returns to step 1403.

(Step 1405)

If it has been decided that the parent mesh should be divided in step 1404, the mesh is divided into four.

(Step 1406)

Mesh status data for the individual child meshes achieved through the division into four areas are secured.

(Step 1407)

A decision is made for each of the child meshes as to whether or not a mesh status data area for it has been secured, and if mesh status areas have been secured for all of them, the operation proceeds to the next step, whereas if at least one mesh status data area has not been secured for any one of the four meshes, the operation proceeds to step 1409.

(Step 1408)

If the mesh status data areas have been secured for all the meshes resulting from the division into four, this step is executed. One graphic is selected from the graphics in the list of graphics belonging to the parent mesh.

(Step 1409)

If it is decided in step 1407 that at least one mesh status data area has not been secured for any one of the four meshes in step 1407, the processing for dividing the mesh into four cannot be performed, and thus, the secured mesh status data area is set into its original state before ending the processing.

(Step 1410)

One child mesh is selected from the meshes that have been created by the division into four.

(Step 1411)

A decision is made as to whether or not the graphic selected in step 1408 overlaps the selected child mesh, and if they overlap, the operation proceeds to step 1412, whereas if they do not overlap with each other, the operation proceeds to step 1413.

(Step 1412)

If it has been decided in step 1411 that the graphic overlaps with the child mesh, the graphic is registered in the child mesh. More specifically, the number of graphics belonging to the child mesh is increased and is added to the list of belonging graphics.

(Step 1413)

If it has been decided in step 1411 that the graphic does not overlap with the child mesh, a decision is made as to whether or not the processing performed in step 1407 and step 1412 has been performed for all the child meshes, and if the processing has not been performed for any one of the child meshes, the operation returns to step 1410. If, on the other hand, the processing has been completed for all the child meshes, the operation proceeds to the next step.

(Step 1414)

A decision is made as to whether or not the processing performed in steps 1410–1413 has been performed for all the graphics registered in the parent mesh, and if the processing has not been performed for any one of the graphics, the operation returns to step 1408, whereas if the processing has been completed for all the graphics, the operation proceeds to the next step.

(Step 1415)

After the processing for all the graphics registered in the parent mesh is completed as described above, the data area corresponding to the list of graphics belonging to the parent mesh is cleared.

(Step 1416)

The four child meshes are put into the divided mesh stack and the operation returns to step 1403.

(3_2_7) Processing for Mesh Merging

Figure 15:
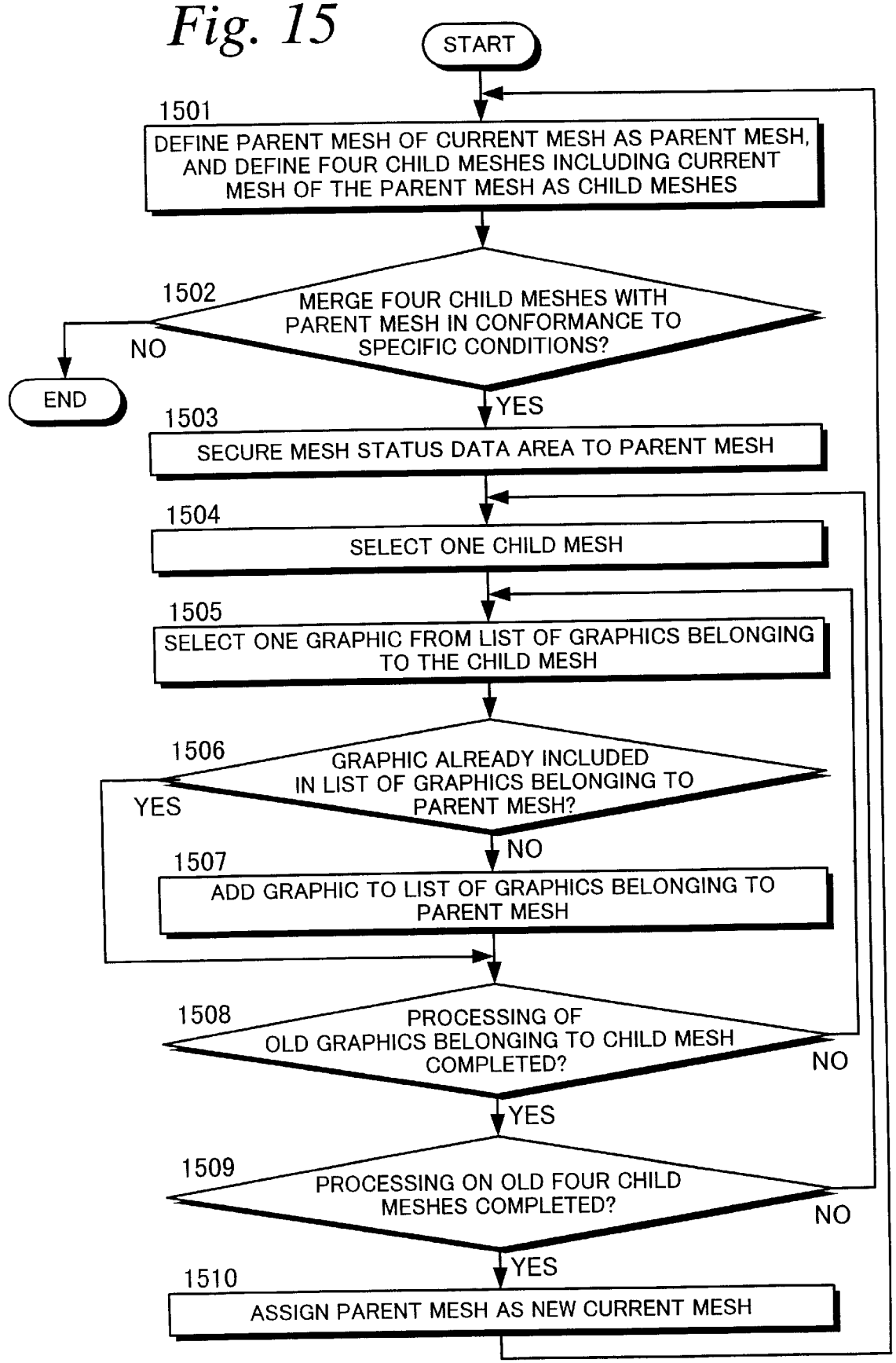
FIG. 15 is a flowchart illustrating the flow of the processing for merging meshes.

The processing for mesh merging, which is performed when the number of graphics registered in an extremity mesh is at or smaller than a specified value, is executed by following the procedure illustrated in the flowchart in FIG. 15. The following is a step-by-step explanation of this processing.

(Step 1501)

The parent mesh of the current mesh is defined as the "parent mesh" and the four child meshes of the parent mesh, which include the current mesh, are assigned as "child meshes" (four meshes).

(Step 1502)

In conformance to the specific conditions for merging explained elsewhere, a decision is made as to whether or not the four child meshes should be merged with the parent mesh, and if they should be merged, the operation proceeds to the next step 1503. If, on the other hand, they should not be merged, this processing ends.

(Step 1503)

If it has been decided in step 1502 that they should be merged with the parent mesh, a mesh status data area is secured for the parent mesh.

(Step 1504)

One of the child meshes is selected.

(Step 1505)

One graphic is selected from the list of graphics belonging to the selected child mesh.

(Step 1506)

A decision is made as to whether or not the graphic is already included in the list of graphics belonging to the parent mesh, and if it is not included, the operation proceeds to the next step, whereas if it is already included, the operation proceeds to step 1508.

(Step 1507)

The graphic is added to the list of graphics belonging to the parent mesh.

(Step 1508)

A decision is made as to whether or not all the graphics belonging to the selected child mesh have been processed, and if there are still any unprocessed graphics, the operation returns to step 1505, whereas if the processing is completed for all the graphics, the operation proceeds to the next step.

(Step 1509)

A decision is made as to whether or not the processing has been performed for all four of the child meshes and if there are any unprocessed child meshes, the operation returns to step 1504, whereas if the processing has been completed for all the child meshes, the operation proceeds to the next step.

(Step 1510)

The parent mesh is assigned as the new current mesh and the operation returns to step 1501.

(3_3) Advantages of the First Embodiment

The first embodiment structured as described above achieves the following advantages. Namely, since mesh division is implemented based upon the data density so that the sizes of meshes change, wasted data area is reduced and it becomes possible to handle the data in main memory. In addition, since the division is managed with a quad-tree, meshes can be accessed smoothly, and through search which is implemented by descending the hierarchy, unnecessary condition decision making can be reduced.

In addition, since, if mesh divisions are performed infinitely, the data area is consumed exponentially, setting limits to the allowable level of division means that the data area can be used economically. Moreover, since meshes are merged and mesh divisions are canceled, when the number of sets of data per mesh is small, the division level that is suitable for the data density can be maintained. Furthermore, by canceling mesh divisions, the data area no longer in use can be reused. Also, since graphic data constituted of combinations of sub-graphics are made to belong to meshes in units of sub-graphics, even more data area can be saved.

Thus, with the multidimensional data management apparatus in this embodiment, since a great deal of data area can be saved, data can be handled in the main memory of a computer, thereby achieving fast data access.

(3_4) Variation of the First Embodiment

While both the means for mesh division 12 and the means for division decision-making 13, and both the means for mesh merging 14 and the means for merging decision-making 15 are provided in the first embodiment as shown in FIG. 1, only a combination of either one of those pairs of means may be provided.

(4) Second Embodiment

In the second embodiment, quad-tree nodes, mesh status data, graphic search key data and graphic data are located in the storage area for utilization as in the first embodiment. It differs from the first embodiment in that a list of belonging graphics is also included in the status data of meshes that are divided, i.e., meshes other than extremity meshes. In other words, by registering graphic data in intermediate nodes corresponding to divided meshes in the quad-tree structure, the graphics registered in divided meshes as well as the graphics registered in extremity meshes become objects of the search. In addition, graphics are registered in divided meshes by leaving graphics in a parent mesh that are not suitable for being registered in child meshes of the parent mesh when dividing an extremity mesh as the parent.

In the second embodiment, the methods of registering graphics in meshes, of dividing meshes into four, of deleting graphics from meshes and of merging meshes are changed from those in the first embodiment as follows.

In the second embodiment, in which the list of belonging graphics is included in the status data of a divided mesh, the state in which graphics are actually registered in the list is achieved through processing with the following mesh division flow. This division processing, which is different from that in the first embodiment, is characterized in that when switching the location where a graphic belongs from a parent mesh to a child mesh, all the graphics belonging to the parent mesh are not necessarily relocated to the child mesh unconditionally but rather only those graphics that are determined to be suited to be relocated to the child mesh in reference to specific conditions are relocated, and graphics that are determined to be unsuitable for such a move are left belonging to the parent mesh (see FIGS. 16, 5 and 6).

The specific conditions employed in the decision making as to whether or not "a graphic may be relocated to child meshes in conformance to specific conditions (conditions for graphic registration change)" during this process result in the reduction of multiple registrations of a given graphic in a plurality of meshes compared to a situation in which graphics are relocated to a child mesh unconditionally, and the following conditions, for instance, may be used. It is to be noted that these conditions may be employed singularly or a plurality of them may be used in combination.

(a) The graphic does not contain the parent mesh completely.
(b) The number of child meshes the graphic lies astride is two at the most.
(c) With the upper limit of the number of meshes where multiple registration is allowed is determined in advance for each graphic, the number of multiple registrations is equal to or smaller than the upper limit even when the graphic is registered in (relocated to) child meshes.
(d) With the size of the smallest mesh into which a graphic can be registered determined in advance in reference to attributes such as the type and the size of the graphic, the size of the child mesh is equal to or larger than the minimum mesh size.

By conforming to these conditions, the increase in the number of meshes where graphics are registered through mesh division is limited and, at the same time, since the number of graphics whose registrations are changed to child meshes is reduced, the division processing itself is faster. For instance, by setting the minimum size of a mesh where a graphic may be registered in advance in correspondence to the graphic's area (size) and shape and by proceeding with graphic registration while performing decision making employing the condition (d), even at an advanced stage of mesh division, the number of meshes into which a given graphic will be registered is equal to or smaller than the number in proportion to the area (size) of the graphic and only in meshes the sizes of which are equal to or larger than the minimum mesh size preset for the graphic. Thus, excessive multiple registrations are prevented to save storage area and, at the same time, preventing any reduction in the speed of search processing.

For instance, for a rectangular shaped graphic, the smallest mesh whose short side is still longer than the short side of the graphic may be set as the smallest mesh where the graphic can be registered. With this method, since a thin rectangle will belong to a great number of meshes whose sides are small in the lengthwise direction, the likelihood of that graphic being selected as the ultimate result of a search when that mesh has been selected during the search increases, thereby improving the search efficiency. If the same graphic is made to belong to a meaninglessly large higher-order mesh, the likelihood of the mesh being selected will be high but, at the same time, the likelihood of the graphic being selected as the ultimate result of the search will decrease, which may result in poor efficiency of search. While, in this method, a graphic is registered overlapping in a certain number of meshes in a predictable range, the storage area is still not wasted limitlessly and the efficiency of search will not be reduced either. A rectangle whose vertical and horizontal sides are not too different from each other will only have to belong to several meshes, even when the overlapping is at a maximum. An advantage in adopting this method is that when the mesh to which a graphic belongs is selected during a search, the likelihood of that graphic being selected as the ultimate result of the search will not vary greatly between a thin rectangle and a rectangle that is not thin.

A similar advantage as that achieved when handling a thin graphic is also achieved when handling a line segment. For instance, a method that assigns the smallest mesh whose short side is equal to or greater than 1/n of the length of the line segment as the smallest mesh where that line segment can be registered, may be adopted. With this method, the line segment will only be registered in fewer than 4n meshes.

When condition (c) is employed, since the number of meshes in which a given graphic can be registered overlapping is limited, storage area can be saved extremely effectively. Moreover, since the sizes of the meshes to which it belongs may vary and divisions will be performed in correspondence to the density of graphics as long as the multiple registrations do not exceed the upper limit, registration can be made in even smaller meshes, thereby achieving an improvement in search efficiency.

(4_1) Structure of the Second Embodiment

Figure 17:
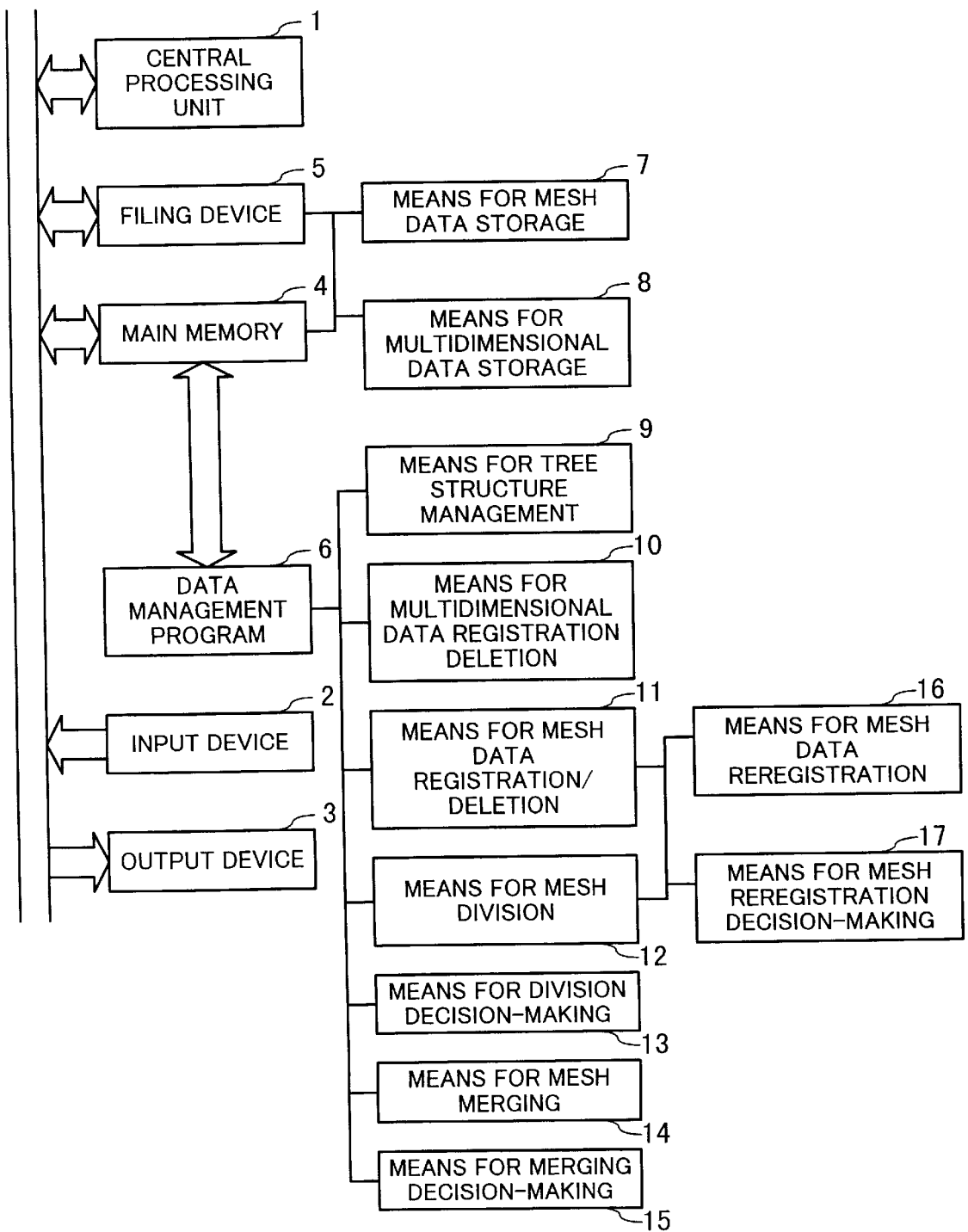
FIG. 17 is a functional block diagram illustrating the structure of the second embodiment of the present invention.

FIG. 17 is a functional block diagram illustrating the structure of the second embodiment of the present invention. Namely, the multidimensional data search apparatus in this embodiment is characterized in that it is provided with a means for mesh data reregistration 16 and a means for reregistration mesh decision-making 17 in association with the means for mesh data registration/deletion 11 and the means for mesh division 12, in addition to the components of the multidimensional data management apparatus in the first embodiment. The means for mesh data reregistration 16 reregisters data in either a child mesh resulting from the division of an extremity mesh or the parent mesh (i.e., the extremity mesh) resulting from this division. In addition, the means for reregistration mesh decision-making 17 makes a decision as to whether the multidimensional data are to be reregistered in a child mesh resulting from a division or in the parent mesh in which the data were formerly registered in conformance to a condition set for reducing multiple registration of a given graphic into a plurality of meshes.

As the condition for preventing multiple registrations, the means for reregistration mesh decision-making 17 may employ one of the following.

(a) The multidimensional data do not include the parent mesh completely.

(b) The number of child meshes where the multidimensional data to be registered is equal to or smaller than a preset value.

(c) With the upper limit of the number of meshes where multiple registrations can be made set for each set of multidimensional data, the number of multiple registrations is equal to or smaller than this upper limit even when a registration in a child mesh is made.

(4_2) Functions of the Second Embodiment

Figure 18:
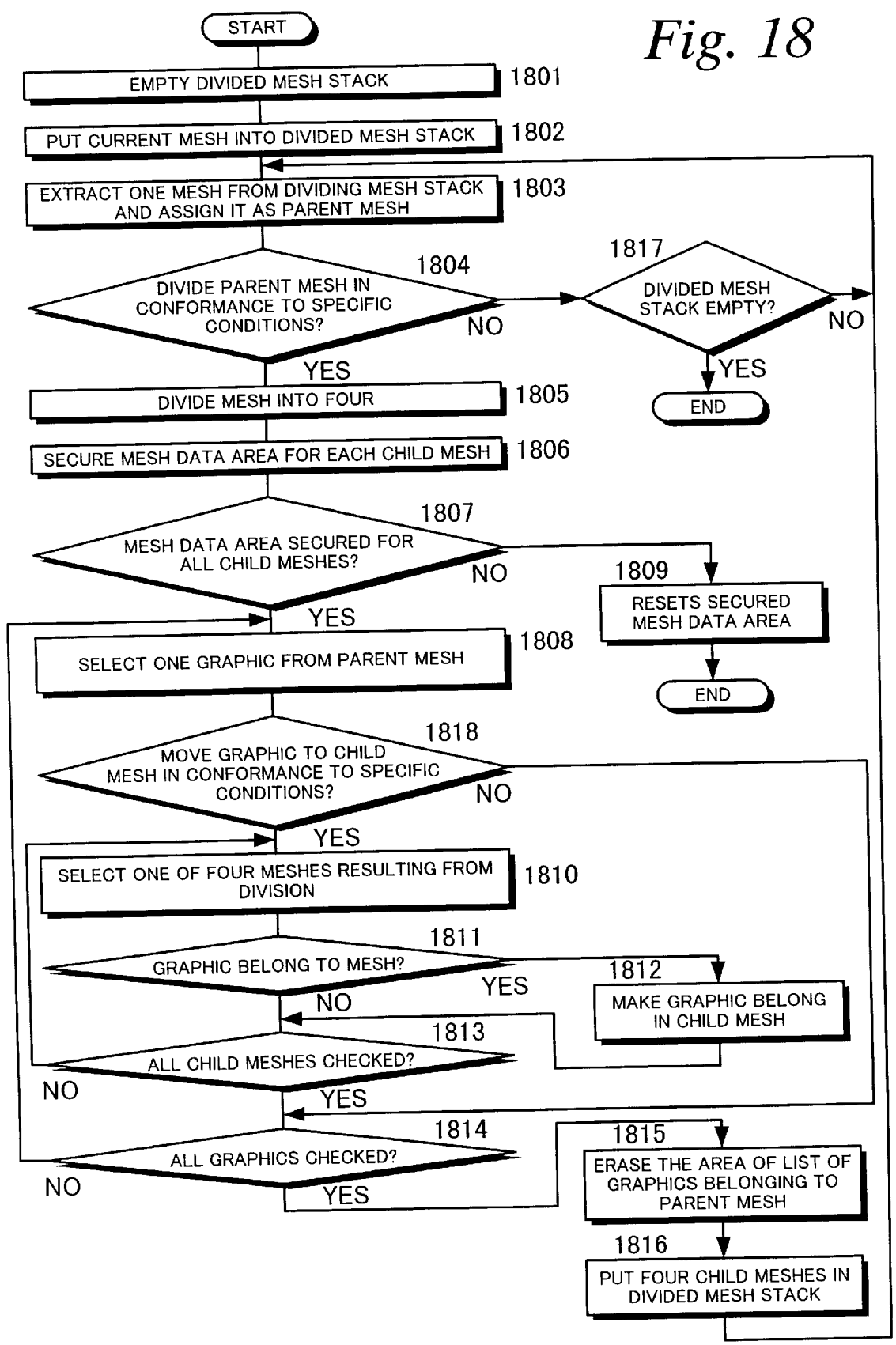
FIG. 18 is a flowchart illustrating the flow of the processing performed in the second embodiment.

In relation to the functions of the multidimensional data management apparatus in the second embodiment structured as described above and the corresponding multidimensional data management method, the first method for registering graphic data in intermediate nodes is explained in reference to FIGS. 6 and 7, which illustrate the relationship between the tree structure and the meshes and the flowchart presented in FIG. 18.

It is to be noted that this first method for registering graphic data in intermediate nodes (meshes) is achieved by leaving graphics that are not suited to be registered in child meshes in the parent mesh that corresponds to an intermediate node in the "processing for dividing extremity meshes" explained in reference to the first embodiment. In addition, since the flowchart presented in FIG. 18 is identical to the flowchart of the "mesh division processing" illustrated in FIG. 14 except that a partial addition (step 1818) is made in it, only the difference is explained below.

(Step 1818)

As shown in FIG. 18, a decision is made in step 1808 as to whether or not a graphic selected from the graphics registered in the parent mesh may be relocated to child meshes in conformance to the conditions for registration change for graphics that have been explained elsewhere, and if it is decided that the graphic may be relocated to child meshes, the operation proceeds to step 1810. A,s a result, through the processing performed in steps 1810–1812, the graphic is registered in the child meshes. If, on the other hand, it is decided that it is not suitable to move the graphic to the child meshes in step 1818, the operation proceeds to step 1814. Consequently, the graphic is not registered in the child meshes and is left registered in the parent mesh. Then, in step 1814, a decision is made as to whether or not the processing performed in step 1818 and steps 1810–1813 has been executed for all the graphics having been registered in the parent mesh.

(4_3) Variation of the Second Embodiment

While, in the second embodiment, the means for mesh division 12 in combination with the means for division decision-making 13, and the means for mesh merging 14 in combinations with the means for merging decision-making 15 are provided as shown in FIG. 17, only either one set of means can be applicable and effective.

(5) Third Embodiment

In the third embodiment, while graphics are also registered in already divided meshes as in the second embodiment, they are registered by selecting appropriate meshes at the time of graphic registration instead of at the time of division and/or merging of extremity meshes. In other words, in the third embodiment, while a list of belonging graphics is included in the status data of a divided mesh, this state is directly achieved through the processing of graphic registration and does not occur as a result of attached processing, i.e., neither division nor merging.

It is to be noted that in the third embodiment, the processing for mesh division does not have to be performed recursively and it may also be implemented by simply creating four child meshes and leaving the list of graphics belonging to the child meshes empty without relocating registered graphics from the parent mesh. However, it goes without saying that the processing may be performed by taking into consideration specific conditions to allow division, and by relocating a graphic that satisfies a specific condition to a child mesh, as in the second embodiment.

The specific conditions used in the third embodiment for decision making as to whether or not "a graphic may be registered in the current mesh in conformance to specific conditions (conditions for graphic registration change)" may be as follows (see FIGS. 19 and 20).

(a) There are three or more child meshes of the current mesh where a graphic overlaps.

(b) With the minimum size of a mesh where a graphic may be registered determined in advance depending upon attributes such as the type and the size of the graphic, the size of the child meshes of the current mesh is smaller than this smallest mesh.

(c) With the maximum size of a mesh where a graphic may be registered determined in advance depending upon attributes such as the type and the size of the graphic, the size of the parent mesh of the current mesh exceeds this largest mesh.

(d) With an upper limit on the number of meshes where multiple registrations can be made determined in advance for each graphic, the upper limit of the number of multiple registrations will be exceeded if a registration is made in child meshes.

(e) The area of the graphic occupies equal to or more than α % of the current mesh. In the cases of a line segment or the like which does not occupy any area, the distance from the center of the current mesh is at or less than β % of the length that is ½ of the short side of the mesh.

One of these conditions may be employed by itself or a plurality of them may be used in combination to be satisfied all together to result in an affirmative decision. Or, a plurality of them may be used in combination to result in an affirmative decision if at least one of them is satisfied.

Figure 19:
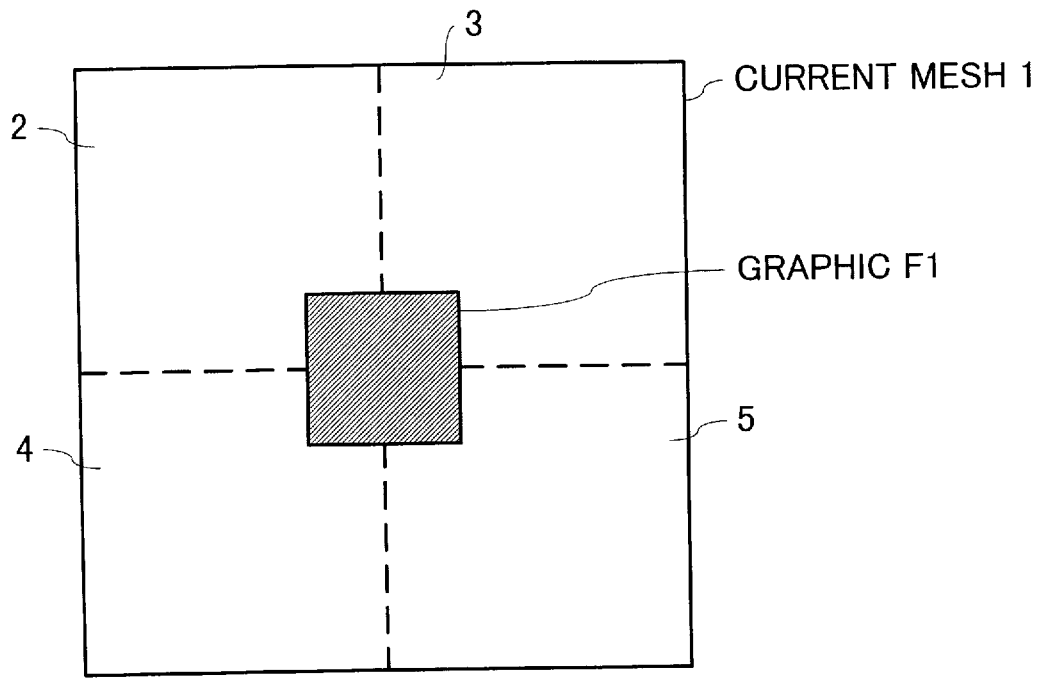
FIG. 19 is an illustration of a condition adopted when registering a graphic in an intermediate mesh as well.
Figure 20:
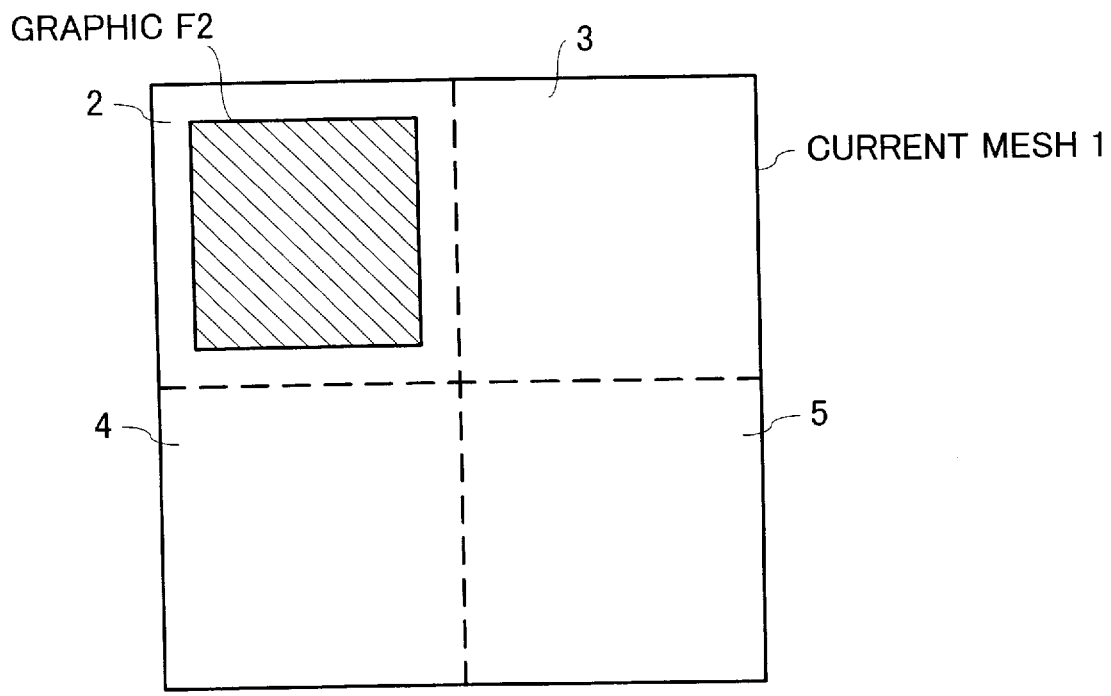
FIG. 20 is a condition adopted when registering a graphic in an intermediate mesh as well.

For instance, when conditions (a) and (e) are used in combination to be satisfied together for an affirmative decision, if α is set at, for instance, 10%, the graphic F1 is prompted to belong to a smaller mesh than the current mesh since, as shown in FIG. 19, while the graphic F1 overlaps all the child meshes 2–5, it is much smaller than the current mesh 1 and it does not, therefore, satisfy the condition (e). In addition, since the graphic F2, which has a relatively large area relative to the mesh, is present in the periphery of the current mesh having an area equal to or more than 10% of the current mesh, as shown in FIG. 20, it does not satisfy the condition (a) and thus, is prompted to belong to a smaller mesh.

Since a graphic is registered in a parent mesh only when the graphic includes the center of the mesh and occupies a certain portion of the mesh in this manner, an advantage is achieved in that, a higher degree of efficiency is achieved with a range for graphic search narrowed in the nearest neighbor graphic search procedure, which is to be detailed later.

In addition, by setting the condition (b) as appropriate for each graphic, it is possible to prevent a given graphic from belonging to an excessively large mesh relative to its size to reduce the efficiency in search. Furthermore, by setting the condition (c) as appropriate for each graphic, it is possible to prevent a graphic from becoming registered in a great number of meshes which are excessively small in comparison to its size, thereby achieving a higher degree of efficiency in search and economical utilization of the storage area.

It is to be noted that the conditions (b) and (e) need not be set depending only on the attributes of graphics but on a number of variations in reference to the status at the mesh side, such as the number of graphics belonging to the current mesh.

As has been explained, in the third embodiment, by setting conditions that correspond to the attributes of graphics as specific conditions related to the registration, advantages are achieved in that multiple registrations of a graphic into meshes become limited and in that a higher degree of efficiency in search procedure is achieved.

The third embodiment is characterized in that, in the data management method and the data management apparatus in which data are managed in correspondence to the structure of one tree, when registering various graphics at individual nodes constituting the tree structure, different conditions are adopted for individual graphics or for different types of graphics through a single procedure, and in comparison to the quad-tree method and its variations in the past, in which division is implemented uniformly when registering graphics at intermediate nodes regardless of the attributes of the graphics, more efficient utilization of the storage area and a higher speed in the search processing are achieved.

(5_1) Structure of the Third Embodiment

Figure 21:
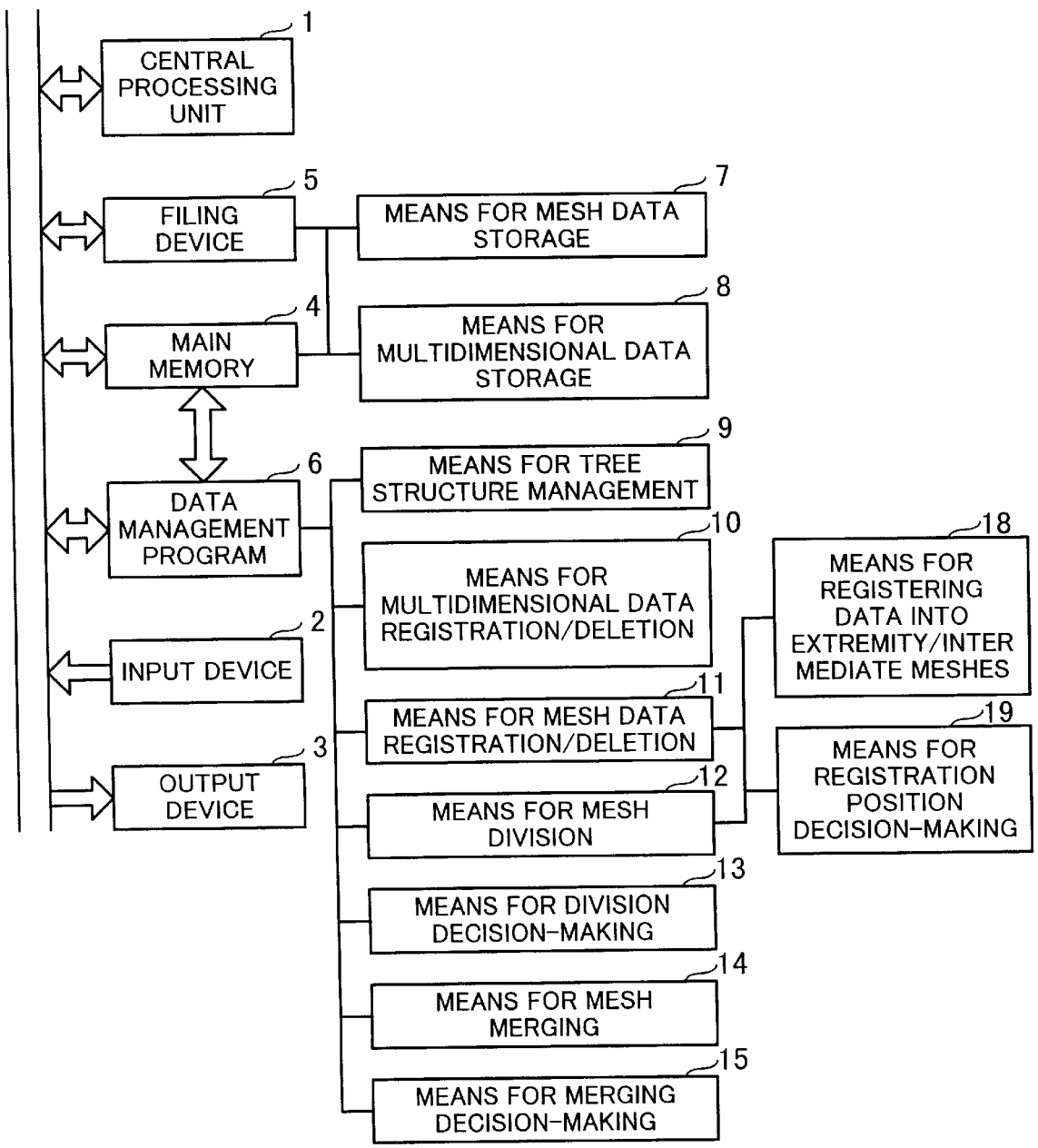
FIG. 21 is a functional block diagram illustrating the structure of the third embodiment of the present invention.

FIG. 21 is a functional block diagram illustrating the structure of the third embodiment of the present invention. Namely, the multidimensional data search apparatus in this embodiment is characterized in that in addition to the components of the multidimensional data management apparatus in the first embodiment, a means for data registration 18 that registers data in extremity meshes or intermediate meshes and a means for registration position decision-making 19 are provided to function in association with the means for mesh data registration/deletion 11 and the means for mesh division 12. The means for data registration 18 registers multidimensional data in at least either an extremity mesh corresponding to an extremity node in the tree structure or an intermediate mesh that corresponds to the parent node of the extremity node. The means for registration position decision-making 19 makes a decision as to where the multidimensional data should be registered in the extremity mesh or the intermediate mesh in conformance to the state of the multidimensional data to be registered at the time of registration of the multidimensional data.

The means for registration position decision-making 19 may select the mesh where the multidimensional data are to be registered:

(a) in correspondence to the number of child meshes where the multidimensional data are overlapping;

(b) in conformance to the limit on the size of the mesh where the multidimensional data may be registered, which is determined in advance for each set of multidimensional data;

(c) in conformance to the set limit determined in advance on the number of meshes within which multiple registrations may be made for each set of multidimensional data; or (d) based upon the comparison of the size of the multidimensional data in the multidimensional space and the size of a specific mesh within the multidimensional space.

(5_2) Functions of the Third Embodiment

Figure 22:
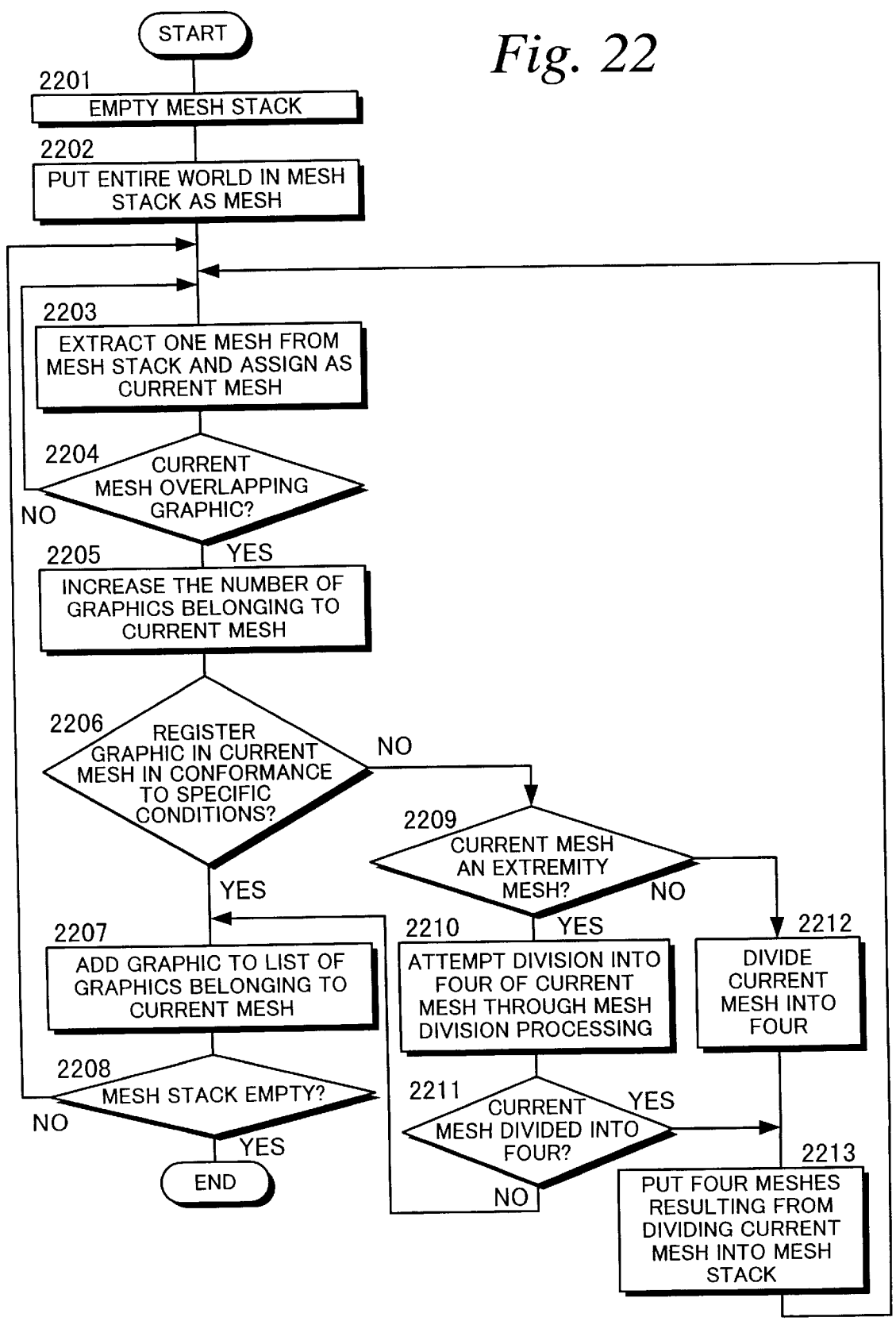
FIG. 22 is a flowchart illustrating the flow of the processing performed in the third embodiment.

The functions of the multidimensional data management apparatus in the third embodiment structured as described above and the corresponding multidimensional data management method are explained in reference to the second method for registering graphic data on intermediate nodes by following the flowchart presented in FIG. 22.

It is to be noted that in the second method for registering graphic data on an intermediate node, an appropriate mesh is selected for registration at the time of graphic registration unlike the method employed in the second embodiment. The following is a step-by-step explanation of this processing.

(Step 2201)

The mesh stack is emptied.

(Step 2202)

The entire world (the entire world 1) is put into the mesh stack as a mesh.

(Step 2203)

One mesh is extracted from the mesh stack and is assigned as the current mesh.

(Step 2204)

A decision is made as to whether or not the current mesh and the graphic to be registered and if they do not overlap, the operation returns to step 2203. If, on the other hand, they do overlap, the operation proceeds to the next step.

(Step 2205)

The number of graphics belonging to the current mesh is increased.

(Step 2206)

A decision is made as to whether or not the graphic can be registered in the current mesh in conformance to the conditions for graphic registration change which are to be detailed later, and if it can be registered, the operation proceeds to the next step 2207. If, on the other hand, it is decided that it is not appropriate to register the graphic in the current mesh, the operation proceeds to step 2209.

(Step 2207)

The graphic is added to the list of graphics belonging to the current mesh.

(Step 2208)

A decision is made as to whether or not the mesh stack is empty, and if it is empty, the processing ends. If, on the other hand, it is not empty, the operation returns to step 2203.

(Step 2209)

If it has been decided in step 2206 that it is not appropriate to register the graphic in the current mesh, a decision is made as to whether or not the current mesh is an extremity mesh, and if it is an extremity mesh, the operation proceeds to step 2210. If, on the other hand, it is not an extremity mesh, the operation proceeds to step 2212.

(Step 2210)

If it has been decided in step 2209 that the current mesh is an extremity mesh, a quad division of the current mesh is attempted through the processing for mesh division.

(Step 2211)

A decision is made as to whether or not the current mesh has been divided into four and if the division has been completed, the operation proceeds to step 2213, whereas the division has not been performed, the operation returns to step 2207.

(Step 2212)

If it has been decided in step 2209 that the current mesh is not an extremity mesh, the current mesh is divided into four.

(Step 2213)

If the current mesh has been divided into four in step 2211 and 2212, the meshes achieved by the division into four are put into the mesh stack and the operation returns to step 2203.

(5_3) Variation of the Third Embodiment

Instead of dynamically dividing/merging meshes, the apparatus or method disclosed in the third embodiment can have a set of appropriately divided meshes in the initial state and do without all the means for dividing and merging (12, 13, 14, and 15). In these cases, means for dividing (12 and 13) and means for merging (14 and 15) can both be applicable and be selectively omitted.

(6) Fourth Embodiment

Rectangle search refers to searching out all the graphics within the frame of a given rectangle. More specifically, when a rectangle and meshes within the range of the world coordinates are given, a decision is made in regard to the presence/absence of overlaps of the rectangle and meshes and the meshes that overlap the rectangle are determined. Next, a decision is made as to the presence/absence of overlaps of areas of graphics registered in the meshes and the rectangle, and all the graphics being present within the given rectangle area are searched.

(6_1) Structure of the Fourth Embodiment

Figure 24:
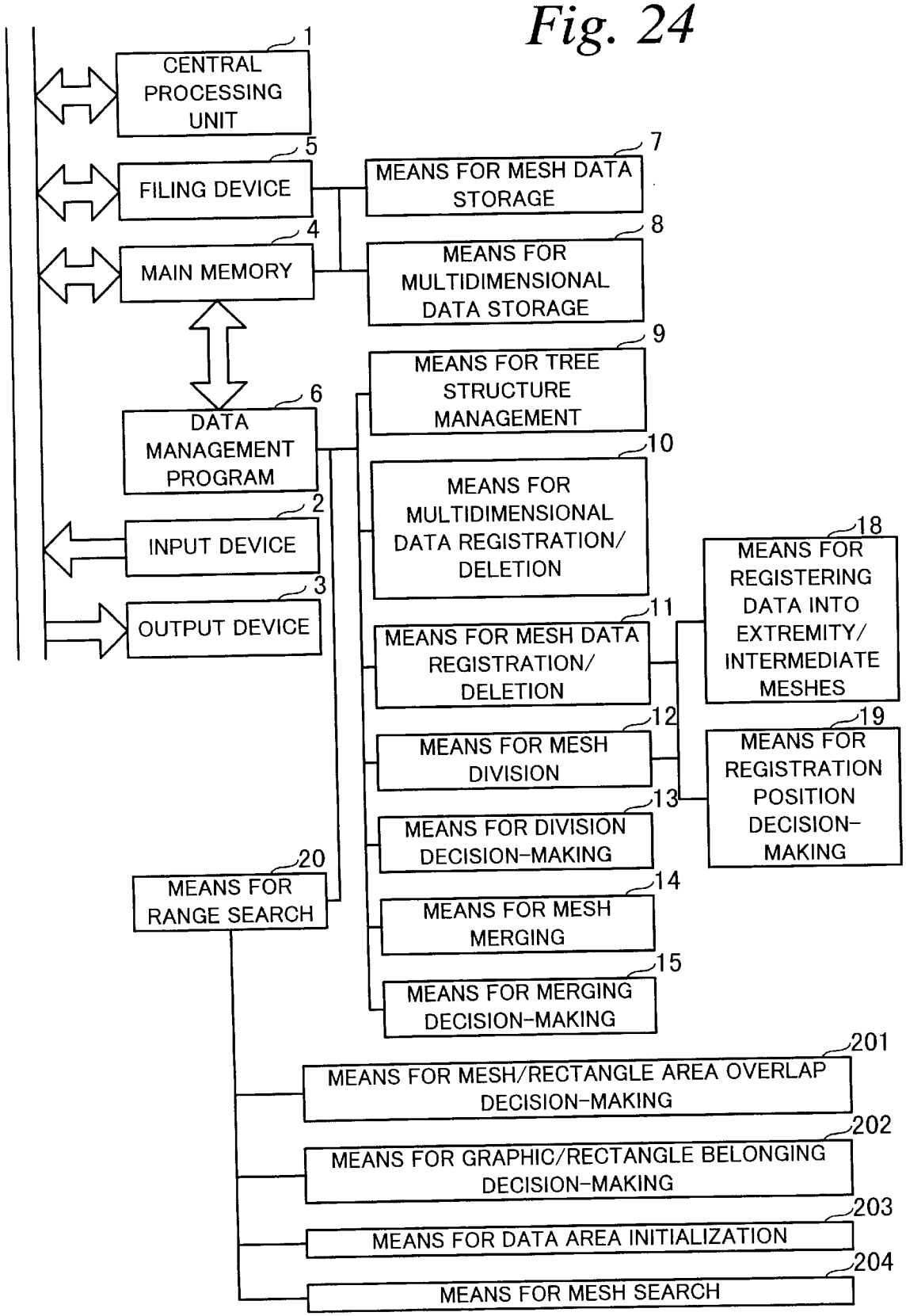
FIG. 24 is a functional block diagram illustrating the structure of the fourth embodiment of the present invention.

FIG. 24 is a functional block diagram illustrating the structure of the fourth embodiment of the present invention. Namely, the multidimensional data search apparatus in this embodiment is characterized in that in addition to the components of the multidimensional data management apparatuses in the individual embodiment previously explained, the apparatus that manages multidimensional data accumulated within the storage area of the computer includes a means for range search 20 that searches multidimensional data belonging to a specified area within the multidimensional space.

This means for range search 20 comprises a means for mesh/rectangle area overlap decision-making 201 that makes a decision as to whether or not areas of a mesh and a rectangle overlap by using the coordinates of the mesh and the coordinates of the rectangle input by the input device 2, a means for graphic/rectangle belonging decision-making 202 that makes a decision as to whether or not a graphic is present within a rectangle by using the coordinates of the graphic data and coordinates of the rectangle, a means for data area initialization 203 that initializes the data area when storing a fixed parameter, creating an initial quad-tree (a quad-tree provided with a root node only) or constituting a graphic key management area in the data area and a means for mesh search 204 that searches for an extremity mesh that includes a given one point.

The results of the search performed by this means for range search 20 are output to the output device 3. In other words, in this embodiment, the results of the search are achieved by writing the results of the search in a data area prepared in the main memory by the user of the search. This embodiment is constituted in such a manner that, in the case of a rectangle search, for instance, the list of pointers indicating the locations of the data storage areas of graphics within a rectangle is returned and in the case of nearest neighbor graphic search, the pointer indicating the data area of the nearest neighbor graphic, the distance and the nearest neighbor point are returned. It is to be noted that in reference to the means for mesh/rectangle area overlap decision-making 201, we do not use the term "overlap" to describe a mesh that is completely contained in a rectangle or a mesh that completely encloses a rectangle. Furthermore, in the means for mesh search 204, if a given point is on the boundary of meshes, the point is considered to be included in the upper right mesh, the upper mesh, the right hand side mesh, the lower mesh and the left hand side mesh, if these meshes are present. When a rectangle and a mesh within the range of the world coordinates are given, decision making can be performed by the means for mesh/rectangle area overlap decision-making 201 on overlaps of rectangles and meshes in the following four situations.

Namely, (a) a mesh includes a rectangle, (b) a mesh is included in a rectangle (c) there is an overlap of a mesh and a rectangle, and (d) there is no overlap of a mesh and a rectangle. Consequently, by utilizing this means repeatedly, all the meshes that have overlaps with rectangles can be searched. In addition, when an affirmative decision is made with respect to (a), it becomes unnecessary to make decisions with respect to other meshes and, therefore, the search does not have to be expanded in the lateral direction in the case of a quad-tree. Furthermore, if an affirmative decision is made with respect to (b) and the mesh has been divided, it is not necessary to make decisions on the four meshes resulting from the division. Thus, and advantage is achieved in that, in the case of a quad-tree, the search does not have to be extended in the vertical direction.

(6_4) Functions of the Fourth Embodiment

Figure 23:
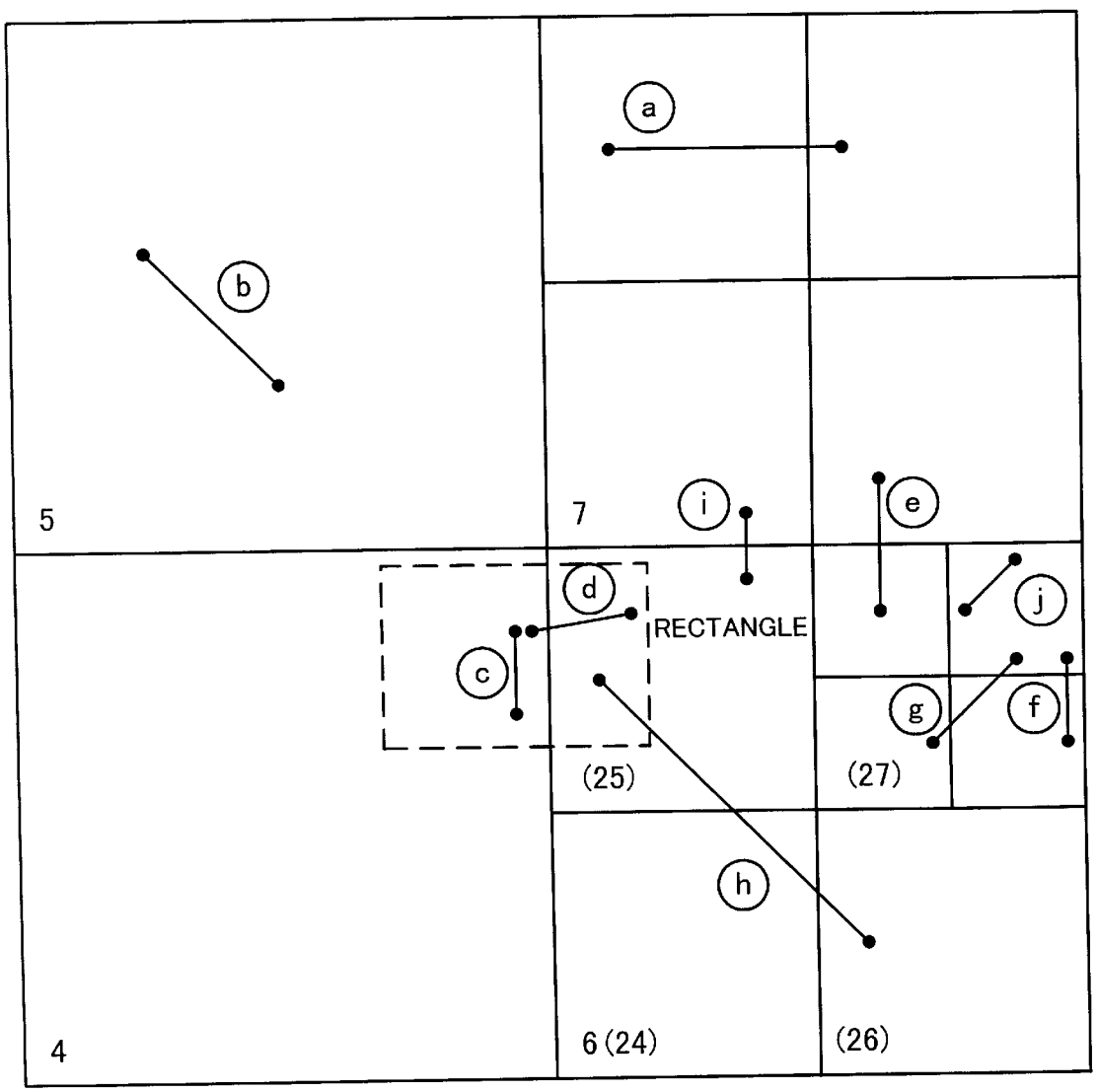
FIG. 23 is an illustration of the rectangle search performed in the fourth embodiment of the present invention.

The operation performed by the multidimensional data management apparatus in the fourth embodiment structured as described above and achieved through the corresponding multidimensional data management method is illustrated in FIG. 23 and the operation is also explained in reference to the flowcharts presented in FIGS. 24–28.

Figure 25:
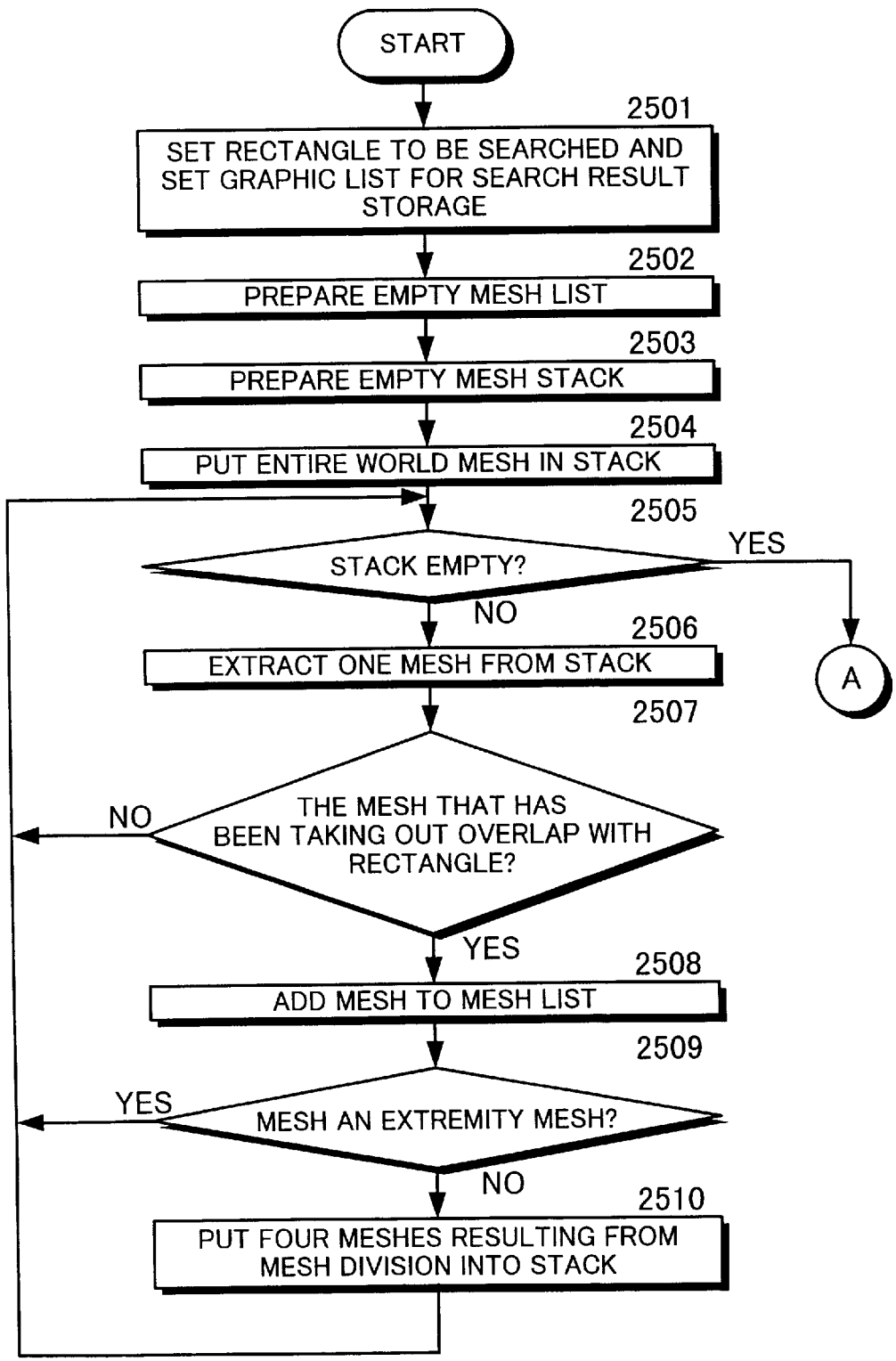
FIG. 25 is a flowchart illustrating the flow of the processing for searching out all the meshes overlapping with the rectangle to be searched in rectangle search.
Figure 26:
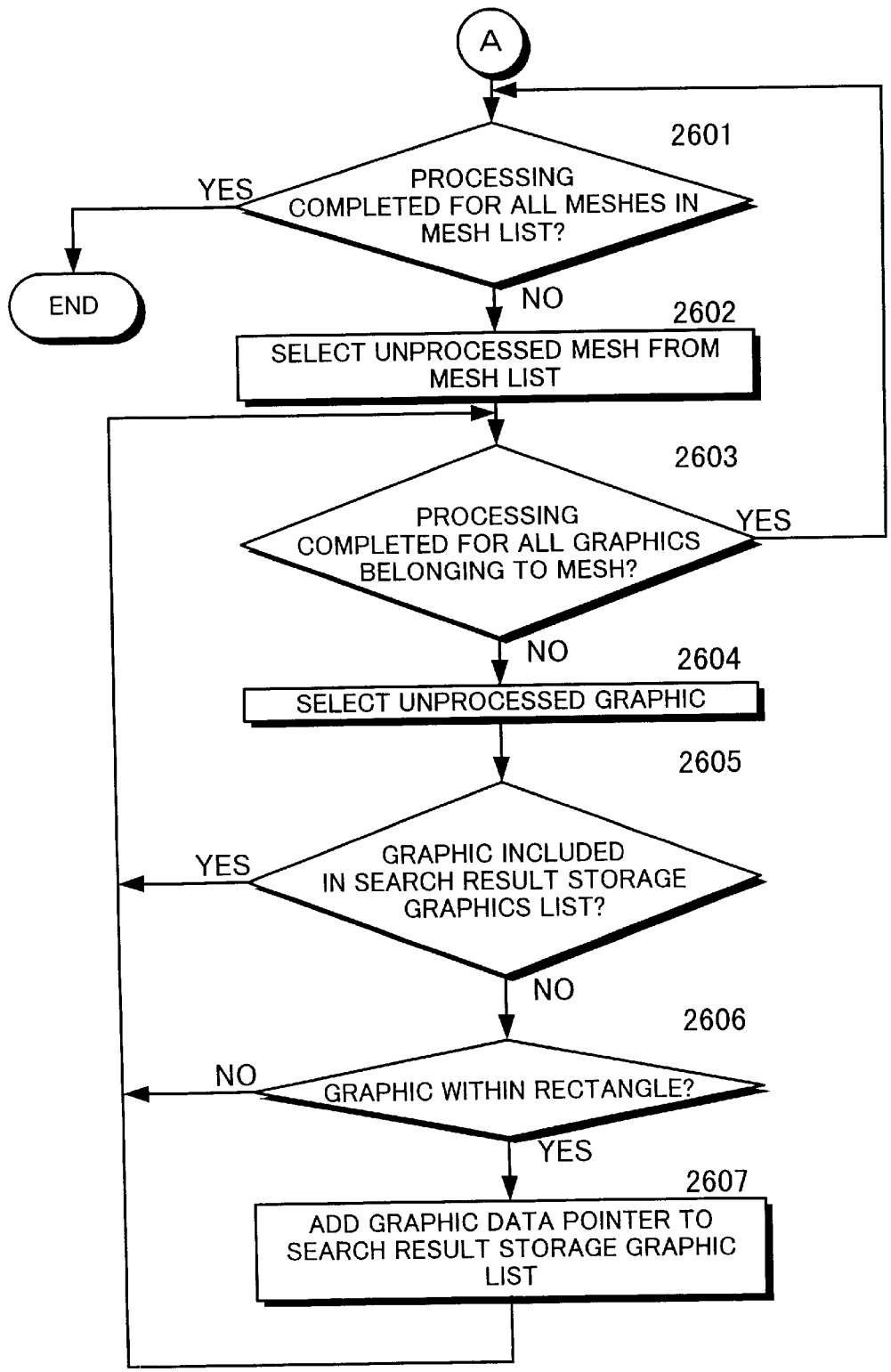
FIG. 26 is a flowchart illustrating the flow of the processing for searching whether or not a graphic is inside the rectangle in rectangle search.
Figure 27:
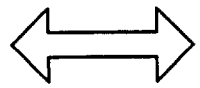
FIG. 27 is a drawing which shows the correspondence between the mesh list and the graphic list.

(6_2_1) Rectangle Search When Registering Graphics at Both Intermediate Meshes and Extremity Meshes The rectangle search allowing graphics registered in both intermediate and extremity meshes as explained in reference to the second embodiment and the third embodiment is executed by following the procedure illustrated in the flowcharts presented in FIGS. 25 and 26. The following is a step-by-step explanation of this processing.

First, the flowchart in FIG. 25 illustrates the flow of the processing through which all the meshes that overlap or are included in given rectangle are searched out.

(Step 2501)

The rectangle to be searched and a search result storage graphic list are set. Namely, the rectangle to be searched is set by setting the coordinates that are lower left and upper right relative to the rectangle and the search result storage graphic list is set by setting a pointer for the storage area in which the graphic data is located. It is to be noted that the rectangle to be searched and the search result storage graphic list are provided by the user of the rectangle search.
(Step 2502)

An empty mesh list for keeping the mesh list that has been searched is prepared.
(Step 2503, Step 2504)

A mesh stack is emptied and prepared for holding in memory the order in which meshes are to be processed, and the mesh 1 representing the entire world is put in this stack.
(Step 2505)

A decision is made as to whether or not the stack is empty, and if it is empty, the operation proceeds to search processing illustrated in FIG. 26 to determine whether or not the graphics is present in the rectangle. At this point, a list of intermediate meshes and extremity meshes that overlap or are included in the rectangle has been prepared. If, on the other hand, the stack is not empty, the operation proceeds to the next step 2506. Since, in this example, when the mesh 1 representing the entire world is in the stack, the search has just been initiated the operation proceeds to step 2506.
(Step 2506)

One mesh is extracted from the stack. In this case, the mesh 1 representing the entire world is extracted, setting the stack in an empty state.
(Step 2507)

A decision is made as to whether or not the mesh that has been extracted overlaps (or is included in) the rectangle and if it does not overlap (and also is not included), the operation returns to step 2505 to make a decision as to whether or not the stack is empty. If, on the other hand, the mesh overlaps (or is included in) the rectangle, the operation proceeds to the next step 2508. In this example, it is decided that the mesh 1 representing the entire world and the rectangle overlap, the operation proceeds to step 2508.

It is to be noted that since, in this embodiment, the coordinates of the meshes are managed based upon a quad-tree and the mesh numbers are assigned in a regular manner, the coordinates of the meshes can be calculated easily, and, therefore, it is easy to make a decision as to whether or not a mesh overlaps with a rectangle based upon the coordinates of the mesh and the coordinates of the rectangle.
(Step 2508)

The mesh is added to the mesh list. In this example, a mesh list constituted of only the mesh 1 representing the entire world is created.
(Step 2509)

A decision is made as to whether or not the mesh is an extremity mesh, and if it is an extremity mesh, the operation returns to step 2505. If, on the other hand, it is not an extremity mesh, it means that there are child meshes resulting from division of it into four, and since it is necessary to check these as well, the operation proceeds to the next step 2510. Since the entire world mesh 1 is not an extremity mesh in this embodiment, the operation proceeds to step 2510. It is to be noted that the decision making as to whether or not a mesh is an extremity mesh can be performed with ease because of the quad-tree structure.
(Step 2510)

The four child meshes resulting from dividing the mesh into four are put into the stack and the operation returns to step 2505. In this example, the child meshes 7, 6, 5 and 4 of the entire world mesh 1 are put in the stack. Within the stack, the child meshes are placed in the order of 7, 6, 5 and 4 from top to bottom. In this embodiment, a negative decision is made in step 2505 since the stack is not empty, and the operation proceeds to step 2506.

The following is an explanation of this processing in further detail, in reference to the example illustrated in FIG. 23.

When one mesh is extracted from the stack in step 2506, the tail end mesh 4 is extracted and the meshes 7, 6 and 5 remain in the stack. Since the mesh 4 and the rectangle overlap with each other, as shown in FIG. 23 (step 2507), the mesh 4 is added to the mesh list (step 2508). As a result, the mesh list will include 1 and 4. Then, since it is decided in step 2509 that the mesh 4 is an extremity mesh, the operation returns to step 2505.

Since, if it is decided in step 2505 the stack is not yet empty, the next mesh is extracted from the stack in step 2506. In this example, the mesh 5 is extracted leaving the meshes 7 and 6 in the stack. Since the mesh 5 and the rectangle do not overlap (and also the latter doesn't include the former) each other, as shown in FIG. 23 (step 2507), the operation returns to step 2505.

Since it is decided in step 2505 that the stack is still not empty, the next mesh is extracted from the stack. In this example, the mesh 6 is extracted leaving only the mesh 7 in the stack. Since the mesh 6 and the rectangle overlap with each other, as shown in FIG. 23, the mesh 6 is added to the mesh list (step 2508). As a result, the mesh list will include 1, 4 and 6. Since it is decided in step 2509 that the mesh 6 is not an extremity mesh, the four child meshes 27, 26, 25 and 24 of the mesh 6 are put in the stack in step 2510 before the operation returns to step 2505. Consequently, the stack will now contain the meshes 7, 27, 26, 25 and 24.

Since the mesh 24, which is next extracted from the stack in step 2506 does not overlap (and also isn't included in) the rectangle (step 2507), the operation returns to step 2505 again. Next, the mesh 25 is extracted and since this mesh 25 overlaps with the rectangle (step 2507), as shown in FIG. 23, the mesh 25 is added to the mesh list (step 2508). As a result, the mesh list will include 1,4, 6 and 25. In addition, since this mesh 25 is an extremity mesh (step 2509), the operation returns to step 2505. At this point, the stack contains the meshes 7, 27 and 26.

Then, in step 2506, the mesh 26 is extracted from the stack and, as shown in FIG. 23, this mesh 26 does not overlap (and also isn't included in) the rectangle (step 2507). Then, in step 2506, the mesh 27 is extracted from the stack and this mesh 27 does not overlap (and also isn't included in) the rectangle either (step 2507). At this point, the stack contains the mesh 7.

Next, in step 2506, the mesh 7 is extracted from the stack and the stack becomes empty. In addition, as shown in FIG. 23, this mesh 7 does not overlap (and also isn't included in) with the rectangle either (step 2507). Since the stack is empty when the operation returns to step 2505, the operation proceeds in the direction of YES. In other words, the operation proceeds to the search processing illustrated in FIG. 26 to determine whether or not the graphics are present in the rectangle.

It is to be noted that the mesh list contains 1, 4, 6 and 25 at this point and this is the entire list of meshes that overlap (or include or are included in) the rectangle.

The flowchart in FIG. 26 illustrates the flow of the search processing to determine whether or not the graphics are present within the rectangle by checking the meshes in the mesh list in FIG. 25 one by one.
(Step 2601)

The processing through which graphics included within the rectangle are gathered for all the meshes in the mesh lists performed and if this processing has been completed for all the meshes, the rectangle search ends. If, on the other hand, there are any unprocessed meshes remaining, the operation proceeds to the next step 2602.

(Step 2602)

One unprocessed mesh in which the graphics have not been searched is selected from the mesh list. In this example, with the mesh list containing 1, 4, 6 and 25, the processing starts with the mesh 1.

(Step 2603)

If the processing performed in steps 2604–2607 which is to be detailed later has been completed for all the graphics registered in the mesh, the operation returns to step 2601. If, on the other hand, there are any unprocessed graphics, the operation proceeds to the next step 2604. Since there is no graphic in the mesh 1 in this example, it is decided that all the processing has been completed and the operation returns to step 2601. Next, in step 2602, the mesh 4 is selected.

(Step 2604)

An unprocessed graphic is selected from the graphics registered in the mesh. As shown in FIG. 23, the graphic "c" in the mesh 4 is selected in this example.

(Step 2605)

A decision is made as to whether or not the graphic that has been selected in step 2604 has already been entered in the search result storage graphic list, and if it is in the list, the operation returns to step 2603 without any processing performed. If, on the other hand, it is not in the search result storage graphic list, the operation proceeds to the next step 2606. In this example, the search result storage graphic list is empty during the initial stage and the graphic "c" is not in it. Thus, the operation proceeds to step 2606.

It is to be noted that this decision processing may be also achieved by affixing "checked" marks to graphic data in the step 2607.

(Step 2606)

A decision is made as to whether or not the graphic selected in step 2604 is present within the rectangle and if it is, the operation proceeds to the next step 2607. If, on the other hand, it is not present within the rectangle, the operation returns to step 2603. Since the graphic "c" is inside the rectangle in this embodiment, the operation proceeds to step 2607. (It is to be noted that this condition decision making does not always have to be performed. Namely, a graphic may sometimes be added to the graphic list regardless of whether or not it is inside a rectangle, since when implementing graphic display, off-screen graphics cannot be seen even if they are displayed and, therefore, they do not affect the display. If the graphic display is implemented at extremely high speed, it is effective to dispense with this decision making.)

(Step 2607)

A graphic data pointer is added to the search result storage graphic list and then the operation returns to step 2603. As a result, the graphic "c" is added to the search result storage graphic list. In this example, a graphic list consisting of only the graphic "c" is created.

The following is an detailed explanation of this processing in reference to the example illustrated in FIG. 23.

Namely, after the graphic "c" is added to the search result storage graphic list, the operation returns to step 2603. Since, as shown in FIG. 23, the mesh 4 still contains the graphic "d," the operation proceeds to step 2604, in which the graphic "d" is selected (step 2604). Next, in step 2605, it is decided that the graphic "d" is not included in the search result storage graphic list before the operation proceeds to step 2606. Since the graphic "d" is inside the rectangle, it is added to the search result storage graphic list at this point (step 2607). As a result, the search result storage graphic list will contain the graphics "c" and "d".

Figure 16:
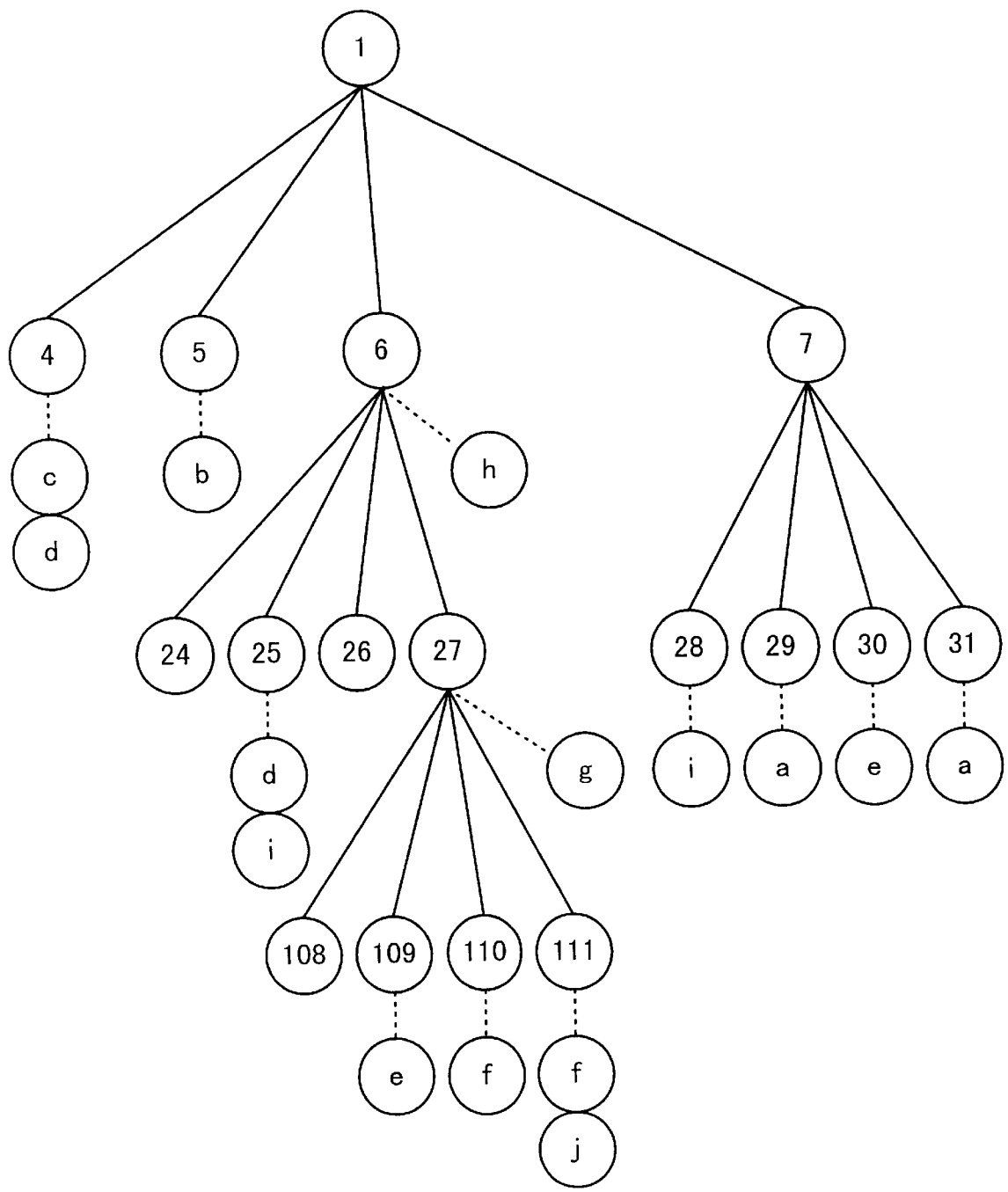
FIG. 16 is a tree diagram illustrating meshes and graphics registered in the meshes when graphic registration is made in intermediate meshes as well.

Next the operation returns to step 2603, in which it is decided that the processing has been completed for all the graphics registered in the mesh 4 and the operation returns to step 2601. Since the processing has not been performed for the meshes 6 and 25 in step 2601, the operation proceeds to step 2602 in which the mesh 6 is selected in this example. As shown in FIGS. 16 and 23, only the graphic "h" is registered in the mesh 6. This graphic "h" is selected in step 2604.

Then, in step 2605, it is decided that the graphic "h" is not included in the search result storage graphic list before the operation proceeds to step 2606. Since the graphic "h" is present in the rectangle, it is added to the search result storage graphic list at this point (step 2607). As a result, the search result storage graphic list will contain the graphics "c," "d" and "h".

Next, the operation returns to step 2603 in which it is decided that the processing has been completed for all the graphics registered in the mesh 6 before the operation returns to step 2601. Since, in step 2601, the processing has not yet been performed for the mesh 25, the operation proceeds to step 2602 to select the mesh 25. Since, as shown in FIGS. 16 and 23, there are unprocessed graphics "d" and "i" in this mesh 25 (step 2603), the operation proceeds to step 2604. It is to be noted that, as shown in FIG. 16, the graphic "h" is registered in the mesh 6, which is an intermediate mesh and is not registered in the mesh 25, and, therefore, not referred to in this case.

The graphic "d" is selected in step 2604 but, since this graphic "d" is already in the search result storage graphic list, the operation returns to step 2603. Since the graphic "i" is not included in the search result storage graphic list (step 2605), the operation proceeds to step 2606. Since the graphic "i" is not in the rectangle in step 2606, the operation returns to step 2603. Then, as the processing for all the graphics in the mesh 25 has been completed in this manner, the operation returns to the step 2601.

Then, with the processing for all the meshes in the mesh list completed, the processing ends. At this point, the search result storage graphic list will contain the graphics "c," "d" and "h."

(6_2_2) Handling Sub-graphics

In order to accommodate the need of the display side, a graphic may sometimes be constituted of a plurality of components. Generally speaking, a graphic is constituted of a plurality of simple graphics (sub-graphics) of several different types. For instance, an electrical line is a group of a plurality of line segments. In this case, the display side does not implement the data management by dividing the electrical line into individual line segments, since it is more intuitive for the user to handle it as one graphic. In addition, when implementing display, it is more efficient to display a group of line segments all at once rather than repeat drawing the individual line segments by the number of line segments. A graphic that is constituted of sub-graphics in this manner is referred to as a "super-graphic".

When one set of graphic data is constituted of a plurality of sub-graphics, only one graphic key (ID) is issued to the super-graphic. In addition, the list of belonging graphics of the mesh data in the quad-tree structure indicates the data areas of the sub-graphics not of the graphics (super-graphics). However, although the data areas of the sub-graphics are indicated, pointers for indicating the sub-graphics which also enable identification of the original super-graphic can be created. For instance, in order to indicate a sub-graphic, the location of the data area of the original super-graphic and the offset from that location to the data area of the sub-graphic are paired to constitute a pointer for the sub-graphic. With the pointer prepared in this manner, both the sub-graphic and the original super-graphic can be identified. By using this pointer, registration in meshes can be performed by sub-graphics.

There is an advantage in making registrations by sub-graphics when performing the nearest search which is to be detailed later. The reason for this is that since a graphic constituted of a plurality of simple graphics (sub-graphics) is normally large in size and tends to lie astride a plurality of meshes. For instance, let us consider a super-graphic A comprising two sub-graphics A and B (two line segments). It is assumed that the line segments A and B are each registered in only one mesh, i.e., the line segment A in mesh "m" and the line segment B in mesh "n." However, this means that the super-graphic A lies astride the two meshes "m" and "n."

It is assumed that in this situation, only the super-graphic A is present in the rectangle and the central point for the nearest neighbor search is at the mesh "m."

When registrations are made in units of super-graphics instead of in units of sub-graphics, the only information available is that the super-graphic A is registered in the mesh "m", and the specific positions of the line segments A and B cannot be ascertained. Thus, the calculation of the distance from the central point must be performed for both of the line segments A and B. In other words, in order to determine that the super-graphic A is the nearest neighbor graphic, the distance calculation must be performed for the two line segments.

If, on the other hand, registrations are made in units of sub-graphics, only the line segment A is registered in the mesh "m" and the line segment B is not registered. Thus, the distance calculation is performed only for the line segment A. If no other meshes are present in the circle whose radius is constituted of this distance, the nearest neighbor graphic can be ascertained simply by performing the distance calculation for the line segment once. When returning the nearest neighbor graphic, the original super-graphic A of the sub-graphic A is returned, since the display side has provided data in units of super-graphics in the first place.

The changes made from the rectangle search processing explained earlier when handling such sub-graphics are listed below. In other words, the term "graphic" used in steps 2603, 2604 and 2606 in FIG. 26 is replaced by "sub-graphic." In addition, the "search result storage graphic list" in step 2501 in FIG. 25 and in step 2605 in FIG. 26 refers to the list of super-graphics. Furthermore, the conditions used in step 2605 should be modified to "the sub-graphic is one of the sub-graphics of a super-graphic in the search results storage super-graphic list," and the graphic data pointer in step 2607 should be changed to the super-graphic pointer.

Figure 28:
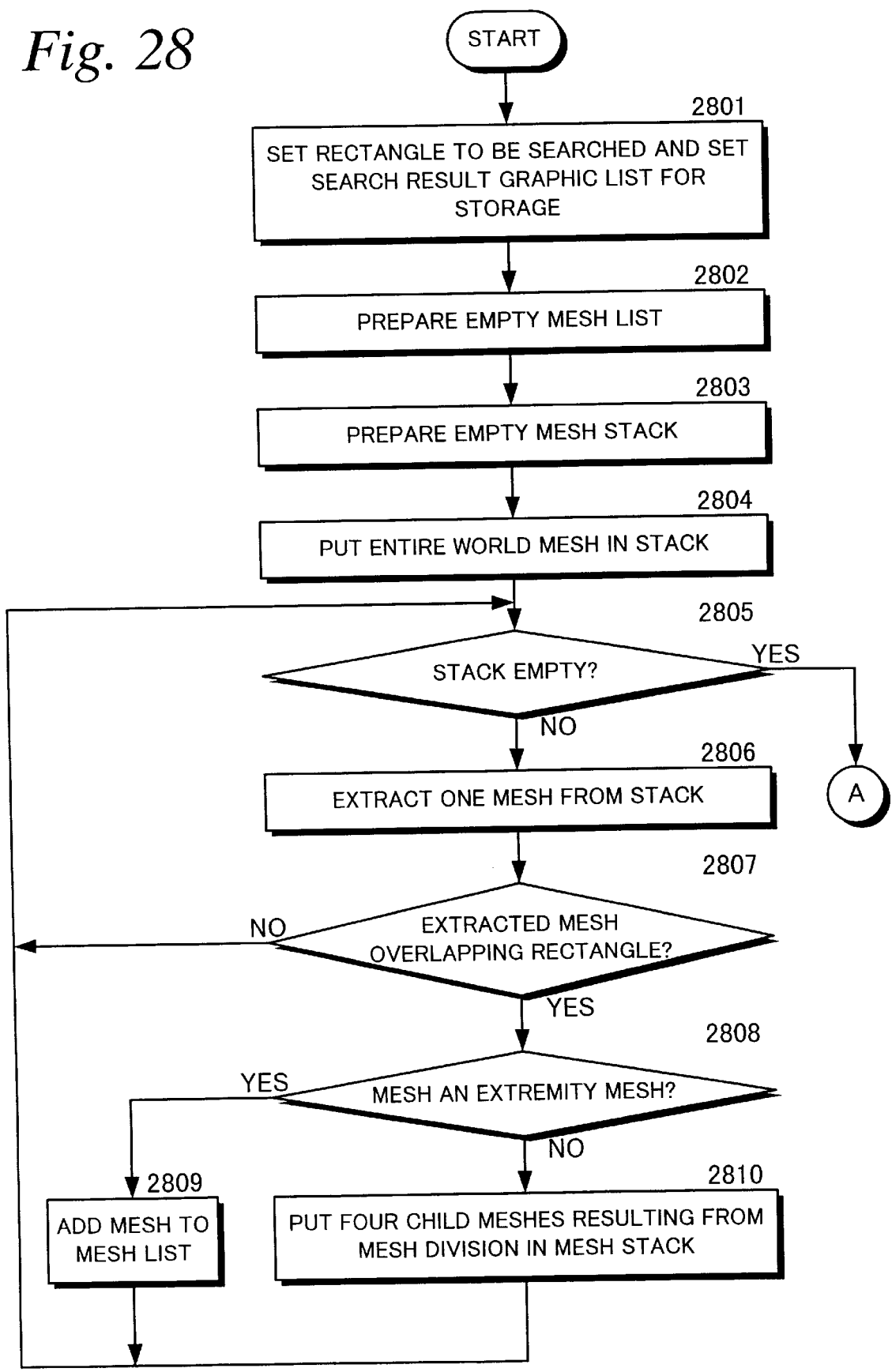
FIG. 28 is a flowchart illustrating the flow of the rectangle search processing performed when graphics are registered only in extremity meshes.

(6_2_3) Rectangle Search Performed When Graphics are Registered Only in Extremity Meshes Unlike the "rectangle search performed when registering graphics both in intermediate meshes and in extremity meshes" illustrated in FIGS. 25 and 26, the "rectangle search for graphics registered only in extremity meshes" is executed by following the procedure illustrated in the flow-chart in FIG. 28. It is to be noted that since the flow of this processing is similar to that shown in FIG. 25 (steps 2801–2807 in FIG. 28 are identical to steps 2501–2507 in FIG. 25), only its difference is explained below.

(Step 2807)

A decision is made as to whether or not the mesh that has been extracted overlaps the rectangle, and if it does not overlap, the operation returns to step 2805 to determine whether or not the stack is empty. If, on the other hand, they do overlap, the operation proceeds to the next step 2808.

(Step 2808)

A decision is made as to whether or not the mesh is an extremity mesh, and if it is an extremity mesh, the operation proceeds to step 2809, whereas if it is not an extremity mesh, the operation proceeds to the next step 2810 since this means that there are child meshes resulting from the mesh being divided into four and it is necessary to check them as well.

(Step 2809)

The mesh is added to the mesh list and the operation returns to step 2805.

(Step 2810)

The four child meshes resulting from dividing the mesh into four are put into the stack and the operation returns to step 2805.

This procedure enables the range search means to be added to data management system such as the first embodiment.

(6_3) Variation of the Fourth Embodiment

Variations for the second and the third embodiment are also applicable to the fourth embodiment, since the fourth embodiment adds the range search means 20 in the manner independent of the method adopted in the dividing means, the merging means and registration/deletion means in order to construct mesh (quad-tree node)—graphic correspondence.

(7) Fifth Embodiment

In the fifth embodiment, the following process is referred to as "nearest graphic search." In that process, one point and a rectangle are specified to search one graphic that is the nearest neighbor graphic to the point within the given rectangle, and memory location in which the data of the graphics are stored, the distance between the point and the graphic and the coordinates of the point on the graphic where the distance is measured are output. It is to be noted that this given point is referred to as the "central point" and the given rectangle is referred to as the "search extent."

Overview of Nearest Neighbor (Super) Graphic Search

Nearest (super) graphic search refers to an operation in which, when a rectangle and a point (referred to as the central point) are given, the nearest neighbor super-graphic (referred to as the nearest neighbor graphic) to the central point is searched out from the super-graphics within the rectangle. In addition, this nearest neighbor graphic search is utilized in a situation such as highlighting the nearest neighbor facility to the cursor in a facility diagram displayed on the screen. In this case, the range of the screen constitutes the rectangle and the position of the cursor constitutes the central point.

While the central point is usually present within the rectangle, it is possible to search out a super-graphic inside a rectangle that is nearest to the central point in the rectangle even when the central point is not present in the rectangle in this nearest neighbor graphic search.

A concise explanation of this process is as follows.

Figure 31:
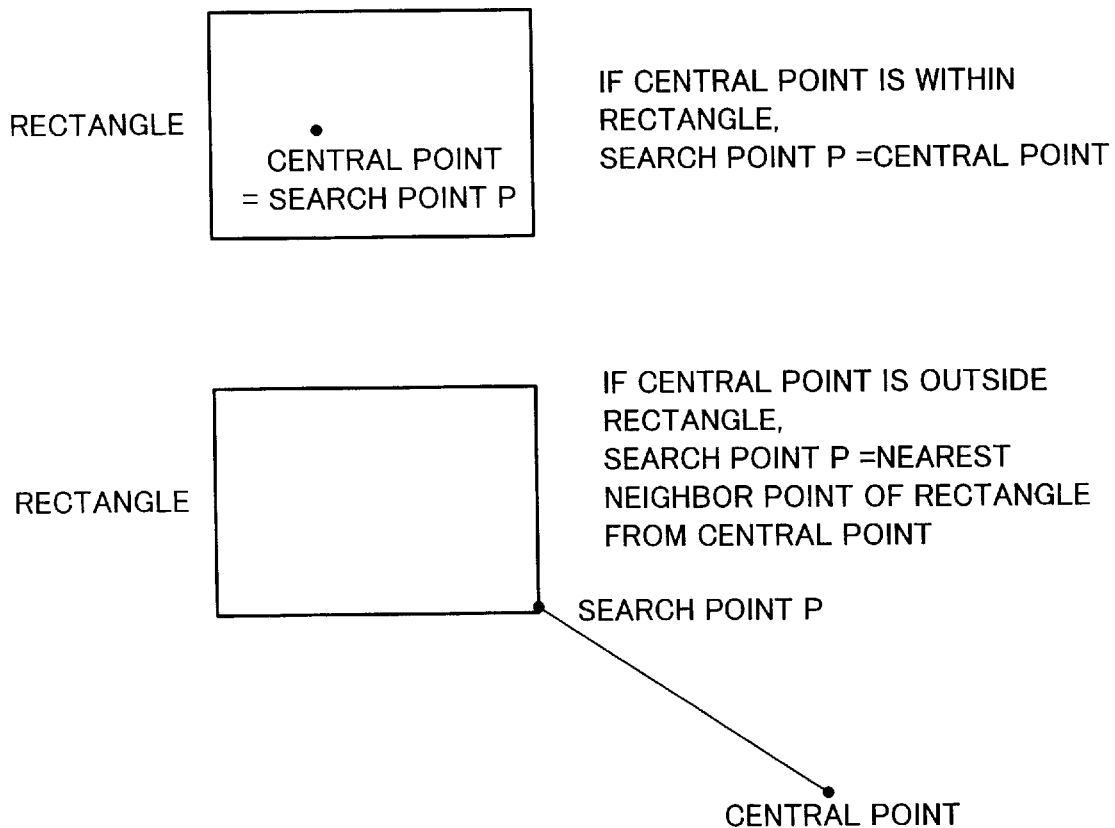
FIG. 31 is a drawing which shows the relationship between the central point and the rectangle.

(1) One or more sub-graphics are inspected in the vicinity of the point, called the search point, which is the central point if it is present inside the rectangle, or one point on the frame of rectangle that is the nearest to the central point if the central point is outside the rectangle, as shown in FIG. 31), and the nearest neighbor sub-graphic is temporarily set.

The procedure through which one or more sub-graphics are inspected in the vicinity of the search point is carried out as follows. The extremity mesh that contains the search point is first examined. If there is no sub-graphic in this extremity mesh, the search is performed by traversing up through the quad-tree toward the parent meshes until a sub-graphic is located. If no sub-graphic is located even when the search has been reached to the root node of the quad-tree (the entire world mesh), the search range is expanded to the meshes in the vicinity of the original extremity mesh. This search range is referred to as a search frame.

If there is no sub-graphic in these extremity meshes in the vicinity, search is conducted by traversing up to the parent meshes from the extremity meshes. The process of expanding the search frame in the surrounding area, starting from the extremity meshes and traversing up toward the parent meshes is repeated until a sub-graphic is located. If the search is performed until the search frame is expanded to the surrounding area to become large enough to completely enclose the search extent and there is still no sub-graphic present within that search frame, the processing ends without being able to locate the nearest neighbor sub-graphic.

While, in the flowchart explained below, if no graphic is located in an extremity mesh, the search traverses up to the parent mesh first and if there is still no graphic present, the search range is expanded to the surrounding area of the extremity mesh, the order in which the processing is performed may be changed so that the search range is expanded first to the surrounding area of the extremity mesh and then the parent meshes are searched.

In addition, for fear that a graphic which is far from the central point is assigned, the meshes to be searched when there is no graphic, are selected in the following order. Namely, meshes are selected in the order determined by the distances between the central point and the furthest point from the central point in the individual meshes that overlap with the rectangle (furthest points), i.e., the mesh having the shortest distance between the central point and its furthest point is selected first, the mesh having the second shortest distance is selected next and so forth. However, in reality, if there is no graphic, little problem in regard to the execution time arises even with a graphic located rather far away set as a temporary nearest neighbor graphic, since the nearest neighbor graphic search is, in fact, performed in an area range where the graphic density is low and the number of graphics to be inspected is small.

(2) A circle whose center is the central point and whose radius is the distance to the temporary nearest neighbor graphic is created, and a graphic that is even nearer is searched out from the graphics within this circle. In this process, a nearest neighbor sub-graphic of one type or another is located. It is possible to ascertain the original super-graphic from this sub-graphic, and the super-graphic is returned.

(7_1) Structure of the Fifth Embodiment

Figure 29:
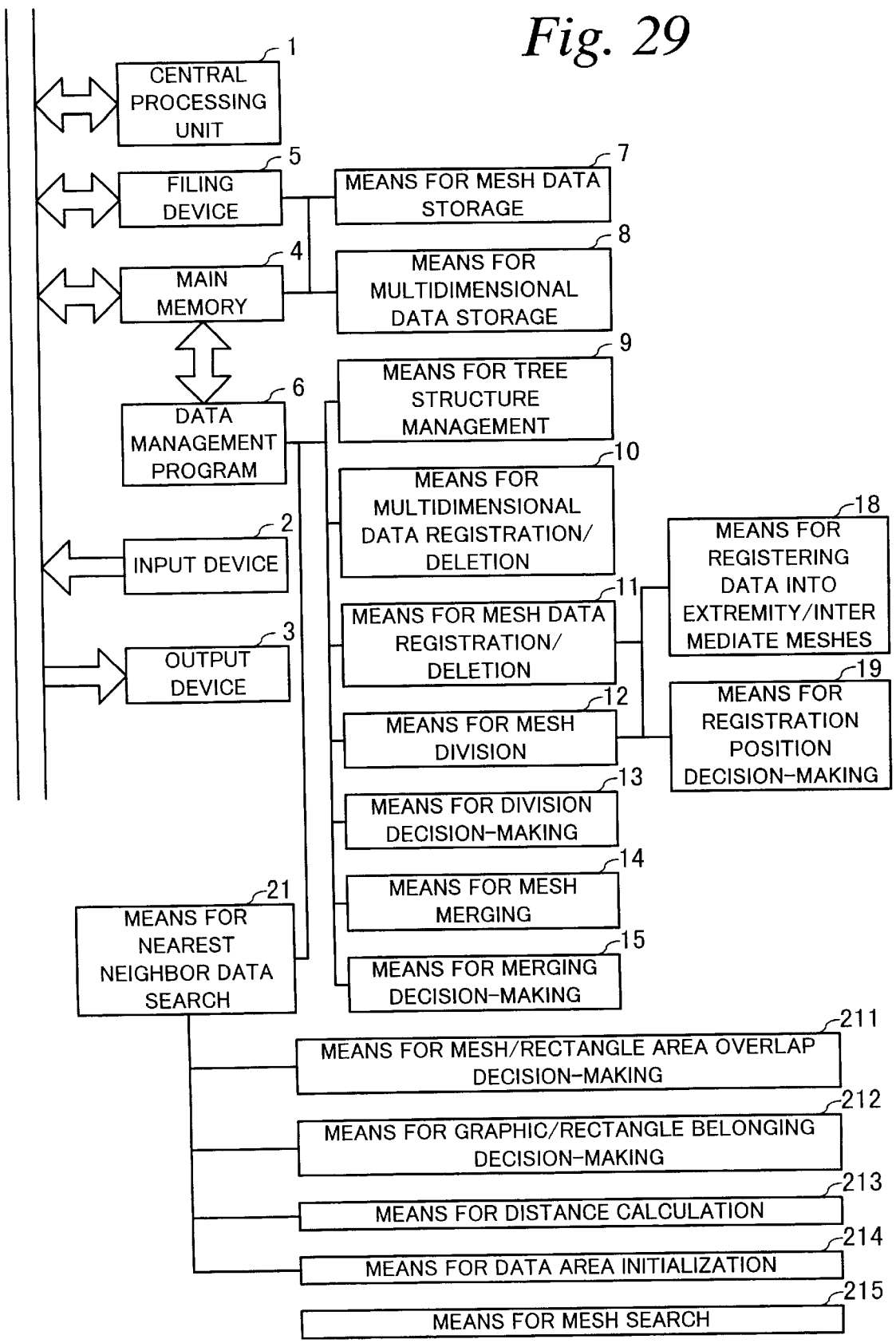
FIG. 29 is functional block diagram illustrating the structure of the fifth embodiment of the present invention.

FIG. 29 is a functional block diagram illustrating the structure of the fifth embodiment of the present invention. Namely, the multidimensional data search apparatus in this embodiment is characterized in that, in addition to the components of the multidimensional data management apparatuses in the individual embodiment previously explained, a means for nearest neighbor data search 21 that searches the nearest neighbor set of multidimensional data from a specified point inside the multidimensional space is included at the stage in which the multidimensional data accumulated within the storage area of the computer are managed. When no multidimensional data are registered in the smallest mesh that includes the specified point, the means for nearest neighbor data search 21 adopted in the fifth embodiment should expand the search range repeatedly until one candidate for the nearest neighbor data is determined, with the search range expanded to the parent mesh of the smallest mesh, to the meshes adjacent to the smallest mesh, the parent mesh of the parent mesh, the parent meshes of the adjacent meshes, meshes adjacent to the adjacent meshes and so forth.

In addition, this means for nearest neighbor data search 21 is provided with a means for mesh/rectangle area overlap decision-making 211 that makes a decision as to whether or not areas of a mesh and rectangle overlap by using the coordinates of the mesh and the coordinates of the rectangle input by the input device 2, a means for graphic/rectangle belonging decision-making 212 that makes a decision as to whether or not a graphic is present within a rectangle by using the coordinates of the graphic data and coordinates of the rectangle, a means for distance calculation 213 that calculates the distance between a given point (the central point) and a graphic by determining the coordinates of the point on the graphic that are the nearest to the central point, from which the distance is measured, a means for data area initialization 214 that initializes the data area when storing a fixed parameter, creating an initial quad-tree (a quad-tree provided only with a root node) or constituting a graphic key management area in the data area and a means for mesh search 215 that searches for an extremity mesh that includes a given one point.

(7_2) Functions of the Fifth Embodiment

Figure 30:
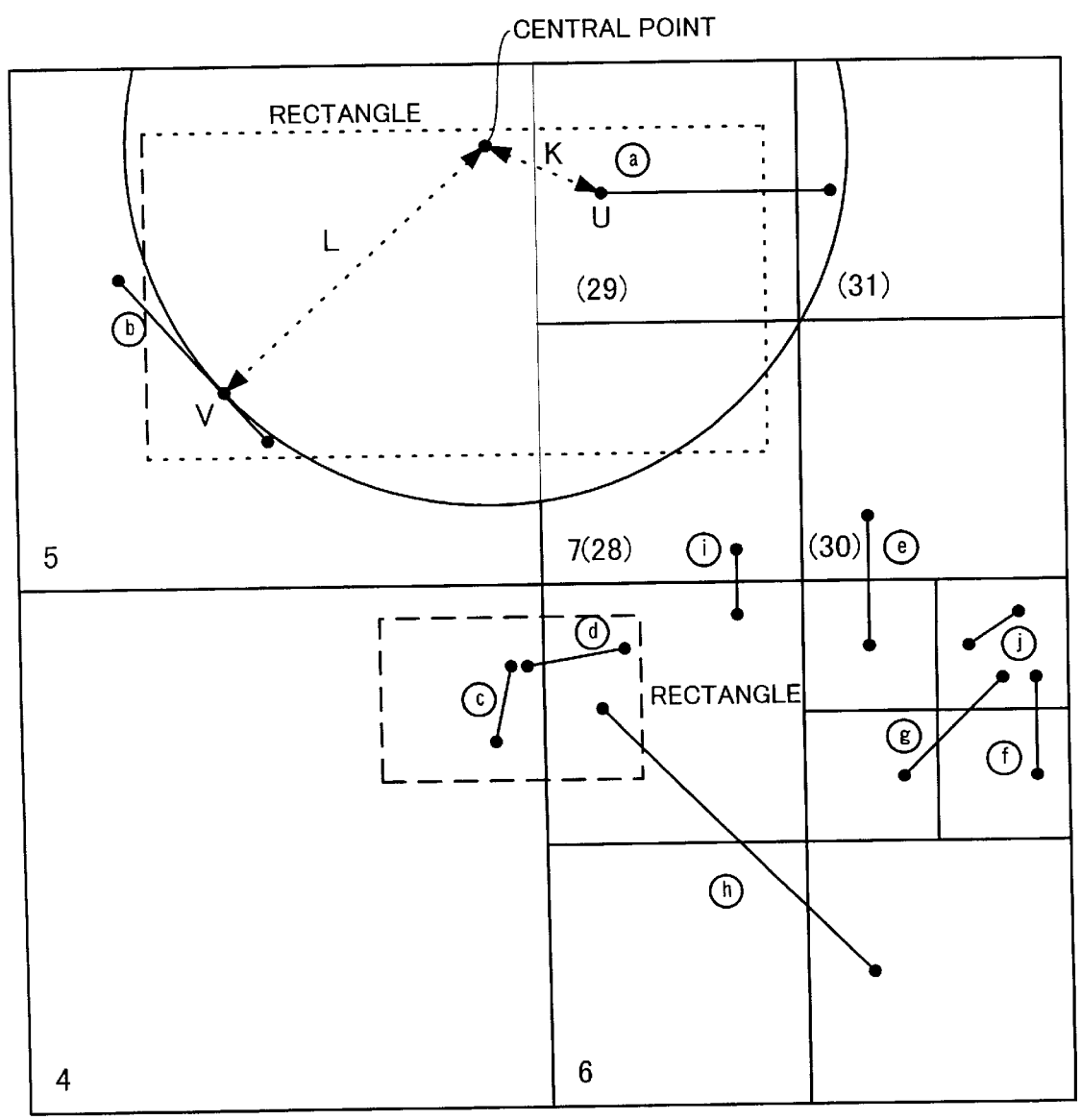
FIG. 30 is an illustration of nearest neighbor graphic search.

The functions of the multidimensional data management apparatus in the fifth embodiment structured as described above and the corresponding multidimensional data management method are explained in reference to the nearest neighbor data illustrated in FIGS. 30 and 31 and the flowcharts presented in FIGS. 32–41.

(7_2_1) Nearest Neighbor Super-graphic Search1

FIGS. 32–38 present flowcharts illustrating the flow of the processing in which the nearest neighbor super-graphic ("super" will be omitted in the following) is searched when sub-graphics are registered in intermediate meshes.

The following is a step-by-step explanation of the flow of the nearest neighbor graphic search processing in reference to FIG. 30 and FIGS. 32–38.

Figure 32:
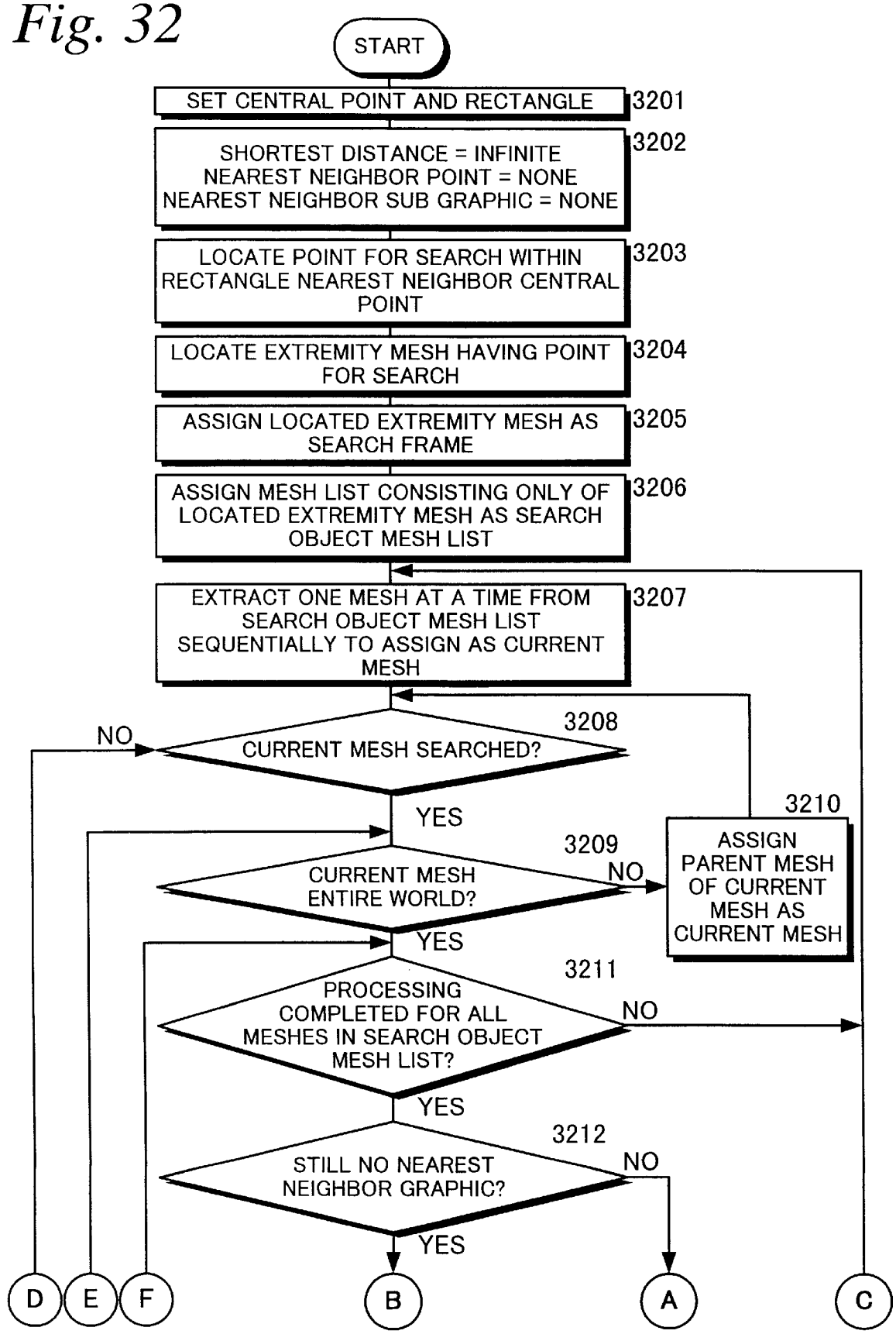
FIG. 32 is a flowchart illustrating the flow of the nearest neighbor graphic search processing.

(Step 3201) See FIG. 32

A central point and a search extent are set. For instance, they may be set as shown in FIG. 30.

(Step 3202)

A portion of memory to hold the status of the nearest neighbor sub-graphic search process is initialized.

nearest neighbor sub-graphic=none
nearest neighbor point=none
shortest distance=infinite (or, a length that is longer than the length of the longest line segment that can be drawn in the entire world)

In this context, the "nearest neighbor sub-graphic" refers to the nearest neighbor sub-graphic that has been located during the search process and the "nearest neighbor point" refers to one of the point on the sub-graphic that is nearest to the central point. In addition, the "shortest distance" refers to the distance from the central point to the sub-graphic. In other words, the "shortest distance" is the distance between the nearest neighbor point and the central point.

(Step 3203)

The search point that is nearest the central point within the rectangle is located. Namely, if the central point is present within the rectangle, the central point constitutes the search point. If, on the other hand, the central point is outside the rectangle, the search point can be determined by performing calculation of the distance between the central point and the rectangle. In this embodiment, the central point itself constitutes the search point, as shown in FIG. 30.

(Step 3204)

The extremity mesh that contains the search point is located. This extremity mesh is the mesh where the search is started. It is to be noted that this extremity mesh may be located in the quad-tree structure based directly upon the coordinates of the search point without any decision about inclusion of the search point in each mesh. In this example, the mesh 5 is located.

(Step 3205)

The extremity mesh thus located is assigned as the rectangle that indicates the range that has been searched up to that point in time (referred to as the search frame). In the example, the upper left quadrangle (mesh 5), which is one quarter of the entire world, is assigned as the search frame.

(Step 3206)

The search object mesh list is initialized to the one which only consists of the extremity mesh that has just been located. In the example, the search object mesh list includes the mesh 5.

(Step 3207)

One mesh is extracted from the search object mesh list at a time to be assigned as the current mesh. In this example, the mesh 5 is selected. Then, the search is performed, starting with the sub-graphics registered in the mesh 5.

(Step 3208)

First, before examining the graphics, a decision is made as to whether or not the current mesh has already been searched. This processing may be accomplished by checking as to whether or not the current mesh is included in the searched mesh list. Then, if it has already been searched, the operation proceeds to the next step 3209, but if it has not been searched, the operation proceeds to step 3301, shown in FIG. 33. Since, in this example, the search has just begun and, therefore, the mesh 5 has not been searched, the operation proceeds to step 3301.

The following is an explanation of the processing in which sub-graphics registered in the mesh are checked.

Figure 33:
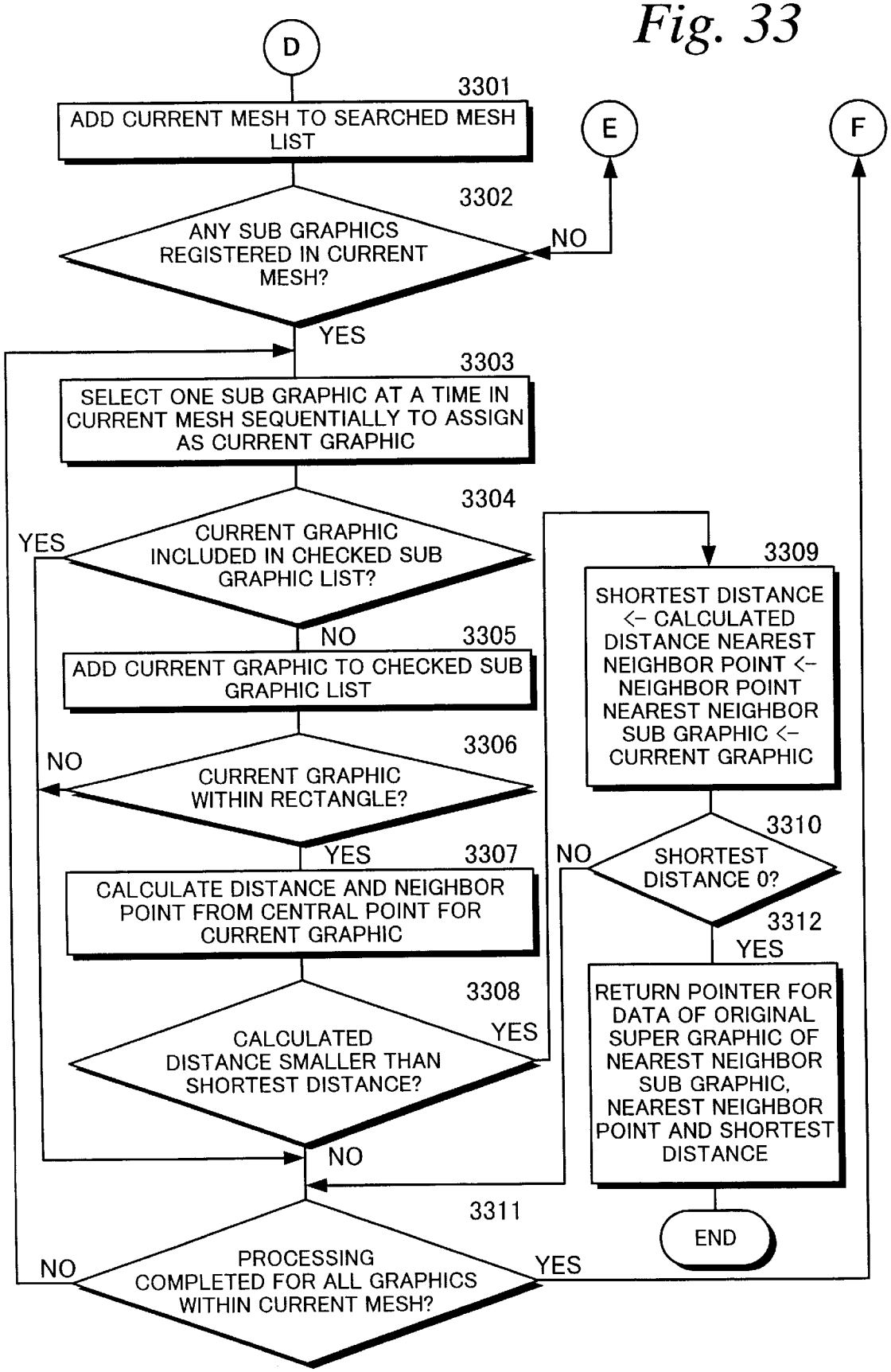
FIG. 33 is a flowchart illustrating the flow of the nearest neighbor graphic search processing.

(Step 3301) See FIG. 33

The current mesh is added to the searched mesh list. In the example, the searched mesh list is to include only the mesh 5.

(Step 3302)

Figure 34:
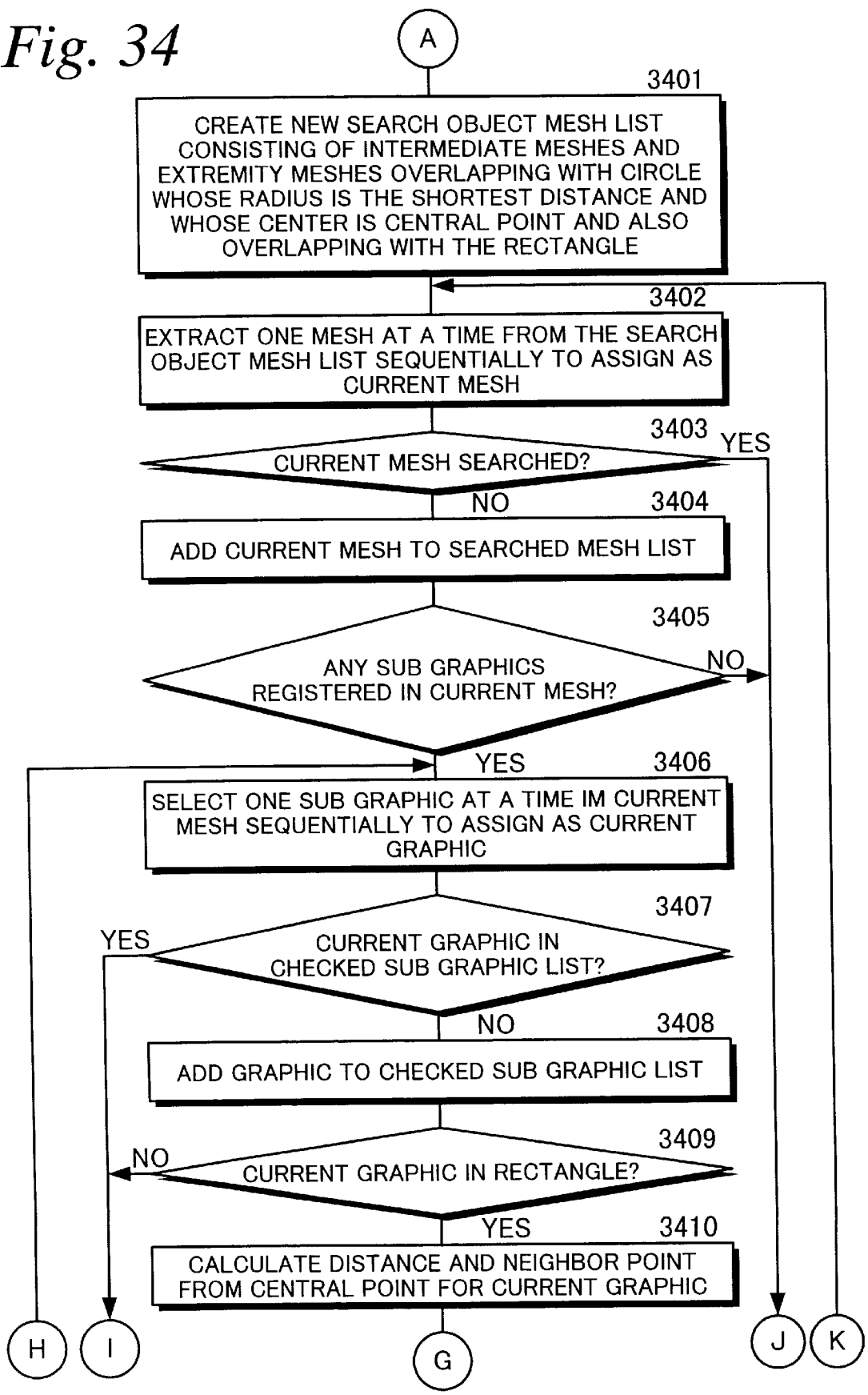
FIG. 34 is a flowchart illustrating the flow of the nearest neighbor graphic search processing.

A decision is made as to whether or not any sub-graphics are registered in the current mesh, and if no sub-graphics are registered in the current mesh, the operation proceeds along the flow that traverses the quad-tree up toward the root node, shown in FIG. 34. If, on the other hand, there is a sub-graphic in the current mesh, the operation proceeds to the next step 3303. In the example, the current mesh 5 contains one graphic "b" as shown in FIG. 30, and the operation proceeds to step 3303.

(Step 3303)

The sub-graphics registered in the current mesh are checked one by one. In this processing, one sub-graphic at a time is selected to be the current graphic. In the example, the graphic "b" of the mesh 5 is assigned as the current graphic.

(Step 3304)

A check is performed to determine whether or not the current graphic is included in the list of checked sub-graphics (the checked sub-graphic list), and if it is included in the list, the processing on the current graphic is skipped and the operation proceeds to step 3311. If, on the other hand, the current graphic is not included in the checked sub-graphic list, the operation proceeds to step 3305 to move on to the processing on the current graphic. It is to be noted that if the current graphic is a sub-graphic that lies astride a plurality of meshes, the operation may advance in the YES direction. Since the graphic "b" is not included in the searched sub-graphic list in the example, the operation proceeds to step 3305.

(Step 3305)

The current graphic is added to the checked sub-graphic list to ensure that it is not checked twice. In the example, the checked sub-graphic list only consists of the graphic "b."

(Step 3306)

A check is performed to determine whether or not the current graphic is in the rectangle, and if it is not in the rectangle, there is no point in performing the processing and thus, the operation skips to step 3311. If, on the other hand, the current graphic is in the rectangle, the operation proceeds to step 3307 to calculate the distance. Since the graphic "b" is in the rectangle in the example, the operation proceeds to step 3307 for distance calculation.

(Step 3307)

The distance from the central point to the current graphic is calculated, and the nearest neighbor point on the graphic (near point) is calculated. For this stage of the processing, a means for distance calculation using coordinates is provided. In the example, when calculation is performed for the graphic "b" by the means for distance calculation, as shown in FIG. 30, the distance is determined to be L and the near point is determined to be the point V. The definitions of "distance" and "far" and "near" are dependent upon the type of multidimensional data. In the example, the Euclidean distance is adopted.

(Step 3308)

The distance thus calculated is compared against the shortest distance and if the calculated distance is smaller than the shortest distance, the operation proceeds to step 3309 to update the nearest neighbor sub-graphic, the nearest neighbor point and the shortest distance. If, on the other hand, the calculated distance is equal to or greater than the shortest distance, the operation proceeds to step 3311 without performing any more processing. In the example, since the shortest distance is set to infinity at this point and the distance to the graphic "b" is definitely smaller, the operation proceeds to step 3309.

(Step 3309)

The nearest neighbor sub-graphic, the nearest neighbor point and the shortest distance are updated. In the example, they are updated so that the nearest neighbor sub-graphic= graphic "b," the nearest neighbor point=point V and the shortest distance=distance L.

(Step 3310)

A check is performed to determine whether or not the shortest distance is 0, and if it is 0, since there is no smaller distance than this, the search is terminated and the operation proceeds to step 3312. If, on the other hand, the distance is not 0, the operation proceeds to step 3311. Since the distance from the graphic "b" is not 0 in the example, the operation proceeds to step 3311.

(Step 3311)

Decision making is performed in regard to the conditions whether all the sub-graphics registered in the current mesh are exhausted. If the processing has not been completed for all the sub-graphics, the operation returns to step 3303. If, on the other hand, the processing has been completed for all the sub-graphics, the operation proceeds to step 3211 in FIG. 32 to make a decision as to whether or not the processing has been performed for all the meshes in the search object mesh list. Since the processing has been completed for all the graphic in the mesh 5 in the example, the operation proceeds to the 3211 to make a decision as to whether or not a check is to be performed on the next mesh.

(Step 3312)

The search result is returned in this step. A sub-graphic has been obtained as the nearest neighbor graphic. Since it is necessary to return a super-graphic as the search result, a modification is made to the pointer for the data of the original super-graphic of the sub-graphic. This, together with the shortest distance and the nearest neighbor point are returned.

Now, the processing which is performed when there is no graphic in the mesh being searched in step 3302 or when the mesh has already been searched in step 3208 is explained below.

(Step 3209)

If there are no graphics in the mesh being searched in step 3302 or if the mesh has already been searched in step 3208, the operation proceeds to step 3209 in FIG. 32. In the loop from step 3209 to step 3210, the operation traverses up toward the parent mesh until the graphic that is to be checked is located in a mesh. In this step 3209, this traversing up operation is stopped when the root node (the entire world) has been already reached. In other words, if the mesh is not the entire world, the operation proceeds to step 3210 to traverse up to the parent mesh, and if the mesh is the entire world, the operation proceeds along the flow for searching the next extremity mesh.

(Step 3210)

In order to search the parent mesh, the current mesh is replaced with the parent mesh. Then, the operation proceeds to step 3208.

(Step 3211)

If the processing has reached the entire world, it will mean that the operation has proceeded from step 3209 to step 3211. At this point, a decision is made as to whether or not the processing has been completed for all the meshes included in the search object mesh list, and if the processing has not been completed, the operation returns to step 3207. If, on the other hand, the processing has been completed, the operation proceeds to the next step 3212. Since the search object mesh list only includes the mesh 5 and the processing for the mesh 5 has been completed in the example, the operation proceeds to step 3212.

(Step 3212)

At this point, a decision is made as to whether or not distance calculation has been performed for one or more sub-graphics and branching is implemented based upon this decision. In other words, unless the nearest neighbor graphic=none, the distance calculation will have been performed for one or more sub-graphics. If, on the other hand, the nearest neighbor graphic=none, the distance calculation will not yet have been performed for any sub-graphic.

If the distance calculation has been performed for one or more sub-graphics, it means that there are the shortest distance, the nearest neighbor point and the nearest neighbor sub-graphic up to that point in time. Then, following this step, the operation proceeds to step 3401 in the flow, in which sub-graphics within the circle whose radius is the shortest distance are checked.

As has been explained, if the distance calculation has never been performed for any sub-graphics in step 3212 in FIG. 32, this signifies that no sub-graphic has been located even though the search has covered all the meshes in the search object mesh list and has traversed up from the individual child meshes to their parent meshes. Thus, in the following flow (starting with step 3603 in FIG. 36), preparation for performing a search again over an expanded search frame is made.

A new list of extremity meshes is created to be used as the search object mesh list by expanding the search frame slightly and picking up the extremity meshes overlapping only the increment of the search frame. However, if, as a result of expansion, the search frame becomes larger than the rectangle, the nearest neighbor search ends at that point.

Figure 39:
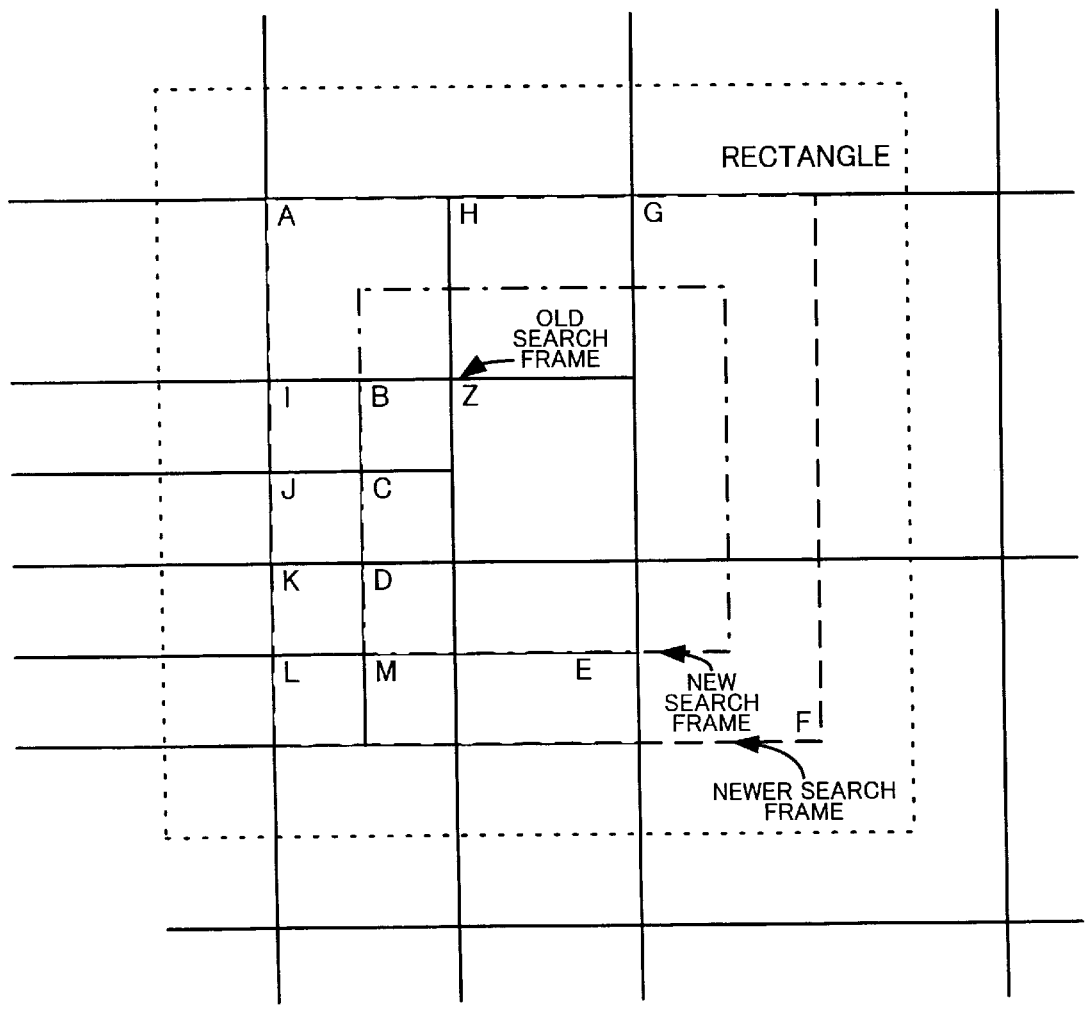
FIG. 39 is a drawing which shows changes in the search frame in the nearest neighbor graphic search.

A more specific explanation is given on this point in reference to FIG. 39. Namely, a quadrangle, i.e., the mesh Z, is originally set as the search frame. Then, after the search is conducted on the mesh Z and if there is still no graphic located even when the search has worked back through the parent mesh, the surrounding area is now searched. The meshes A–H are the extremity meshes either in contact with or overlapping the search frame, which have not yet been searched and, at the same time, overlap with the search extent. Now the search frame is expanded by the longitudinal width and by the lateral width of the smallest mesh B among the meshes A–H. Thus, as shown in FIG. 39, the old search frame (bold solid line) is extended to the new search frame (one point chain line). Furthermore, if there is no graphic in the meshes A–H and their parent meshes, a mesh list is created by using the new search frame. The mesh list will then include the meshes I–M and the new search frame (newer search frame) will be the area surrounded with the broken line.

Figure 36:
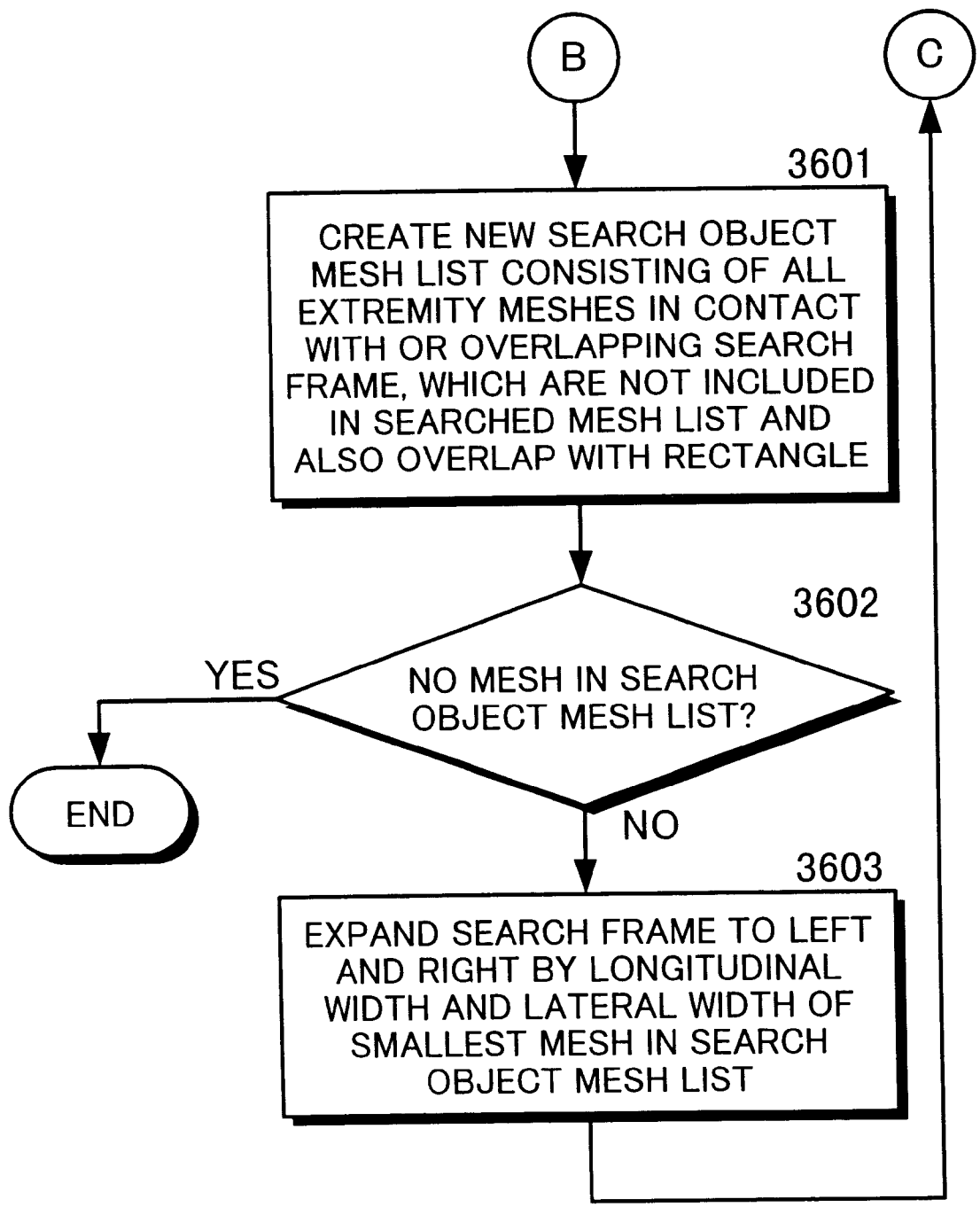
FIG. 36 is a flowchart illustrating the flow of the nearest neighbor graphic search processing.

The following is a step-by-step explanation of this processing in reference to FIG. 36.

(Step 3601)

This step follows step 3212 in FIG. 32. It is to be noted that the routine executed for creating a mesh list in this step is explained in detail later in reference to FIG. 37.

When the operation initially reaches this step, the search frame is the extremity mesh where the search point is included. Since extremity meshes surrounding this extremity mesh must be included as objects of the search as well, extremity meshes that are either in contact with or overlap the search frame are searched. Then, those except for meshes that do not overlap with the search extent and meshes that have already been searched, are included in the search object mesh list.

If there is no mesh in the search object mesh list, this means that the search frame has been expanded to become larger than the search extent. With the rectangle in this example, if there is no graphic in the mesh 5, the extremity meshes 28 and 29 around the mesh 5 become included in the search object mesh list. It is to be noted that although the mesh 4 and the mesh 25 are also extremity meshes around the mesh 5, they do not overlap with the search extent and thus, they are excluded.

(Step 3602)

A decision is made as to whether or not there is any meshes in the search object mesh. If there is no mesh in the list, it means that no more meshes are left to be searched and the search results will indicate that there is no nearest neighbor graphic. If, on the other hand, there is a mesh in the search object mesh list, the operation proceeds to step 3603.

(Step 3603)

In this step, in preparation for future use of the search frame to create a new search object mesh list, the search frame is expanded vertically and horizontally in both the positive and negative directions by the longitudinal width and the lateral width of the smallest mesh among the meshes in the new search object mesh list. With the search frame expanded in this manner, when there is still no graphic to be located and a search object mesh list must be created, the meshes in the vicinity will be added to the search object mesh list in the order of proximity. With the search object mesh list already prepared, the operation returns to step 3207 in FIG. 32 to perform the processing on the meshes.

The nearest neighbor graphic search performed by following the procedures illustrated in the flowcharts in FIGS. 32, 33 and 36 in this manner will result in either one nearest neighbor sub-graphic candidate located or no nearest neighbor graphic candidate. Then, if a nearest neighbor graphic candidate has been located, the operation proceeds to the "NO" branch from step 3212 in FIG. 32 to reach step 3401 in FIG. 34.

(Step 3401)

When the operation has reached this step, a check must be performed to determine whether or not there is a sub-graphic that is even nearer than the one nearest neighbor sub-graphic candidate that has been located. In order to determine this, a circle whose center is the central point and whose radius is the shortest distance is created and meshes that overlap with this circle are picked up. In this step, meshes (both extremity and intermediate) that overlap with both the circle and the search extent are located to be included in the search object mesh list. The routine that is executed for this mesh search is illustrated in detail in FIG. 38 and is to be explained later. In this example, the meshes 1, 5, 7, 28 and 29 will now be included in the search object mesh list.

(Step 3402)

In order to check the meshes in the search object mesh list one at a time, one mesh is extracted and assigned as the current mesh.

(Step 3403)

A decision is made as to whether or not the current mesh has already been searched. In other words, it is determined whether or not the current mesh is included in the searched mesh list. Then if the current mesh has already been searched, the processing on the mesh is skipped and the operation proceeds to step 3506 in FIG. 35. If, on the other hand, it has not been searched, the operation proceeds to the next step 3404. Since the mesh 5 is in the searched mesh list in the example, the operation skips the processing for the mesh 5 and proceeds to step 3506 in FIG. 35.

(Step 3404)

The current mesh is added to the searched mesh list (this step may be omitted if a searched mesh list is not required).

(Step 3405)

Figure 35:
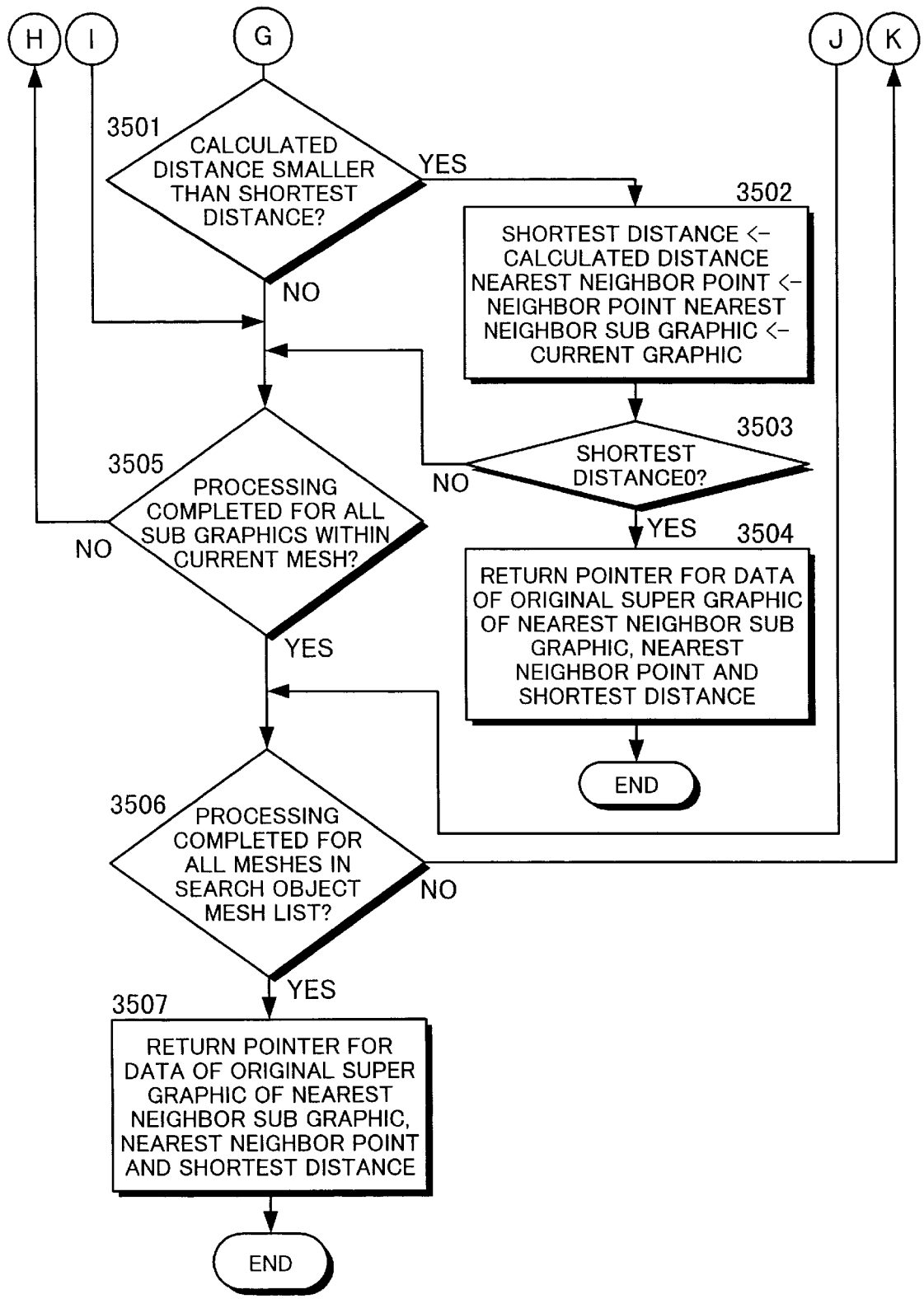
FIG. 35 is a flowchart illustrating the flow of the nearest neighbor graphic search processing.

A decision is made as to whether or not there are any sub-graphics registered in the current mesh, and if there are, the operation proceeds to perform the processing on the graphics, whereas if there are not, the operation skips to step 3506 in FIG. 35. In the example, the operation skips to step 3506 without performing processing on the meshes 1 and 7.

(Step 3406)

The processing of the individual sub-graphics registered in the current mesh starts. In other words, one of the sub-graphics registered in the current mesh is selected to be assigned as the current graphic. In the example, in the processing of the mesh 28, the graphic "i" is selected, and in the processing of the mesh 29, the graphic "a" is selected.

(Step 3407)

A check is performed to determine as to whether or not the current graphic has already been checked. This can be ascertained by checking the checked sub-graphic list. Then if it has already been checked, the operation skips to step 3505 in FIG. 35, whereas if it has not been checked, the operation proceeds to the next step 3408 to perform processing on the current graphic. Since the graphic "i" has not yet been checked in the example, the operation proceeds to step 3408. In addition, with the graphic "a" not having been checked yet either, the operation proceeds to step 3408.

(Step 3408)

The current graphic is added to the checked sub-graphic list to ensure that even if it lies astride a plurality of meshes, the calculation is not performed twice.

(Step 3409)

Prior to distance calculation, a check is performed to determine whether or not the current graphic is in the search extent, and if it is in the search extent, the operation proceeds to perform the distance calculation, whereas if it is not in the search extent, the operation skips to step 3505 in FIG. 35. Since the graphic "i" in this example is not in the search extent, the operation skips to step 3505 without performing the distance calculation, whereas in the case of the graphic "a," which is in the search extent, the distance calculation is performed in step 3410.

(Step 3410)

The distance and the near point from the central point are calculated by the means for distance calculation. The calculated value of the distance from the graphic "a" is K and the calculated value of the near point of the graphic "a" is U.

(Step 3501) see FIG. 35

The results of the distance calculation are compared against the shortest distance. If the calculated distance is equal to or larger than the shortest distance, the operation proceeds to step 3505 without performing any further processing. If, on the other hand, it is smaller than the shortest distance, the operation proceeds along the flow for the nearest neighbor sub-graphic updating. Since, in the case of the graphic "a" in this example, the distance is shorter than the shortest distance, the operation proceeds to step 3502 for updating.

(Step 3502)

The nearest neighbor sub-graphic, the nearest neighbor point and the shortest distance are updated. In the example, they are updated so that the nearest neighbor sub-graphic=graphic "a," the nearest neighbor point=point U and the shortest distance=distance K.

(Step 3503)

A check is made to determine whether or not the shortest distance is 0, and if it is 0, since there is no smaller distance than this, the search is terminated and the operation proceeds to step 3504. If, on the other hand, the distance is not 0, the operation proceeds to step 3505. Since the distance from the graphic "a" is not 0 in the example, the operation proceeds to step 3505.

(Step 3504)

The search results are returned in this step. Since a sub-graphic has been obtained as the nearest neighbor graphic and it is necessary to return a super-graphic as the search result, the pointer to the data of the nearest neighbor sub-graphic is changed into the pointer to the data of the original super-graphic of the sub-graphic. This, together with the shortest distance and the nearest neighbor point are returned.

(Step 3505)

Decision making is performed in regard to the conditions whether or not all the sub-graphics registered in the current mesh are exhausted. If the processing has not been completed for all the sub-graphics, the operation returns to step 3406 in FIG. 34 to check the next graphic. If, on the other hand, the processing has been completed for all the sub-graphics, the operation proceeds to the next step 3506.

(Step 3506)

A decision is made as to whether or not all the meshes in the search object mesh list are exhausted. If the processing has been completed for all the meshes, the operation proceeds to the next step 3507. If, on the other hand, the processing has not been completed, the operation returns to step 3402 in FIG. 34 to perform the processing on the next mesh.

(Step 3507)

The search results are returned in this step. Since a sub-graphic has been obtained as the nearest neighbor graphic and it is necessary to return a super-graphic as the search result, the pointer to the data of the nearest neighbor sub-graphic is changed into the pointer to the data of the original super-graphic of the sub-graphic. Together with that, the shortest distance and the nearest neighbor point are also returned. In this example, a result indicating that the graphic "a" is the nearest neighbor graphic is obtained.

Figure 37:
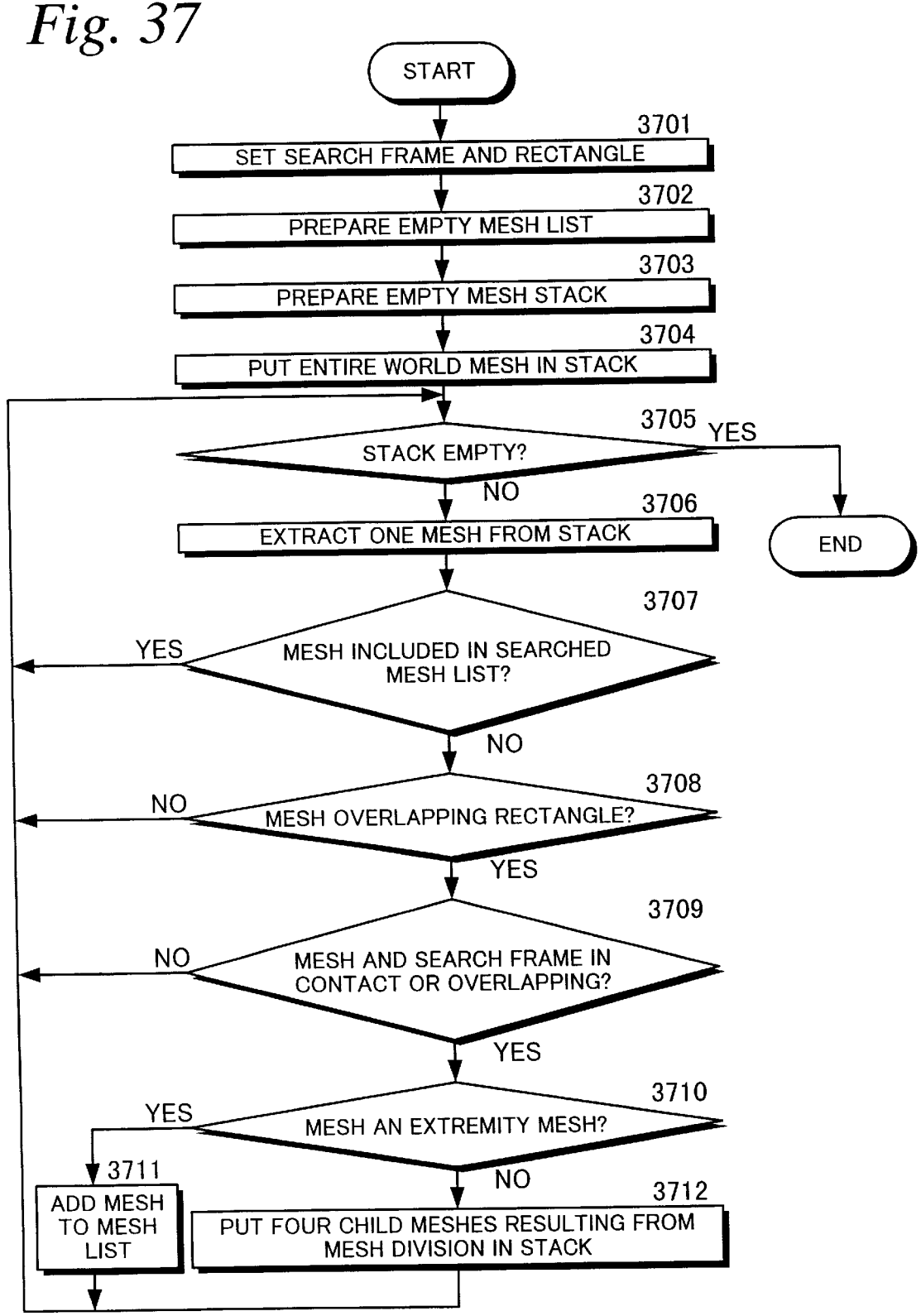
FIG. 37 is a flowchart illustrating the flow of the nearest neighbor graphic search processing.

Now, in reference to FIG. 37, the routine executed for creating the mesh list in step 3601 in FIG. 36 is explained in further detail.

Namely, in step 3601 in FIG. 36, a new search object mesh list is created by searching out the extremity meshes in contact with or overlapping with the search frame that is currently set, that are not included in the searched mesh list and also overlap with the search extent.

It is to be noted that this processing is almost identical to the processing illustrated in the flowchart (FIG. 25) in which a list of meshes overlapping with the rectangle is created in the rectangle search described earlier. The only difference is that there are two conditional branches (step 3707, step 3709) which are added before the operation reaches the step in which the mesh list is created.

In addition, while only extremity meshes are added to the mesh list in this flow, by switching the order in which the processing in step 3710 and the processing in step 3711 are performed to add meshes in the mesh list before a decision is made as to whether or not the meshes are extremity meshes, the mesh list that includes both the intermediate meshes and the extremity meshes that satisfy the conditions is achieved.

Figure 38:
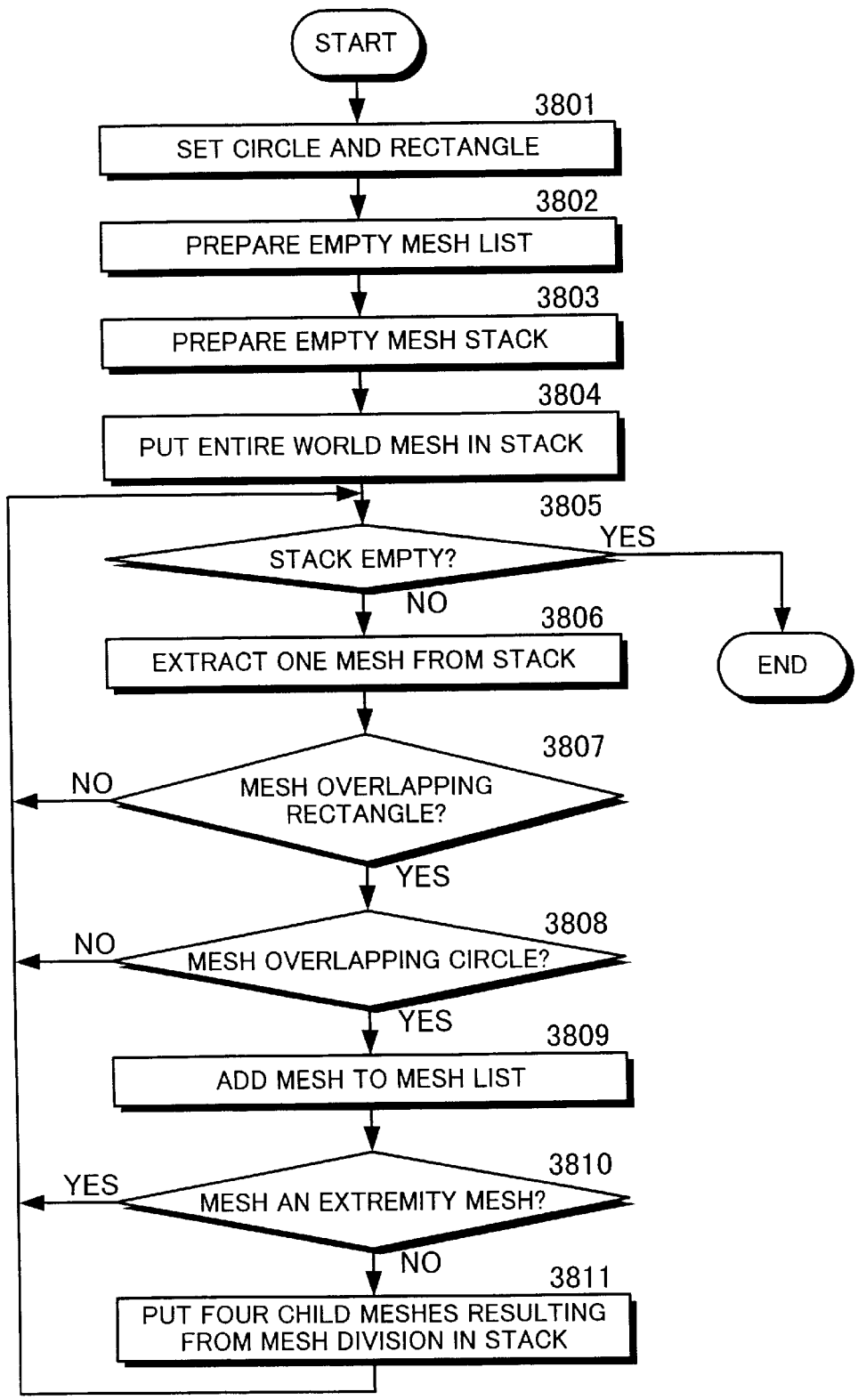
FIG. 38 is a flowchart illustrating the flow of the nearest neighbor graphic search processing.

Next, in reference to FIG. 38, the routine that is executed in order to create the mesh list in step 3401 in FIG. 34 is explained in further detail.

Namely, in step 3401 in FIG. 34, a new search object mesh list is created by searching out the extremity meshes and the intermediate meshes that overlap with the circle whose radius is the shortest distance (the distance to the nearest neighbor graphic) and whose center is the central point.

It is to be noted that this processing is almost identical to the processing illustrated in the flowchart (FIG. 25) in which a list of meshes overlapping with the rectangle is created in the rectangle search described earlier. The only difference is that there is a conditional branch (step 3808) added before the operation reaches the step in which the mesh list is created.

In addition, while both extremity meshes and intermediate meshes are added to the mesh list in this flow, by switching the order in which the processing in step 3809 and the processing in step 3810 are performed to add meshes in the mesh list after a decision is made as to whether or not the meshes are extremity meshes, a mesh list that only includes the extremity meshes that satisfy the conditions is achieved.

(7__2__2) Nearest Graphic Search 2

While, in the nearest neighbor graphic search described above, sub-graphics may be registered in intermediate meshes, in the nearest neighbor graphic search explained below, sub-graphics are registered only in extremity meshes.

Figure 40:
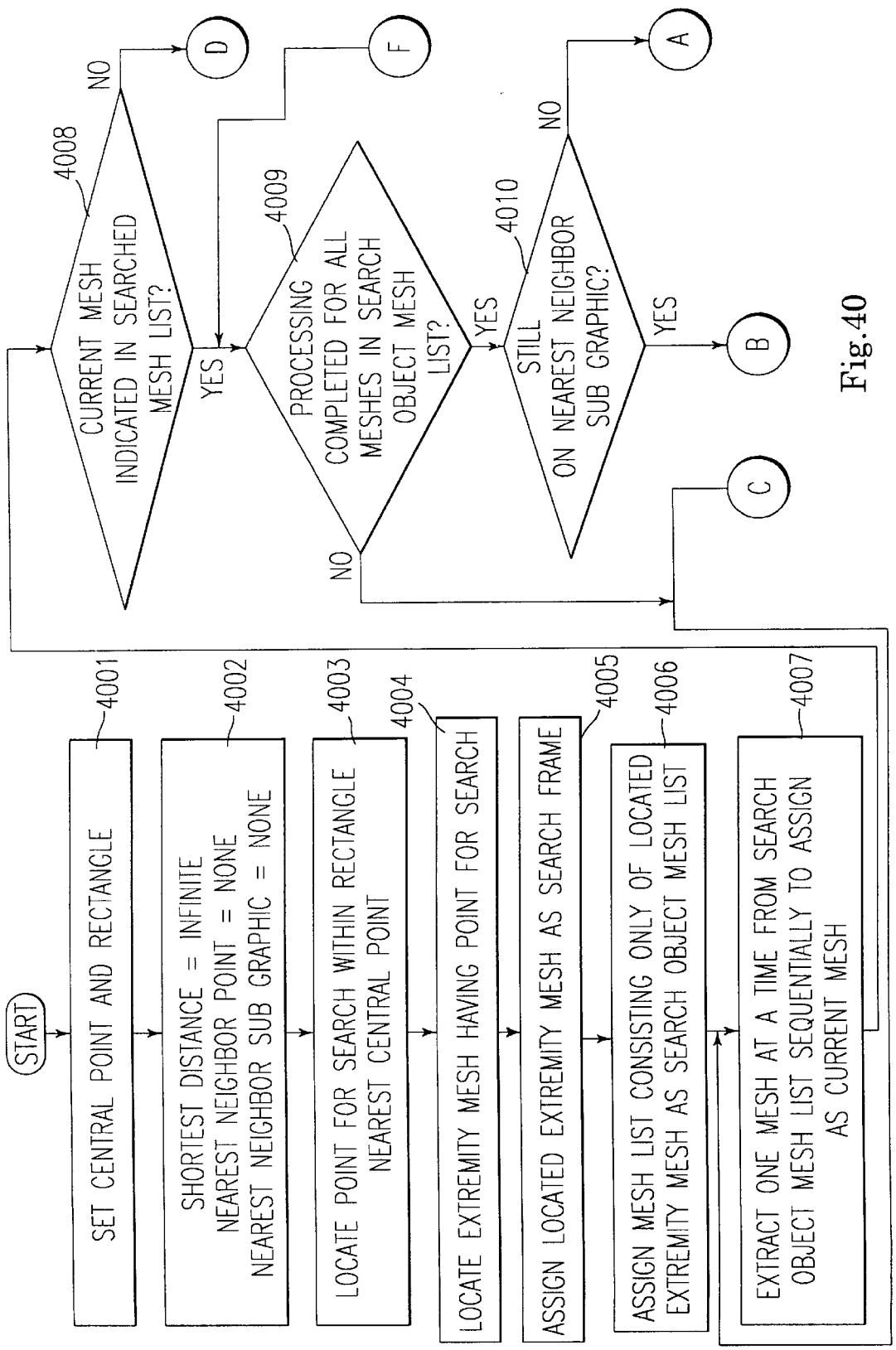
FIG. 40 is a flowchart illustrating the flow of the nearest neighbor graphic search processing performed when graphics are registered only in extremity meshes.

The following is a comparison between the nearest neighbor graphic search in which graphics are registered also in intermediate meshes and the nearest neighbor graphic search in which graphics are not registered in intermediate meshes in reference to FIG. 32 (sub-graphics are registered in intermediate meshes) and FIG. 40 (sub-graphics are registered only in extremity meshes). As the figures clearly indicate, FIG. 40 does not include any looped steps corresponding to step 3709, 3210 and 3209 in FIG. 32.

The reason for this is that since there are graphics present in intermediate meshes as well, in FIG. 32, if no graphics are present when an extremity mesh is searched, the search must be conducted by traversing up to the parent mesh to ensure that no omission in the search occurs.

Figure 41:
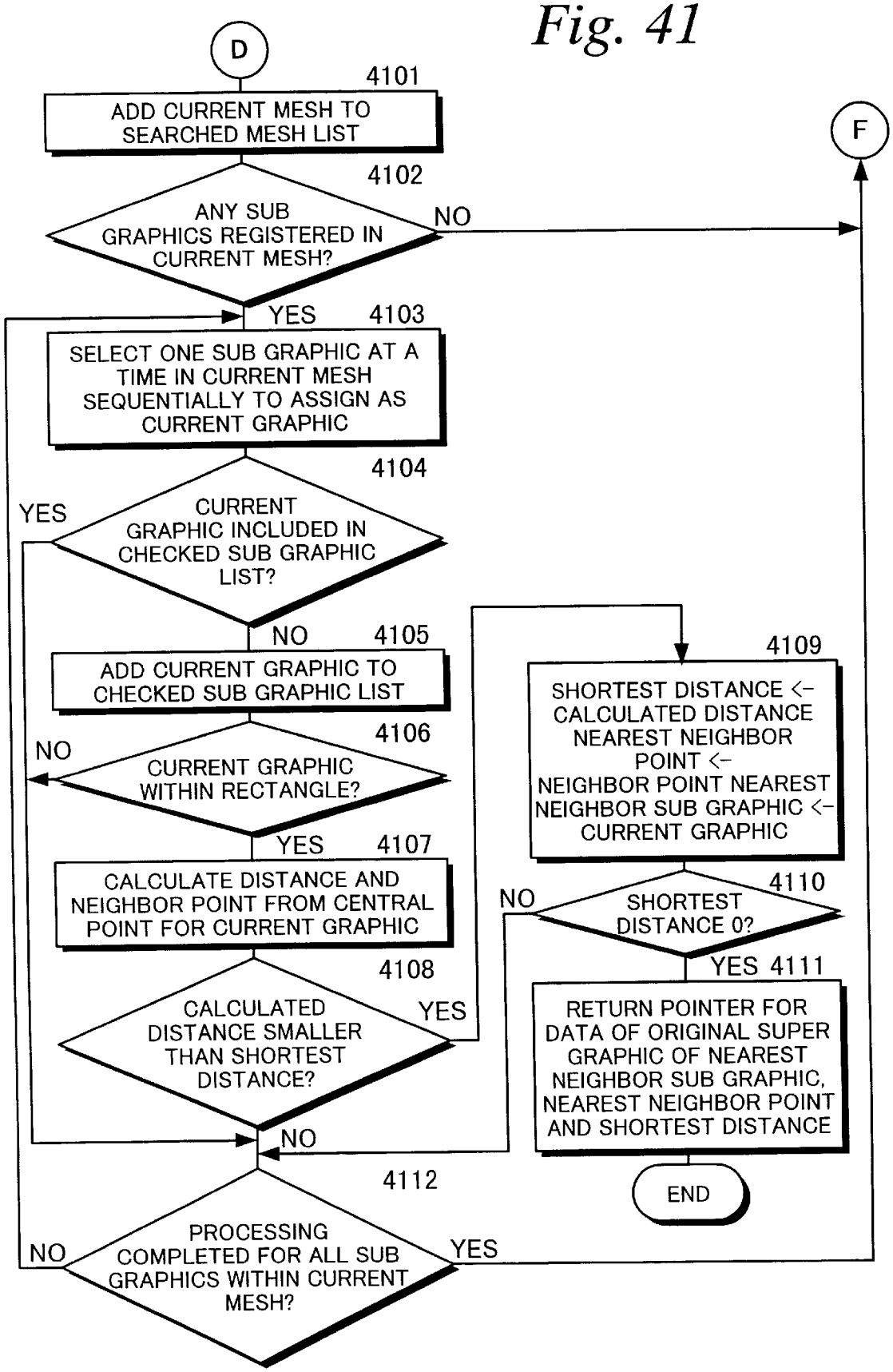
FIG. 41 is a flowchart illustrating the flow of the nearest neighbor graphic search processing performed when graphics are registered only in extremity meshes.
Figure 44:
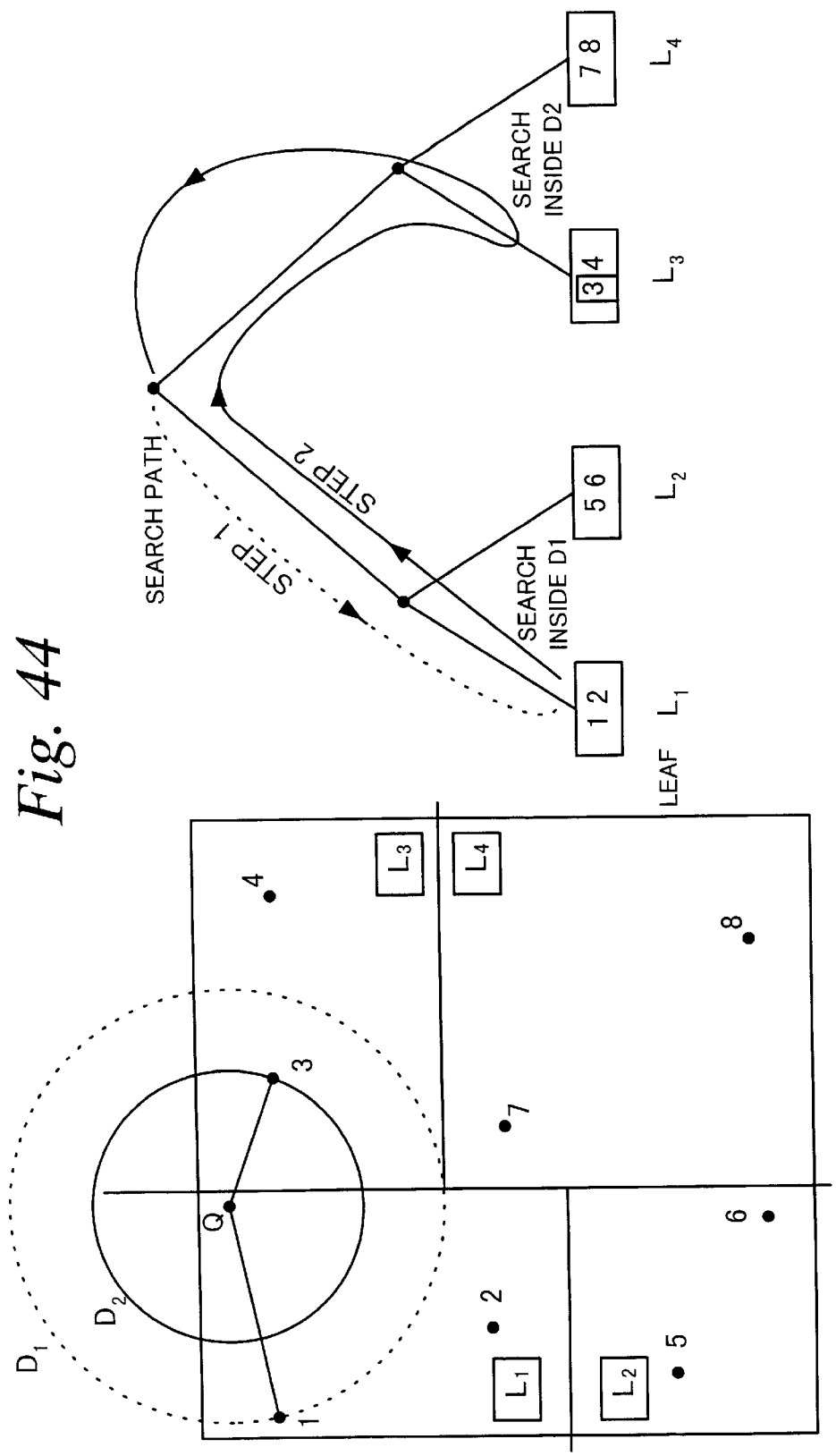
FIG. 44 is an illustration of a method for nearest neighbor data search in the past.
Figure 45:
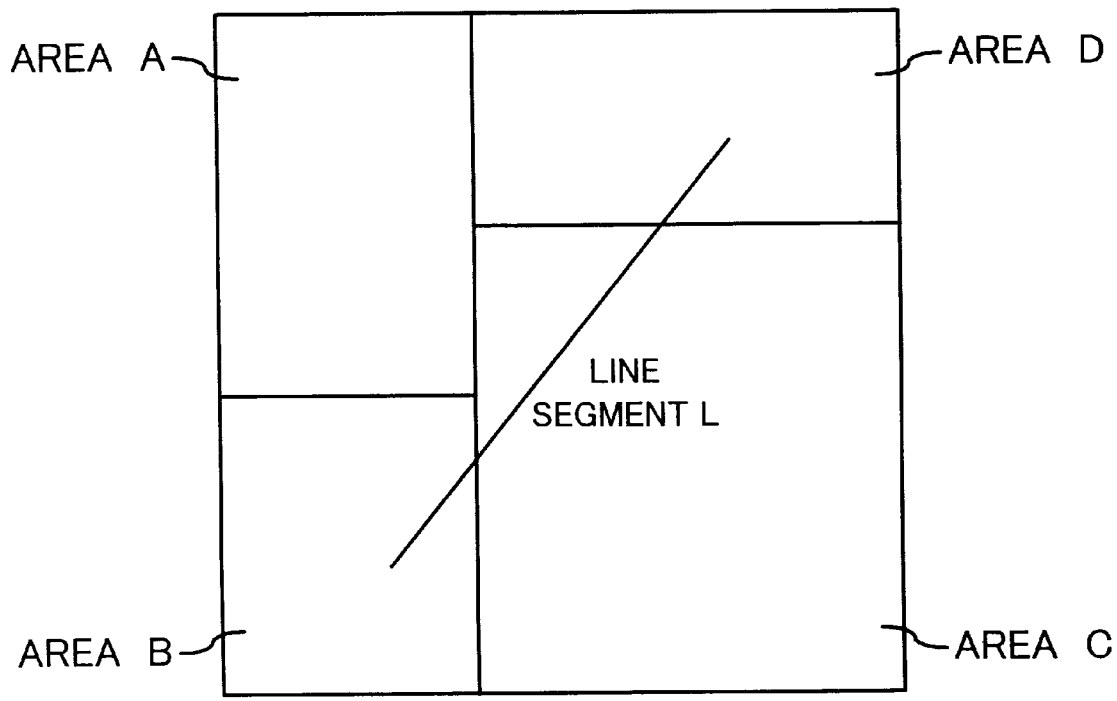
FIG. 45 is a drawing which shows an example of multiple registrations.

Next, FIG. 33 (sub-graphics are registered in intermediate meshes, as well) and FIG. 41 (sub-graphics are registered only in extremity meshes) are compared. The difference lies in that while in FIG. 33, if a negative decision is made in the conditional branching in step 3302, the operation skips to step 3209 without proceeding to the decision making in regard to the completion of the processing of the meshes in the search object mesh list in step 3211 in FIG. 32. In FIG. 41, on the other hand, if a negative decision is made in step 4102 which corresponds to step 3302 in FIG. 33, the operation skips to step 4008 which corresponds to step 3211 in FIG. 32.

The reason for the above is that in FIG. 33 with the graphics registered in the intermediate meshes as well, the parent meshes must be checked and thus, the operation must proceed by way of to step 3209 along the flow of the processing for searching the parent meshes.

It is to be noted that the flowchart that connects at the point at which the operation proceeds to B from FIG. 40 and at the point at which the operation returns from C is identical to that presented in FIG. 36 explained earlier (the flowchart of the processing performed when there are graphics registered in intermediate meshes). In addition, the flowchart that should follow after proceeding to A in FIG. 40 is identical to that shown in FIGS. 34 and 35 except for step 3401.

The processing performed in the step 3401 in FIG. 34 searches the intermediate meshes as well as the extremity meshes to locate a mesh that overlaps the circle.

If, on the other hand, there are graphics present only in the extremity meshes, it is not necessary to search the intermediate meshes, and thus, the processing performed in step 3401 is changed so that only extremity meshes will be searched out. In other words, this may be accomplished by simply switching step 3809 and step 3810 in FIG. 38 so that, consequently, a mesh is added to the list only when it proved to be an extremity one.

Thus, by executing the flow starting from A in FIG. 40 and proceeding in FIGS. 34 and 35 with the processing performed in step 3401 in FIG. 34 and the processing performed in steps 3809 and 3810 in FIG. 38 changed, the processing flow for nearest neighbor graphic search with graphics registered only in extremity meshes is achieved.

(7__3) Advantages of the Fifth Embodiment

With the fifth embodiment structured as described above, since the number of sets of data for which distance calculation is performed for each search is reduced in the nearest neighbor graphic search processing, the search time is reduced. Furthermore, the speed of the nearest neighbor graphic search processing is not dependent upon the degree of the data density and, therefore, the processing can be always performed at an invariable speed at all times.

(7_4) Variation of the Fifth Embodiment

As well as the third embodiment, instead of dynamically dividing/merging meshes, the apparatus or method disclosed in the fifth embodiment can have a set of appropriately divided meshes in the initial state and do without all the means for dividing and merging (12, 13, 14, and 15). In these cases, means for dividing (12 and 13) and means for merging (14 and 15) can both be applicable and be selectively omitted. In addition, instead of employing the means for nearest neighbor data search 21 in combination with the third embodiment, it may be combined with the second embodiment. Moreover, the means for range search 20 can be combined to provide both types of search.

(8) Other Embodiments (8_1) Widening the Conditions for Graphics to Belong to a Mesh The conditions employed when making a decision as to whether or not a graphic is to be relocated from a parent mesh to a child mesh in the second embodiment and the conditions employed for making a decision as to whether or not a graphic is to be made to belong to the current mesh in the third embodiment have similar functions and achieve similar advantages. In the third embodiment, the conditional decision making and the registration of graphics in meshes which is performed based upon the results of the decision making are implemented regardless of the state of the mesh division (quad-tree) at that point, and if necessary, mesh division will be performed in order to ensure that graphics are made to belong to meshes that satisfy the conditions. In contrast, in the second embodiment, that function is restricted depending upon the state of mesh division at the time of graphic registration, and is effected not at the time of graphic registration but concurrently with the operation of mesh division which is effected in conformance to other criteria. In other words, the only difference is that in the second embodiment, the action of this function is postponed until the time of mesh division.

The number of multiple registrations of each graphic in a plurality of meshes and the manner in which graphics and meshes are associated with each other vary depending upon the conditions in effect, which, in turn, will affect the size of the required storage capacity and the efficiency in the rectangle search and the nearest neighbor graphic search.

In the past, the equivalents of the following are set as those conditions.

(a) A decision is made as to whether or not the mesh is an extremity mesh with the number of belonging graphics smaller than P, and if an affirmative decision is made, a graphic is registered in the mesh (if a negative decision is made, the mesh which achieves an affirmative decision is created through mesh division)

(b) A decision is made as to whether or not the mesh is the smallest mesh that includes the entire graphic and if it is the smallest mesh, the graphic is registered.

(c) By focusing on the individual partial graphics that are separated by the boundaries of the child meshes resulting from dividing the smallest mesh that encloses the entire graphic, a decision is made as to whether or not the mesh is the smallest mesh that includes one of those partial graphics, and if an affirmative decision is made, the graphic is registered in the mesh.

When these conditions are adopted, because of the individual problems arising as explained in "Problems that the present invention addresses," the storage area is managed wastefully and the search performance becomes poor.

In the past, in the case of the condition (a), for instance, only the number of graphics that already belong in a mesh is used to represent the relationship between the graphics and the mesh, which affects the decision making criteria, regardless of the types of graphics to be registered or the types of graphics that already belong to the mesh. In addition, in conformance to condition (b), only whether or not the mesh is the smallest mesh that encloses the graphic, i.e., whether or not the graphic overlaps with a plurality of the child meshes resulting from mesh division is determined. With the condition (c), while the process of decision making is divided into two stages, the relationship between graphics and meshes that is used is similar to that used in the condition (b) and regardless of the type of graphic, only whether or not the mesh is the smallest mesh that encloses the (partial) graphic is determined.

The "types of graphics" in this context, refers to classifications/distinctions that mainly result from modes in which n-dimensional space data that are to be registered occupy (spread in) the space within the n-dimensional space. For instance, while this is an extreme example, point data which do not have size (spread) cannot be handled using the decision-making criteria such as the conditions (b) and (c) and thus, another criterion, such as the condition (a) must be adopted. Since a line segment only consists of length, without having area or volume, the manner in which it overlaps meshes and the manner in which it affects the search efficiency are different from those of graphics with area and volume and, in particular, they differ greatly from those of three-dimensional graphics whose maximum radii in the individual dimensions have a ratio close to the ratio of the length of the mesh in the individual dimensions. While the criteria such as the conditions (b) and (c) are often effective in handling the latter type of graphics to achieve a high degree of memory efficiency and higher search speeds, they are not always effective in handling line segments and very thin rectangular parallelepipeds as explained earlier.

Furthermore, by setting appropriate conditions accordingly when handling data that are known in advance to have (in common) certain purposes or characteristics, wasteful consumption of resources can be avoided and the search efficiency can be improved. For instance, while ruled lines and coordinate lines used in the background of maps, graphs and the like are not numerous, each line is very long, and if these data were made to belong in meshes based upon the same criteria as those used for very short line segments and very small graphics, they would become registered overlapping too many meshes resulting from too many divisions, wastefully consuming a great deal of memory and this might even detract from the search efficiency. On the other hand, if they belong in too few meshes, a number of ruled lines could end up belonging to the same mesh, greatly reducing the search efficiency. For instance, when the condition (b) is adopted, all the ruled lines would belong only in one (the largest) mesh constituting the world range, and therefore, the advantage of achieving good search efficiency by registering graphics over divided areas cannot be achieved at all.

In order to avoid this situation, for ruled lines, the condition (b) in the fourth embodiment may be set so that they are registered only in meshes having sides the lengths of which are approximately the same as the distance between the ruled lines. If registration is implemented in conformance to this condition, only one ruled line (in one direction) will belong in one mesh and, at the same time, an extreme instance of multiple registration can be avoided. Adopting this condition will be particularly effective for rectangle search in which the number of ruled lines to be selected is very small relative to the entire number of ruled lines. Under the condition, a decision is made in regard to the meshes where registrations should be made by adopting as a criterion the length that is determined or calculated in advance based upon the distance between the ruled lines instead of the attributes as line segments(lengths, for instance) of the individual ruled lines.

In regard to graphics with areas and volumes, too, if, for instance, a graphic which is used as a background and, therefore, has an extremely wide area was handled in the same manner as other smaller graphics, by using the condition (a) explained earlier, the number of multiple registrations would become enormous. With such a graphic, a condition such as the condition (d) in the third embodiment should be employed to limit the number of multiple registrations to effectively avoid wasteful consumption of memory.

By controlling registration of graphics in meshes and switching belonging assignment of graphics to child meshes based upon a criterion that is considered optimal from the viewpoint of the purpose of the graphic and relationships with other graphics as well as the shape and the size of the graphic, as described above, an improvement in search and/or memory efficiency can be achieved which would not otherwise be achieved under uniform conditions that do not depend upon the types of graphics.

(8_2) Application to Multidimensional Data

While the individual embodiments have been explained in specific terms in reference to cases in which graphic data within two dimensional and three dimensional spaces are handled, other multidimensional data with individual dimensions presenting some sort of quantitative indications can be registered and searched by using n-dimensional parallelepipeds as meshes that are achieved by recursively dividing another multidimensional space, i.e., the n-dimensional space by $2^N$ in a manner similar to that adopted in those embodiments. These n-dimensional data may very often be the type of data, each set of which is handled as an three-dimensional body which has a certain degree of expanse within the n-dimensional space as well as the type of data that is handled as points within the n-dimensional space. For instance, the measured values of "n" types of attributes of one object, each has an error and when these are handled as ranges over which the true values in the individual dimensions exist with a certain degree of likelihood, the data become n-dimensional parallelepiped data. Since the form of these data changes in various manners depending upon the state in which the measurements are taken, the means for multidimensional data management/search, such as that in the present invention, is required in order to record these data all together and to implement search such as selecting an object whose true values in the individual dimensions are present within certain ranges with a high degree of efficiency.

Thus, the present invention is not limited to the embodiments explained above and may be adopted in management and search of data whose positions are determined within a multidimensional space, and in that case, mesh division is managed in a ($2^N$)-divided tree for data in an N-dimensional space. In addition, if there are many different types of data present, search may be performed by narrowing to limited types of data. Furthermore, in correspondence to different types of data and different manners in which coordinate data are handled, a plurality of ($2^N$)-divided tree may be provided.

As has been explained, according to the present invention, a multidimensional data management method and a multidimensional data management apparatus with which a reduction in data area is achieved and, furthermore, higher speed in range search and nearest neighbor data search is achieved, are provided.

What is claimed is:

1. A multidimensional data management method for managing a plurality of sets of multidimensional data positioned in a specific area of a computer, said method comprising:

when hierarchically dividing a first area within said specific area into second areas which are to constitute child areas thereof, making a decision as to whether or not a division condition based upon a state achieved when said sets of multidimensional data are allocated to said first area and a state achieved when said sets of multidimensional data are allocated to said second areas is satisfied;

dividing hierarchically said first area into said second areas, if said division condition is determined to be satisfied; and allocating said sets of multidimensional data to said second areas.

2. A multidimensional data management method for managing a plurality of sets of multidimensional data positioned in a specific area of a computer, said method comprising:

when hierarchically dividing a first area within said specific area into second areas which are to constitute child areas thereof, making a decision as to whether or not a division condition based upon a state achieved when said sets of multidimensional data are allocated to said first area and a state achieved when said sets of multidimensional data are allocated to said second areas is satisfied;

dividing hierarchically said first area into said second areas and allocating said sets of multidimensional data to said second areas, if said division condition is determined to be satisfied;

making a decision as to whether or not a merging condition based upon a state achieved when said sets of multidimensional data are allocated to said second areas and a state achieved when said sets of multidimensional data are allocated to said first area is satisfied; and merging said second areas with said first area and allocating said sets of multidimensional data to said first area, if said merging condition is determined to be satisfied.

3. A multidimensional data management method according to claim 1 or 2, wherein:

a decision is made as to whether or not division is to be performed based upon said division condition in which the total number of sets of multidimensional data in said second areas when said sets of multidimensional data belong to said second areas and the number of sets of multidimensional data in said first area when said sets of multidimensional data belong to said first area are compared.

4. A multidimensional data management method according to claim 1 or 2, wherein:

a decision is made as to whether or not division is to be performed based upon said division condition in which the number of sets of multidimensional data in said first area when said sets of multidimensional data belong to said first area and the number of sets of multidimensional data in a plurality of areas among said second areas when said sets of multidimensional data belong to said plurality of areas among said second areas are compared.

5. A multidimensional data management method according to claim 1 or 2, wherein:

when said first area is divided, registering each of said sets of multidimensional data by making a decision as to whether each of said sets of multidimensional data is to be reregistered in second areas created through division or in said first area.

6. A multidimensional data management method according to claim 5, wherein:

decision making as to whether each of said sets of multidimensional data is to be reregistered in said first area or in said second areas is based upon a condition that said set of multidimensional data does not include said first area completely.

7. A multidimensional data management method according to claim 5, wherein:

decision making as to whether each of said sets of multidimensional data is to be reregistered in said first area or in said second areas is based upon a condition that the number of said second areas over which said set of multidimensional data overlaps is equal to or smaller than a preset value.

8. A multidimensional data management method according to claim 5, wherein:

decision making as to whether each of said sets of multidimensional data are to be reregistered in said first area or in said second areas is based upon a condition that, with an upper limit on the number of areas over which overlapping registrations may be made for each set of said multidimensional data set in advance, the number of overlapping registrations is equal to or smaller than said upper limit if said set of multidimensional data is registered in said second areas.

9. A multidimensional data management method for managing a plurality of sets of multidimensional data positioned in a specific area of a computer, said method comprising:

when a first area within said specific area has been hierarchically divided into second areas which are to constitute child areas thereof, making a decision as to whether or not a merging condition based upon a state achieved when said sets of multidimensional data are allocated to said second areas and a state achieved when said sets of multidimensional data are allocated to said first area is satisfied;

merging said second areas with said first area, if said merging condition is determined to be satisfied; and allocating said sets of multidimensional data to said first area.

10. A multidimensional data management method according to claim 9 or 2, wherein:

a decision is made as to whether or not merging is to be performed based upon said merging condition in which the total number of sets of multidimensional data in said second areas when said sets of multidimensional data belong to said second areas and the number of sets of multidimensional data in said first area when said sets of multidimensional data belong to said first area are compared.

11. A multidimensional data management method according to claim 9 or 2, wherein:

a decision is made as to whether or not merging is to be performed based upon said merging condition in which the number of sets of multidimensional data in said first area when said sets of multidimensional data belong to said first area and the number of sets of multidimensional data in a plurality of areas among said second areas when said sets of multidimensional data belong to said plurality of areas among said second areas are compared.

12. A multidimensional data management method according to claim 9 or 2, wherein:

said merging condition allows said second areas to be merged when, with the number of sets of multidimensional data that may be registered in each of said second areas set equal to or lower than a specific value, the number of sets of multidimensional data registered in each of said second areas sharing one common parent area is smaller than said specific value.

13. A multidimensional data management method for managing a plurality of sets of multidimensional data positioned in a specific area of a computer, said method comprising a step of making a decision, when a first area within said specific area has been hierarchically divided into second areas where are to constitute child areas thereof, as to whether said set of multidimensional data is to be registered in said first area or in said second areas.

14. A multidimensional data management method according to claim 13, wherein:

a decision is made as to whether said set of multidimensional data is to be registered in said first area or in said second areas, based upon a condition whereby areas where said set of multidimensional data is to be registered is selected in correspondence to the number of said second areas over which said set of multidimensional data overlaps.

15. A multidimensional data management method according to claim 13, wherein:

a decision is made as to whether said set of multidimensional data is to be registered in said first area or in said second areas, based upon a condition whereby, with a limit on the size of an area where each set of multidimensional data may be registered set in advance respectively, areas where said set of multidimensional data is to be registered are selected in conformance to said limit.

16. A multidimensional data management method according to claim 13, wherein:

a decision is made as to whether said set of multidimensional data is to be registered in said first area or in said second areas, based upon a condition whereby, with a limit on the number of areas over which overlapping registrations may be made for each set of said multidimensional data set in advance respectively, areas where said set of multidimensional data is to be registered are selected in conformance to said limit.

17. A multidimensional data management method according to claim 13, wherein:

a decision is made as to whether said set of multidimensional data is to be registered in said first area or in said second areas, based upon a condition whereby areas where said set of multidimensional data is to be registered is selected through comparison of the size of said set of multidimensional data and the size of said first area or said second areas.

18. A multidimensional data management method according to any of claims 1, 2, 3 and 13, further comprising a range search step of searching sets of multidimensional data belonging in a specified range within said specific area.

19. A multidimensional data management method according to any of claims 1, 2, 3 and 13, further comprising a nearest neighbor data search step of searching a set of multidimensional data nearest to a specified point within said specific area.

20. A multidimensional data management method according to claim 19, wherein said nearest data search step further comprises:

a step of expanding the search range until one candidate for nearest neighbor set of multidimensional data is determined, when no sets of multidimensional data are registered in the smallest area containing said specific point.

21. A multidimensional data management apparatus for managing a plurality of sets of multidimensional data positioned in a specific area of a computer, said apparatus comprising:

means for making a decision, when hierarchically dividing a first area within said specific area into second areas which are to constitute child areas thereof, as to whether or not a division condition based upon a state achieved when said sets of multidimensional data are allocated to said first area and a state achieved when said sets of multidimensional data are allocated to said second areas is satisfied;

means for hierarchically dividing said first area into said second areas when said division condition is determined to be satisfied; and means for allocating said sets of multidimensional data to said second areas.

22. A multidimensional data management apparatus for managing a plurality of sets of multidimensional data positioned in a specific area of a computer, said apparatus comprising:

means for making a decision, when hierarchically dividing a first area within said specific area into second areas which are to constitute child areas thereof, as to whether or not a division condition based upon a state achieved when said sets of multidimensional data are allocated to said first area and a state achieved when said sets of multidimensional data are allocated to said second areas is satisfied;

means for hierarchically dividing said first area into said second areas when said are determined to be satisfied;

means for making a decision as to whether or not a merging condition based upon a state achieved when said sets of multidimensional data are allocated to said second areas and a state achieved when said sets of multidimensional data are allocated to said first area is satisfied;

means for merging said second areas with said first area when said merging condition is determined to be satisfied; and means for allocating said sets of multidimensional data in at least either said first area or said second areas based upon results of said decision.

23. A multidimensional data management apparatus according to claim 21 or 22, wherein:

a decision is made as to whether or not division is to be performed based upon said division condition in which the total number of sets of multidimensional data in said second areas when said sets of multidimensional data belong to said second areas and the number of sets of multidimensional data in said first area when said sets of multidimensional data belong to said first area are compared.

24. A multidimensional data management apparatus according to claim 21 or 22, wherein:

a decision is made as to whether or not division is to be performed based upon said division condition in which the number of sets of multidimensional data in said first area when said sets of multidimensional data belong to said first area and the number of sets of multidimensional data in a plurality of areas among said second areas when said sets of multidimensional data belong to said plurality of areas among said second areas are compared.

25. A multidimensional data management apparatus according to claim 21 or 22, wherein:

when said first area is divided, each of said sets of multidimensional data are reregistered by making a decision as to whether each of said sets of multidimensional data is to be reregistered in second areas created through division or to said first area.

26. A multidimensional data management apparatus according to claim 25, wherein:

decision making as to whether each of said sets of multidimensional data is to be reregistered in said first area or in said second areas is based upon a condition that said set of multidimensional data does not include said first area completely.

27. A multidimensional data management apparatus according to claim 25, wherein:

decision making as to whether each of said sets of multidimensional data is to reregistered in said first area or in said second areas is based upon a condition that the number of said second areas over which said set of multidimensional data overlaps is equal to or smaller than a preset value.

28. A multidimensional data management apparatus according to claim 25, wherein:

decision making as to whether each of said sets of multidimensional data are to be reregistered in said first area or in said second areas is based upon a condition that, with an upper limit on the number of areas over which overlapping registrations may be made for each set of said multidimensional data set in advance, the number of overlapping registrations is equal to or smaller than said upper limit if said set of multidimensional data is registered in said second areas.

29. A multidimensional data management apparatus for managing a plurality of sets of multidimensional data positioned in a specific area of a computer, said apparatus comprising:

means for making a decision, when a first area within said specific area has been hierarchically divided into second areas which are to constitute child areas thereof, as to whether or not a merging condition based upon a state achieved when said sets of multidimensional data are allocated to said second areas and a state achieved when said sets of multidimensional data are allocated to said first area is satisfied;

means for merging said second areas with said first area when said merging condition is determined to be satisfied; and means for allocating said sets of multidimensional data to said first area.

30. A multidimensional data management apparatus according to claim 29 or 22, wherein:

a decision is made as to whether or not merging is to be performed based upon said merging condition in which the total number of sets of multidimensional data in said second areas when said sets of multidimensional data belong to said second areas and the number of sets of multidimensional data in said first area when said sets of multidimensional data belong to said first area are compared.

31. A multidimensional data management apparatus according to claim 29 or 22, wherein:

a decision is made as to whether or not merging is to be performed based upon said merging condition in which the number of sets of multidimensional data in said first area when said sets of multidimensional data belong to said first area and the number of sets of multidimensional data in a plurality of areas among said second areas when said sets of multidimensional data belong to said second areas are compared.

32. A multidimensional data management apparatus according to claim 29 or 22, wherein:

said merging condition allows said second areas to be merged when, with the number of sets of multidimensional data that may be registered in each of said second areas set equal to or lower than a specific value, the number of sets of multidimensional data registered in each of said second areas sharing one common parent area is smaller than said specific value.

33. A multidimensional data management apparatus for managing a plurality of sets of multidimensional data positioned in a specific area of a computer, comprising:

means for making a decision, when a first area within said specific area has been hierarchically divided into second areas where are to constitute child areas thereof, as to whether said set of multidimensional data is to be registered in said first area or in said second areas.

34. A multidimensional data management apparatus according to claim 33, wherein:

a decision is made as to whether said set of multidimensional data is to be registered in said first area or in said second areas, based upon a condition whereby areas where said set of multidimensional data is to be registered is selected in correspondence to the number of said second areas over which said set of multidimensional data overlaps.

35. A multidimensional data management apparatus according to claim 33, wherein:

a decision is made as to whether said set of multidimensional data is to be registered in said first area or in said second areas, based upon a condition whereby, with a limit on the size of an area where each set of multidimensional data may be registered set in advance respectively, areas where said set of multidimensional data is to be registered are selected in conformance to said limit.

36. A multidimensional data management apparatus according to claim 33, wherein:

a decision is made as to whether said set of multidimensional data is to be registered in said first area or in said second areas, based upon a condition whereby, with a limit on the number of areas over which overlapping registrations may be made for each set of said multidimensional data set in advance respectively, areas where said set of multidimensional data is to be registered are selected in conformance to said limit.

37. A multidimensional data management apparatus according claim 33, wherein:

a decision is made as to whether said set of multidimensional data is to be registered in said first area or in said second areas, based upon a condition whereby an area where said set of multidimensional data is to be registered selected through comparison of the size of said set of multidimensional data and the size of said first area or said second areas.

38. A multidimensional data management apparatus according to any of claims 21, 29, 22, and 33, further comprising range search means for searching sets of multidimensional data belonging in a specified range within said specific area.

39. A multidimensional data management apparatus according to any of claims 21, 29, 22, and 33, further comprising nearest neighbor data search means for searching a set of multidimensional data nearest to a specified point within said specific area.

40. A multidimensional data management apparatus according to claim 39, wherein said nearest data search means, when no sets of multidimensional data are registered in the smallest area containing said specific point, expands the search range until one candidate for nearest neighbor set of multidimensional data is determined.

41. A storage medium onto which is stored a computer program that implements a multidimensional data management method for managing a plurality of sets of multidimensional data positioned in a specific area of a computer, said multidimensional data management method comprising the steps of:

making a decision, when hierarchically dividing a first area within said specific area into second areas which are to constitute child areas thereof, as to whether or not a division condition based upon a state achieved when said sets of multidimensional data are allocated to said first area and a state achieved when said sets of multidimensional data are allocated to said second areas is satisfied;

divided hierarchically said first area into said second areas, if said division condition is determined to be satisfied; and allocating said sets of multidimensional data to said second areas.

42. A storage medium onto which is stored a computer program that implements a multidimensional data management method for managing a plurality of sets of multidimensional data positioned in a specific area of a computer, said multidimensional data management method comprising the steps of:

making a decision, when a first area within said specific area has been hierarchically divided into second areas which are to constitute child areas thereof, as to whether or not a merging condition based upon a state achieved when said sets of multidimensional data are allocated to said second areas and a state achieved when said sets of multidimensional data are allocated to said first area is satisfied;

merging said second areas with said first area, if said merging condition is determined to be satisfied; and allocating said sets of multidimensional data to said first area.

43. A storage medium onto which is stored a computer program that implements a multidimensional data management method for managing a plurality of sets of multidimensional data positioned in a specific area of a computer, said multidimensional data management method comprising the steps of:

making a decision, when hierarchically dividing a first area within said specific area into second areas which are to constitute child areas thereof, as to whether or not a division condition based upon a state achieved when said sets of multidimensional data are allocated to said first area and a state achieved when said sets of multidimensional data are allocated to said second areas is satisfied;

dividing hierarchically said first area into said second areas if said division condition is determined to be satisfied;

allocating said sets of multidimensional data to said second areas;

making a decision as to whether or not a merging condition based upon a state achieved when said sets of multidimensional data are allocated to said second areas and a state achieved when said sets of multidimensional data are allocated to said first area is satisfied;

merging said second areas with said first area if said merging condition is determined to be satisfied; and allocating said sets of multidimensional data to said first area.

44. A storage medium onto which is stored a computer program that implements a multidimensional data management method for managing a plurality of sets of multidimensional data positioned in a specific area of a computer, said multidimensional data management method comprising a step of making a decision, when a first area within said specific area has been hierarchically divided into second areas where are to constitute child areas thereof, as to whether said set of multidimensional data is to be registered in said first area or in said second areas.

* * * * *